US010536882B2

(12) United States Patent
Kim et al.

(10) Patent No.: US 10,536,882 B2
(45) Date of Patent: *Jan. 14, 2020

(54) METHOD AND APPARATUS FOR TRANSMITTING/RECEIVING SIGNAL IN MOBILE COMMUNICATION SYSTEM SUPPORTING A PLURALITY OF CARRIERS

(71) Applicant: Samsung Electronics Co., Ltd., Suwon-si, Gyeonggi-do (KR)

(72) Inventors: Soeng-Hun Kim, Suwon-si (KR); Gert Jan Van Lieshout, Staines (GB); Sang-Bum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,546

(22) Filed: May 4, 2018

(65) Prior Publication Data

US 2018/0255488 A1    Sep. 6, 2018

Related U.S. Application Data

(63) Continuation of application No. 14/664,313, filed on Mar. 20, 2015, now Pat. No. 9,967,784.

(30) Foreign Application Priority Data

Mar. 21, 2014  (KR) .................. 10-2014-0033720
Mar. 31, 2014  (KR) .................. 10-2014-0038262
(Continued)

(51) Int. Cl.
*H04W 36/00* (2009.01)
*H04W 76/15* (2018.01)
*H04W 76/16* (2018.01)

(52) U.S. Cl.
CPC ... *H04W 36/0055* (2013.01); *H04W 36/0069* (2018.08); *H04W 76/15* (2018.02); *H04W 76/16* (2018.02)

(58) Field of Classification Search
None
See application file for complete search history.

(56) References Cited

U.S. PATENT DOCUMENTS 8,102,823 B2    1/2012 Purkayastha et al.
9,967,784 B2 *  5/2018 Kim .................. H04W 36/0055
(Continued)

FOREIGN PATENT DOCUMENTS

WO   2012/121751 A1   9/2012
WO   2012/121757 A1   9/2012
(Continued)

OTHER PUBLICATIONS

Ericsson; A common user plane architecture for dual connectivity; 3GPP TSG-RAN WG2 #85; Tdoc R2-140662; Feb. 10-14, 2014; Prague, Czech Republic.
(Continued)

*Primary Examiner* — Mohammad S Adhami
(74) *Attorney, Agent, or Firm* — Jefferson IP Law, LLP

(57) ABSTRACT

A method for transmitting terminal capability information in a communication system supporting a plurality of carriers is provided. The method includes transmitting a control message including terminal capability information, wherein the terminal capability information includes at least one of an information element (IE) indicating whether to support a multi-bearer, an IE indicating whether to support a secondary cell group (SCG) bearer, or an IE indicating whether to support dual connectivity (DC).

20 Claims, 20 Drawing Sheets

(30) Foreign Application Priority Data

| Aug. 8, 2014 | (KR) | ........................ 10-2014-0102370 |
| Oct. 2, 2014 | (KR) | ........................ 10-2014-0133520 |
| Nov. 5, 2014 | (KR) | ........................ 10-2014-0152907 |
| Nov. 25, 2014 | (KR) | ........................ 10-2014-0165249 |

(56) References Cited

U.S. PATENT DOCUMENTS

| 2012/0184281 | A1 | | 1/2012 | Kim et al. | |
|---|---|---|---|---|---|
| 2012/0069728 | A1 | | 3/2012 | Jung et al. | |
| 2013/0039232 | A1 | * | 2/2013 | Kim | ........................ H04L 5/14 370/280 |
| 2013/0083783 | A1 | | 4/2013 | Gupta et al. | |
| 2013/0265984 | A1 | | 10/2013 | Li et al. | |
| 2014/0071854 | A1 | | 3/2014 | Xiang et al. | |
| 2015/0350882 | A1 | * | 12/2015 | Uchino | ................... H04W 8/24 370/329 |
| 2016/0029376 | A1 | * | 1/2016 | Fukuta | .............. H04W 72/0426 370/329 |
| 2016/0192350 | A1 | * | 6/2016 | Yi | ........................ H04W 52/146 370/329 |
| 2016/0249259 | A1 | * | 8/2016 | Park | ........................ H04W 36/00 |
| 2016/0338134 | A1 | * | 11/2016 | Nagasaka | .............. H04W 76/10 |
| 2017/0006598 | A1 | * | 1/2017 | Uemura | ................. H04L 5/0048 |
| 2017/0013564 | A1 | * | 1/2017 | Yi | ........................ H04W 52/36 |
| 2017/0013668 | A1 | * | 1/2017 | Chang | ................... H04W 76/36 |

FOREIGN PATENT DOCUMENTS

| WO | 2013052163 A1 | 4/2013 |
|---|---|---|
| WO | 2014/043565 A1 | 3/2014 |

OTHER PUBLICATIONS

CATI, UE Capability for Dual Connectivity, 3GPP TSG RAN WG2 Meeting #83, Aug. 19-23, 2013, R2-132495.

Chinese office action dated Mar. 5, 2019; Chinese Patent Application No. 201580015471.2.

* cited by examiner

METHOD AND APPARATUS FOR TRANSMITTING/RECEIVING SIGNAL IN MOBILE COMMUNICATION SYSTEM SUPPORTING A PLURALITY OF CARRIERS

CROSS-REFERENCE TO RELATED APPLICATION(S)

This application is a continuation application of prior application Ser. No. 14/664,313, filed on Mar. 20, 2015, which issued as U.S. Pat. No. 9,967,784; which was based on and claimed priority under 35 U.S.C. § 119(a) of a Korean patent application filed on Mar. 21, 2014 in the Korean Intellectual Property Office and assigned Serial number 10-2014-0033720, of a Korean patent application filed on Mar. 31, 2014 in the Korean Intellectual Property Office and assigned Serial number 10-2014-0038262, of a Korean patent application filed on Aug. 8, 2014 in the Korean Intellectual Property Office and assigned Serial number 10-2014-0102370, of a Korean patent application filed on Oct. 2, 2014 in the Korean Intellectual Property Office and assigned Serial number 10-2014-0133520, of a Korean patent application filed on Nov. 5, 2014 in the Korean Intellectual Property Office and assigned Serial number 10-2014-0152907, and of a Korean patent application filed on Nov. 25, 2014 in the Korean Intellectual Property Office and assigned Serial number 10-2014-0165249, the entire disclosure of each of which is hereby incorporated by reference.

TECHNICAL FIELD

The present disclosure relates to a method and apparatus for transmitting/receiving a signal in a mobile communication system. More particularly, the present disclosure relates to a method and apparatus for transmitting/receiving a signal in a mobile communication system supporting a plurality of carriers.

BACKGROUND

In general, mobile communication systems have been developed to provide communication services while allowing for a user's mobility. In response to the rapid development of technology, the mobile communication systems have reached a stage of not only providing voice communication services but also high-speed data communication services.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LIE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In recent years, a 3rd generation partnership project (3GPP) long term evolution (LIE) system has developed a standard to be used as one of the next-generation mobile communication systems. The LIE system is technology for implementing high-speed packet-based communication having a transmission rate of hundreds Mbps which is higher than a current transmission rate, and standardization for the LIE system has been almost completed.

Currently, the discussion of an LIE-advanced (LIE-A) system that has improved transmitting rates by combining a variety of new technologies for the LIE system is underway. The most typical one of the new technologies may include carrier aggregation (CA).

In a CA scheme, one terminal performs a data transmitting/receiving operation using a plurality of downlink carriers and a plurality of uplink carriers, unlike the technology of the related art in which a terminal performs a data transmitting/receiving operation using one downlink carrier and one uplink carrier.

Currently, however, only the intra-evolved Node B (ENB) CA is defined in an LIE-A system. This may result in reducing the applicability of a CA scheme, thus causing the possible problems that a macro cell and a pico cell cannot be aggregated especially in a scenario where a plurality of pico cells and one macro cell are operated in an overlapping manner.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting/receiving a signal in a mobile communication system supporting a plurality of carriers.

Another aspect of the present disclosure is to provide a method and apparatus for transmitting/receiving a signal based on an inter-evolved Node B (ENB) carrier aggregation (CA) scheme in a mobile communication system supporting a plurality of carriers.

Another aspect of the present disclosure is to provide a method and apparatus for transmitting/receiving terminal capability information in a mobile communication system supporting a plurality of carriers.

Another aspect of the present disclosure is to provide a method and apparatus for transmitting/receiving terminal capability information based on a band combination in a mobile communication system supporting a plurality of carriers.

Another aspect of the present disclosure is to provide a method and apparatus for transmitting/receiving terminal capability information based on a cell in a mobile communication system supporting a plurality of carriers.

Another aspect of the present disclosure is to provide a method and apparatus for transmitting/receiving terminal capability information per terminal or band combination in a mobile communication system supporting a plurality of carriers.

In accordance with an aspect of the present disclosure, a method for transmitting terminal capability information in a communication system supporting a plurality of carriers is provided. The method includes transmitting a control message including the terminal capability information, wherein the terminal capability information includes at least one of an information element (IE) indicating whether to support a multi-bearer, an IE indicating whether to support a secondary cell group (SCG) bearer, or an IE indicating whether to support dual connectivity (DC).

In accordance with another aspect of the present disclosure, a method for receiving terminal capability information in a communication system supporting a plurality of carriers is provided. The method includes receiving a control message including the terminal capability information, wherein the terminal capability information includes at least one of an IE indicating whether to support a multi-bearer, an IE indicating whether to support an SCG bearer, or an IE indicating whether to support DC.

In accordance with another aspect of the present disclosure, a method for transmitting terminal capability information in a communication system supporting a plurality of carriers is provided. The method includes transmitting a control message including the terminal capability information, wherein the terminal capability information includes at least one IE indicating a DC capability.

In accordance with another aspect of the present disclosure, a method for receiving terminal capability information in a communication system supporting a plurality of carriers is provided. The method includes receiving a control message including the terminal capability information, wherein the terminal capability information includes at least one IE indicating a DC capability.

In accordance with another aspect of the present disclosure, an apparatus for transmitting terminal capability information in a communication system supporting a plurality of carriers is provided. The apparatus includes a transmitter configured to transmit a control message including the terminal capability information, wherein the terminal capability information includes at least one of an IE indicating whether to support a multi-bearer, an IE indicating whether to support an SCG bearer, or an IE indicating whether to support DC.

In accordance with another aspect of the present disclosure, an apparatus for receiving terminal capability information in a communication system supporting a plurality of carriers is provided. The apparatus includes a receiver configured to receive a control message including the terminal capability information, wherein the terminal capability information includes at least one of an IE indicating whether to support a multi-bearer, an IE indicating whether to support an SCG bearer, or an IE indicating whether to support DC.

In accordance with another aspect of the present disclosure, an apparatus for transmitting terminal capability information in a communication system supporting a plurality of carriers is provided. The apparatus includes a transmitter configured to transmit a control message including the terminal capability information, wherein the terminal capability information includes at least one IE indicating a DC capability.

In accordance with another aspect of the present disclosure, an apparatus for receiving terminal capability information in a communication system supporting a plurality of carriers is provided. The apparatus includes a receiver configured to receive a control message including the terminal capability information, wherein the terminal capability information includes at least one IE indicating a DC capability.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
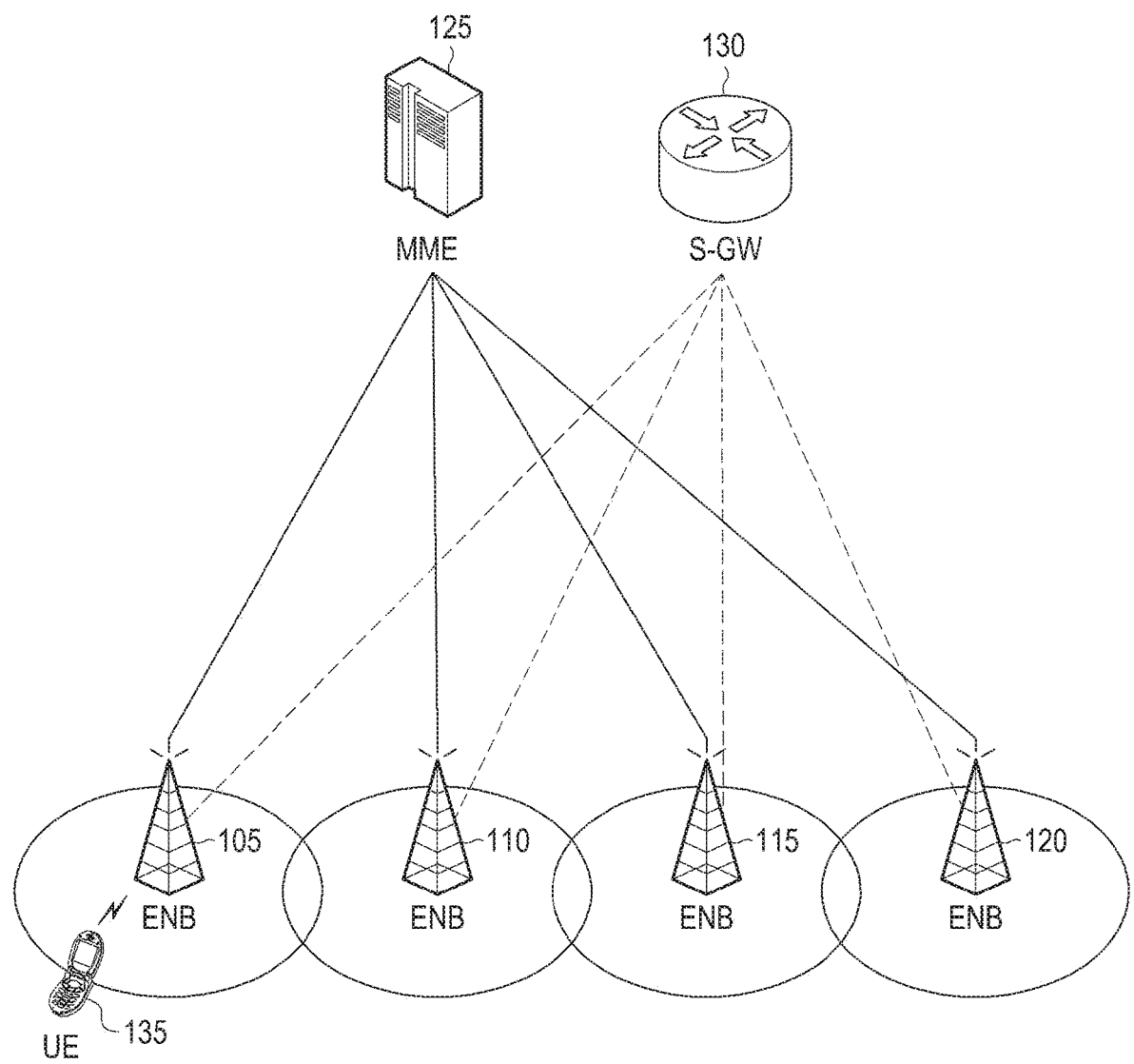
FIG. 1 schematically illustrates a structure of a long term evolution (LIE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments of the present disclosure only and is not intended to be limiting. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group (MPEG-1 or MPEG-2) Audio Layer III (MP3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a user equipment (UE) or a terminal may be an electronic device.

An embodiment of the present disclosure proposes a method and apparatus for transmitting/receiving a signal in a mobile communication system supporting a plurality of carriers.

An embodiment of the present disclosure proposes a method and apparatus for transmitting/receiving a signal based on an inter-evolved Node B (ENB) carrier aggregation (CA) scheme in a mobile communication system supporting a plurality of carriers.

An embodiment of the present disclosure proposes a method and apparatus for transmitting/receiving terminal capability information in a mobile communication system supporting a plurality of carriers.

An embodiment of the present disclosure proposes a method and apparatus for transmitting/receiving terminal capability information based on a band combination in a mobile communication system supporting a plurality of carriers.

An embodiment of the present disclosure proposes a method and apparatus for transmitting/receiving terminal capability information based on a cell in a mobile communication system supporting a plurality of carriers.

An embodiment of the present disclosure proposes a method and apparatus for transmitting/receiving terminal capability information per terminal or band combination in a mobile communication system supporting a plurality of carriers.

A method and apparatus proposed in various embodiments of the present disclosure may be applied to various communication systems such as a Long Term Evolution (LIE) system, an LIE-Advanced (LIE-A) system, a High Speed Downlink Packet Access (HSDPA) system, a High Speed Uplink Packet Access (HSUPA) system, a High Rate Packet Data (HRPD) system proposed in a 3rd Generation Project Partnership 2 (3GPP2), a Wideband Code Division Multiple Access (WCDMA) system proposed in the 3GPP2, a CDMA system proposed in the 3GPP2, an Institute of Electrical and Electronics Engineers (IEEE) 802.16m system, an Evolved Packet System (EPS), a Mobile Internet Protocol (Mobile IP) system, and/or the like.

Firstly, a structure of an LIE system according to an embodiment of the present disclosure will be described with reference to FIG. 1.

FIG. 1 schematically illustrates a structure of an LIE system according to an embodiment of the present disclosure.

Referring to FIG. 1, a radio access network of the LIE system includes ENBs 105, 110, 115, and 120, a mobility management entity (MME) 125, and a serving-gateway (S-GW) 130. Here, an ENB may be called a node B or a base station (BS). A terminal 135 accesses an external network through the ENBs 105, 110, 115, and 120, and the S-GW 130. Here, a terminal may be called a UE.

The ENBs 105, 110, 115 and 120 may correspond to a legacy node B in a universal mobile telecommunication system (UMTS). The ENBs 105, 110, 115 and 120 are connected with the terminal 135 through a wireless channel, and perform a more complex role than the legacy node B.

In the LIE system, since all user traffic including a real-time service such as a voice over IP (VoIP) service is serviced through a shared channel, there is a need for a device that collects status information such as buffer status, power headroom status, channel status, and the like of terminals, and performs a scheduling operation based on the collected status information, and the device may be the ENBs 105, 110, 115 and 120. Each of the ENBs 105, 110, 115 and 120 usually controls a plurality of cells. For example, in order to implement a transmission rate of 100 Mbps, the LIE system uses an orthogonal frequency division multiplexing (OFDM) scheme in a 20-MHz bandwidth as its radio access technology (RAT). In addition, the ENBs 105, 110, 115 and 120 use an adaptive modulation & coding (AMC) scheme for determining a modulation scheme and a channel coding rate according to the channel status of the terminal 135.

The S-GW 130, which is a device that provides a data bearer, generates or releases a data bearer under control of the MME 125. The MME 125, which is responsible not only for the mobility management function for the terminal 135 but also for a variety of control functions, may be connected to a plurality of ENBs.

A structure of an LIE system according to an embodiment of the present disclosure has been described with reference to FIG. 1, and a radio protocol structure in an LIE system according to an embodiment of the present disclosure will be described with reference to FIG. 2.

Figure 2:
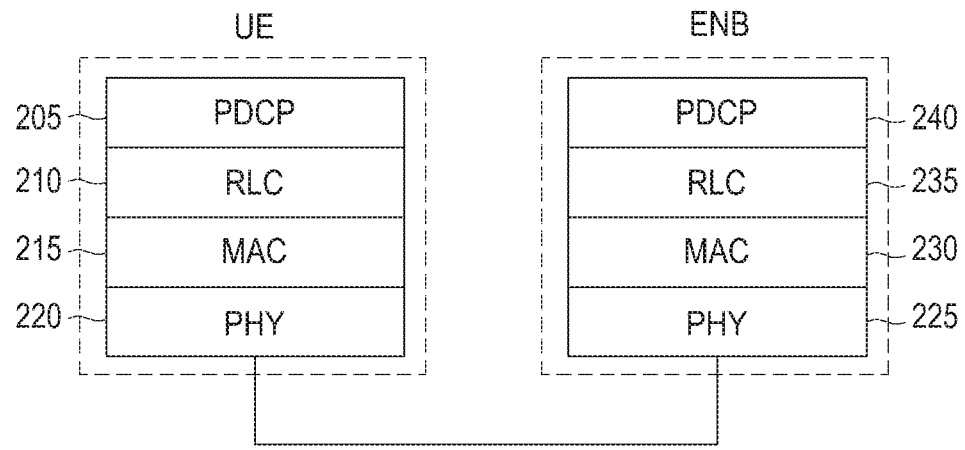
FIG. 2 schematically illustrates a radio protocol structure in an LIE system according to an embodiment of the present disclosure.

FIG. 2 schematically illustrates a radio protocol structure in an LIE system according to an embodiment of the present disclosure.

Referring to FIG. 2, in a radio protocol of an LIE system, a terminal and an ENB include packet data convergence protocol (PDCP) layer entities 205 and 240, radio link control (RLC) layer entities 210 and 235, and medium access control (MAC) layer entities 215 and 230, respectively.

The PDCP layer entities 205 and 240 perform operations such as an IP header compression/decompression operation, and the like, and the RLC layer entities 210 and 235 perform operations such as an operation of reconstructing PDCP protocol data units (PDUs) in a preset size, an automatic repeat request (ARQ) operation, and the like.

The MAC layer entities 215 and 230, which are connected to multiple RLC layer entities included in one terminal, perform an operation of multiplexing RLC PDUs in a MAC PDU, and demultiplexing RLC PDUs from a MAC PDU. Physical (PHY) layer entities 220 and 225 channel-code and modulate upper layer data to generate OFDM symbols, and transmit them through a wireless channel, or the PHY layer entities 220 and 225 demodulate and channel-decode OFDM symbols received through a wireless channel, and deliver them to their upper layers.

A radio protocol structure in an LIE system according to an embodiment of the present disclosure has been described with reference to FIG. 2, and an intra-ENB CA operation in an LIE system according to an embodiment of the present disclosure will be described with reference to FIG. 3.

Figure 3:
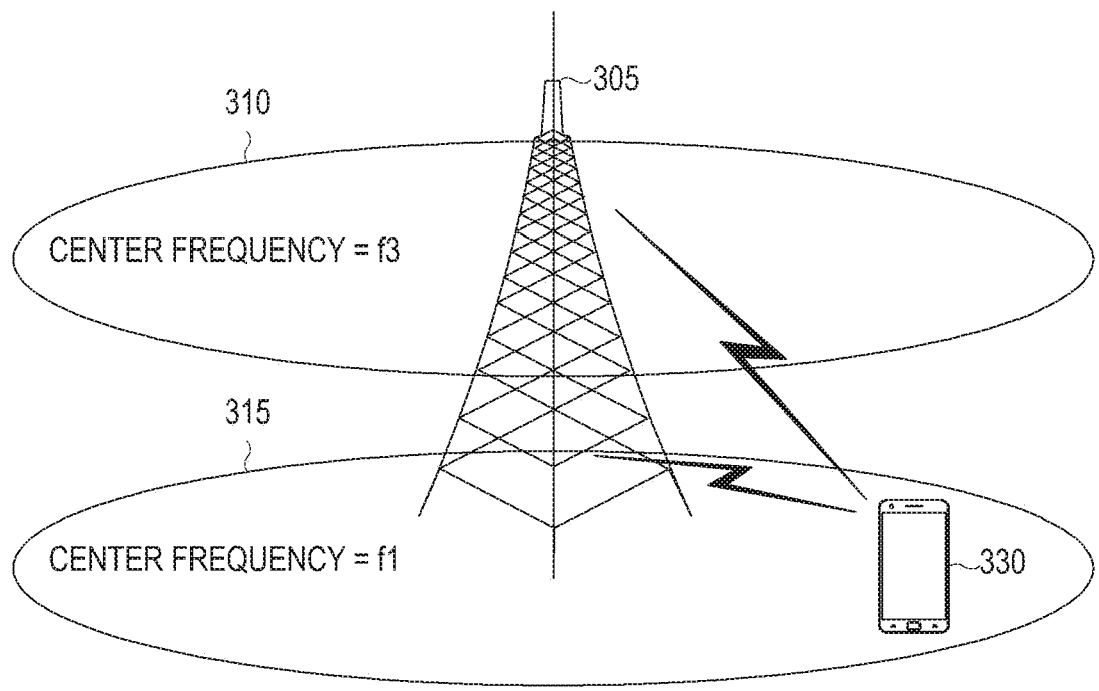
FIG. 3 schematically illustrates an intra-evolved Node B (ENB) carrier aggregation (CA) operation in an LIE system according to an embodiment of the present disclosure.

FIG. 3 schematically illustrates an intra-ENB CA operation in an LIE system according to an embodiment of the present disclosure.

Referring to FIG. 3, one ENB may generally transmit and receive multi carrier signals over a plurality of frequency bands. For example, when a carrier 315 with a downlink center frequency f1 and a carrier 310 with a downlink center frequency f3 are operated by an ENB 305, one terminal conventionally transmits and receives data using any one of the two carriers.

However, a terminal having a CA capability may transmit and receive data through a plurality of carriers at the same time. The ENB 305 may allocate more carriers to a terminal 330 having a CA capability depending on the situation, thereby increasing a transmission rate of the terminal 330.

This approach of aggregating a downlink carrier and uplink carriers in one ENB will be referred to as intra-ENB CA.

However, in some cases, there may be a need to aggregate downlink carriers and uplink carriers that are transmitted and received from/at different ENBs, unlike in the example shown in FIG. 3.

An intra-ENB CA operation in an LIE system according to an embodiment of the present disclosure has been described with reference to FIG. 3, and an inter-ENB CA operation in an LIE system according to an embodiment of the present disclosure will be described with reference to FIG. 4.

Figure 4:
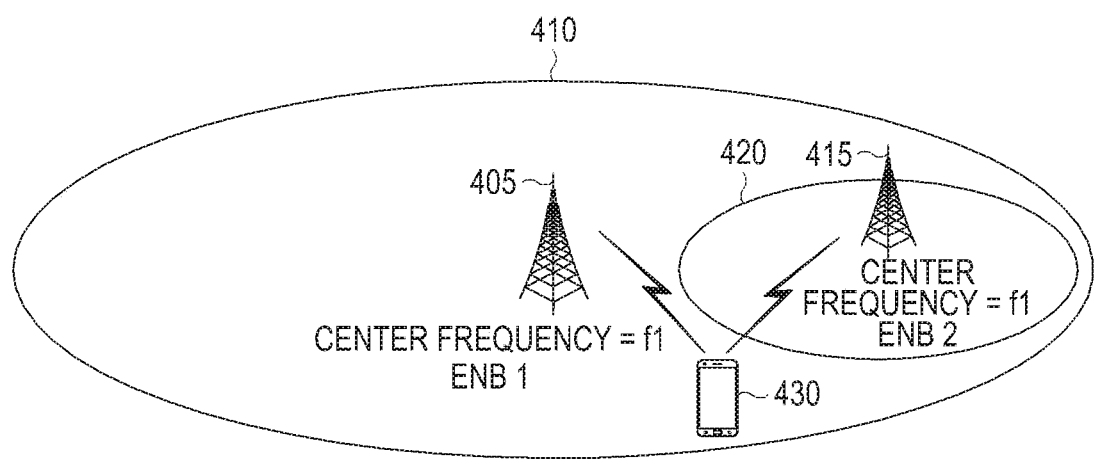
FIG. 4 schematically illustrates an inter-ENB CA operation in an LIE system according to an embodiment of the present disclosure.

FIG. 4 schematically illustrates an inter-ENB CA operation in an LIE system according to an embodiment of the present disclosure.

Referring to FIG. 4, when an ENB1 405 operates a carrier with a center frequency f1 and an ENB2 415 operates a carrier with a center frequency f2, a terminal 430 aggregates the carrier with the downlink center frequency f1 and the carrier with the downlink center frequency f2, leading to the results that one terminal aggregates carriers from two or more ENBs. Herein, this will be referred to as inter-ENB CA.

In an embodiment of the present disclosure, inter-ENB CA will be referred to as dual connectivity (DC). For example, the expression that DC is configured may refer to the expression that inter-ENB CA is configured; the expression that one or more cell groups are configured; the expression that a secondary cell group (SCG) is configured; the expression that at least one secondary serving cell (SCell), which is controlled by another ENB other than a serving ENB (SENB), is configured; the expression that a primary SCell (pSCell) is configured; the expression that a MAC layer entity for an SENB is established; the expression that two MAC layer entities are established in a terminal, and the like.

The terms used for describing various embodiments of the present disclosure will be described below.

In the traditional sense, when one downlink carrier that one ENB operates and one uplink carrier that the ENB operates constitute one cell, 'CA' may be construed as an operation in which a terminal transmits and receives data through a plurality of cells at the same time. In this case, the maximum transmission rate and the number of carriers aggregated may have a positive correlation.

In various embodiments of the present disclosure, the expression that a terminal receives data through any downlink carrier or transmits data through any uplink carrier has the same meaning as the expression that the terminal transmits and receives data using a control channel and a data channel that are provided by a cell corresponding to a center frequency and a frequency band characterizing the carrier.

In various embodiments of the present disclosure, CA will be expressed as 'a plurality of serving cells are configured', and the terms such as a PCell and an SCell or an enabled serving cell will be used. It will be noted that these terms may have the same meanings as those used in the LIE system. In various embodiments of the present disclosure, the terms such as a carrier, a component carrier and a serving cell will be interchangeably used.

In various embodiments of the present disclosure, a set of serving cells controlled by the same ENB will be defined as a cell group or a carrier group (CG). The cell group may be divided again into a master cell group (MCG) and a SCG.

The MCG refers to a set of serving cells controlled by an ENB that controls the PCell, i.e., a master ENB (MENB), and the SCG refers to a set of serving cells controlled by an ENB that controls only SCells other than the ENB controlling the PCell, i.e., a slave ENB (SENB). As to information about whether a specific serving cell belongs to an MCG or an SCG, an ENB provides the information to a terminal in a process of configuring a related serving cell.

One MCG and one or more SCGs may be configured for one terminal. In various embodiments of the present disclosure, it will be considered that one SCG is configured in one terminal for convenience purpose only, various embodiments of the present disclosure may be applied as it is, even though one or more SCGs are configured.

The PCell and SCell are the terms indicating a type of the serving cell, which is configured in the terminal. There are some differences between the PCell and the SCell. For example, while the PCell keeps an active status at all times, the SCell may alternate between an active status and an inactive status under instruction of an ENB. The terminal's mobility may be controlled on the basis of the PCell, and the SCell may be construed as an additional serving cell for data transmission/reception. In embodiments of the present disclosure, the PCell and SCell may refer to a PCell and an SCell, which are defined in the LIE standard 36.331 or 36.321.

In various embodiments of the present disclosure, a macro cell and a pico cell will be considered. The macro cell which is a cell controlled by a macro ENB provides a service in a relatively large area. On the other hand, a pico cell which is a cell controlled by an SENB provides a service in an area that is significantly narrower compared with the macro cell.

Although there is no strict criterion for distinguishing between the macro cell and the pico cell, it may be assumed that for example, an area of the macro cell may have a radius of about 500 meters and an area of the pico cell may have a radius of about tens of meters. In embodiments of the present disclosure, it will be noted that the pico cell and a small cell will be interchangeably used.

Referring to FIG. 4, if the ENB1 405 is an MENB and the ENB2 415 is an SENB, a serving cell 410 with a center frequency f1 is a serving cell belonging to an MCG and a serving cell 420 with a center frequency f2 is a serving cell belonging to an SCG.

In the following description, it will be noted that other terms instead of an MCG and an SCG may be used for better understanding. For example, terms such as a primary set and a secondary set, or a primary carrier group and a secondary carrier group may be used. However, in this case, it should be noted that though the terms are different, their meanings are the same. The main purpose of these terms is to determine whether a certain cell is controlled by an ENB that controls a PCell of a particular terminal, and an operating scheme of a terminal and a related cell may vary depending on whether or not the related cell is controlled by the ENB that controls the PCell of the particular terminal. Although one or more SCGs may be configured in a terminal, in embodiments of the present disclosure, it will be assumed that a maximum of one SCG is configured for convenience purpose only. An SCG may include a plurality of SCells, any one of which may have a special attribute.

In the typical intra-ENB CA, a terminal may transmit not only a hybrid ARQ (HARQ) feedback information and channel status information (CSI) for a PCell but also an HARQ feedback information and CSI for an SCell, through a physical uplink control channel (PUCCH) of the PCell. This is to apply a CA operation even to a terminal incapable of a simultaneous uplink transmission.

In the case of inter-ENB CA, it may be impossible in reality to transmit HARQ feedback information and CSI of Closed Subscriber Group (CSG) SCells through a PUCCH of a PCell. The HARQ feedback information should be delivered within an HARQ round trip time (RTT) (commonly 8 ms), since transmission delay between an MENB and an SENB may be longer than the HARQ RTT. Because of these problems, PUCCH transmission resources are allocated in one of SCells belonging to an SCG, and an HARQ feedback and CSI for SCG SCells are transmitted through the PUCCH. The SCell having the special attribute will be referred to as a pSCell.

In the following description, an inter-ENB CA will be interchangeably used with DC.

A connection structure of a PDCP layer entity in an LIE system according to an embodiment of the present disclosure will be described with reference to FIG. 5.

Figure 5:
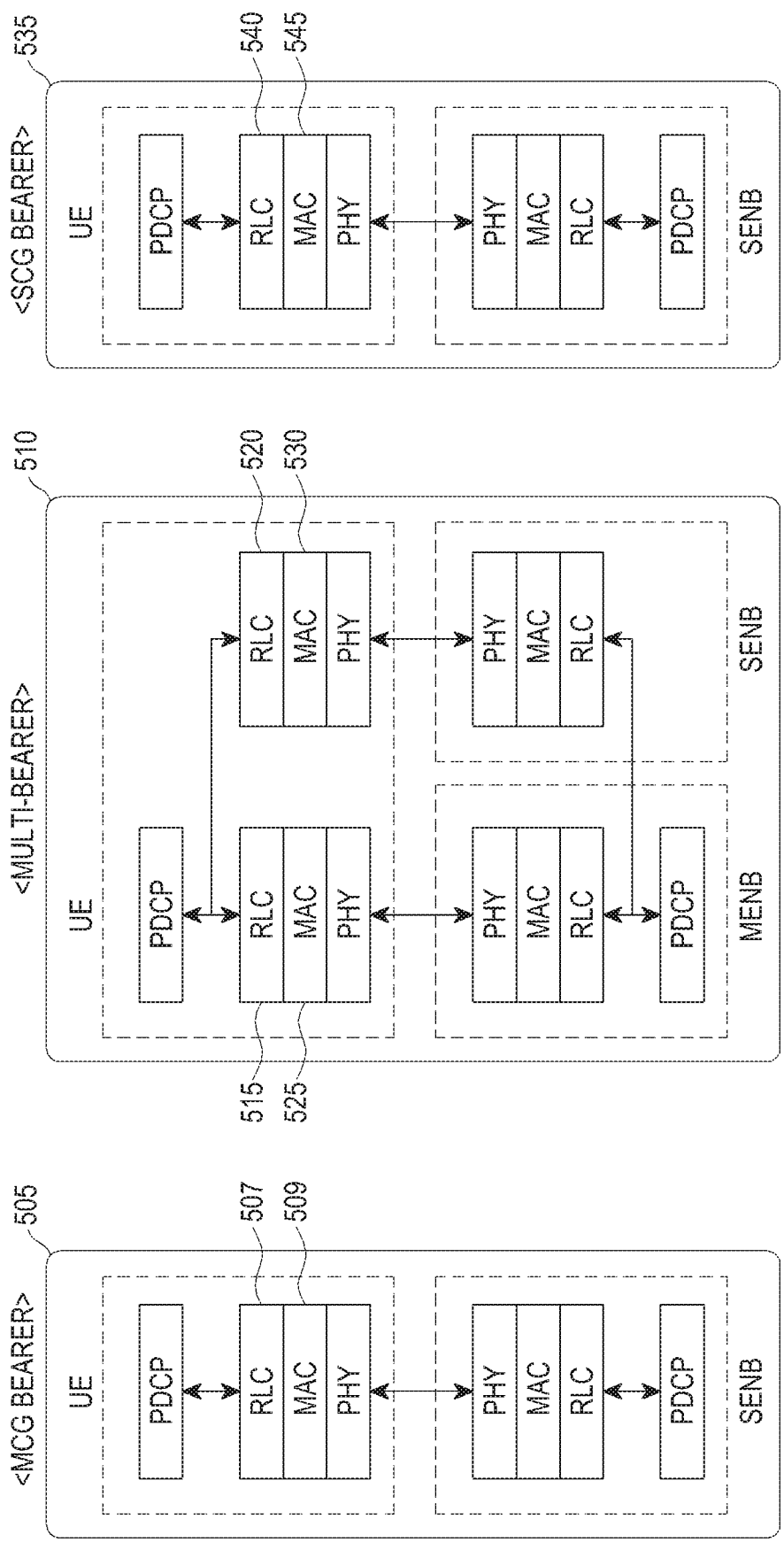
FIG. 5 schematically illustrates a connection structure of a packet data convergence protocol (PDCP) layer entity in an LIE system according to an embodiment of the present disclosure.

FIG. 5 schematically illustrates a connection structure of a PDCP layer entity in an LIE system according to an embodiment of the present disclosure.

Referring to FIG. 5, one user service is generally serviced by one EPS bearer, and one EPS bearer is connected to one radio bearer. A radio bearer includes a PDCP layer entity and an RLC entity. In an inter-ENB CA, data transmission/reception efficiency may be increased by deploying a PDCP layer entity and an RLC entity which correspond to one radio bearer at different ENBs each other.

At this time, there is need of different approaches according to a type of user service. For example, in a mass data service, a user service may establish two RLC layer entities to transmit/receive data with an MENB and an SENB as shown by reference numeral 510. In a service of which a quality of service (QoS) required criterion is strict such as a voice over LIE (VoLTE), the user service may transmit/receive data using a serving cell by including an RLC layer entity into only an MENB as shown by reference numeral 505. Alternatively, a user service may establish a bearer in order that data is transmitted/received using serving cells of an SENB as shown by reference numeral 535.

Hereinafter, for convenience of description, a bearer that data is transmitted/received through only a serving cell of an MENB as shown by reference numeral 505 will be referred to as an MCG bearer, a bearer as shown by reference numeral 510 will be referred to as a multi-bearer, and a bearer that data is transmitted/received through only a serving cell of an SENB will be referred to as an SCG bearer. A PDCP layer entity corresponding to an MCG bearer and an SCG bearer is connected to one RLC layer entity, and a PDCP layer entity corresponding to a multi-bearer is connected to two RLC layer entities.

In FIG. 5, the MCG bearer 505 includes layer entities corresponding to a terminal, and layer entities corresponding to an SENB. The layer entities corresponding to the terminal include a PDCP layer entity, an RLC layer entity 507, a MAC layer entity 509, and PHY layer entities. The layer entities corresponding to the SENB include a PHY layer entity, a MAC layer entity, an RLC layer entity, and a PDCP layer entity.

The multi-bearer 510 includes layer entities corresponding to a terminal, layer entities corresponding to an MENB, and layer entities corresponding to an SENB. The layer entities corresponding to the terminal include a PDCP layer entity; an RLC layer entity 515, a MAC layer entity 525, and a PHY layer entity for connecting with the MENB; and an RLC layer entity 520, a MAC layer entity 530, and a PHY layer entity for connecting with the SENB. The layer entities corresponding to the MENB include a PHY layer entity, a MAC layer entity, an RLC layer entity, and a PDCP layer entity. The layer entities corresponding to the SENB include a PHY layer entity, a MAC layer entity, and an RLC layer entity.

The SCG bearer 535 includes layer entities corresponding to a terminal, and layer entities corresponding to an SENB. The layer entities corresponding to the terminal include a PDCP layer entity, an RLC layer entity 540, a MAC layer entity 545, and a PHY layer entity. The layer entities corresponding to the SENB include a PHY layer entity, a MAC layer entity, an RLC layer entity, and a PDCP layer entity.

An RLC layer entity where data is transmitted and received through an MCG (or connected to a MAC layer entity related to serving cells of an MCG) will be referred to as an MCG RLC layer entity, and an RLC layer entity where data is transmitted and received through an SCG will be referred to as an SCG RLC layer entity. Each of the RLC layer entities 507 and 515 is an MCG RLC layer entity, and each of the RLC layer entities 520 and 540 is an SCG RLC layer entity. A MAC layer entity related to a data transmission/reception through an MSG will be referred to as an MCG-MAC layer entity, and a MAC layer entity related to a data transmission/reception through an SSG will be referred to as an SCG-MAC layer entity. Each of the MAC layer entities 509 and 525 is an MCG-MAC layer entity, and each of the MAC layer entities 530 and 545 is an SCG-MAC layer entity.

A MAC layer entity and an RLC layer entity are connected using a logical channel each other, a logical channel between an MCG RLC layer entity and an MCG-MAC layer entity will be referred to as an MCG logical channel, and a logical channel between an SCG RLC layer entity and an SCG-MAC layer entity will be referred to as an SCG logical channel.

Hereinafter, for convenience of description, it will be assumed that a macro cell area means an area where a small cell signal is not received and only a macro cell signal is received, and a small cell area means an area where a macro cell signal and a small cell signal are received together.

When a terminal with a large demand for downlink data moves from a macro cell area to a small cell area, a small cell may be additionally configured for the terminal, and a bearer having a large amount of downlink data like a file transfer protocol (FTP) among bearers which are established for the terminal may be reestablished from an MCG bearer to a multi-bearer or an SCG bearer. In other words, when a terminal moves from a macro cell area to a small cell area, and back to the macro cell area, a bearer which is established for the terminal is changed from an MCG bearer to a multi-bearer/SCG bearer, and back to the MCG bearer.

Hereinafter, for convenience of description, a bearer that data is transmitted and received through an MCG if an SCG/SENB is not configured, and some or all of the data is transmitted/received through an SCG if the SCG/SENB is configured will be referred to as an offload bearer. Here, a bearer reestablishment process may occur if an SENB is configured for a terminal, an SENB is released, or an SENB is changed. If the SENB is added, the offload bearer is reestablished from an MCG bearer from an SCG bearer or a multi-bearer. If the SENB is released, the offload bearer is reestablished from the SCG bearer or the multi-bearer to the MCG bearer. If the SENB is changed, the offload bearer is changed from the SCG bearer or the multi-bearer to other SCG bearer or multi-bearer.

Tables 1 and 2 show an operation of each layer entity in bearer reestablishment for each case.

In Tables 1 and 2, an old ENB denotes an ENB that transmits/receives all or some of data of an offload bearer before reestablishment for a bearer occurs, and a new ENB denotes an ENB that transmits/receives all or some of data of the offload bearer after the reestablishment for the bearer occurs.

An operation of each layer entity according to bearer reestablishment will be described with reference to Table 1.

TABLE 1

|  | SENB configuration | SENB release | SENB change |
|---|---|---|---|
| Old ENB operation | An MENB is an old ENB. The old ENB releases a PDCP layer entity and an RLC layer entity corresponding to an offload bearer, and reestablishes a MAC layer entity. | An SENB is an old ENB. The old ENB releases a PDCP layer entity and an RLC layer entity corresponding to an offload bearer, and releases a MAC layer entity. | An SENB which is not changed is an old ENB. The old ENB releases a PDCP layer entity and an RLC layer entity corresponding to an offload bearer, and releases a MAC layer entity. |
| New ENB operation | An SENB is a new ENB. The new ENB establishes a PDCP layer entity and an RLC layer entity corresponding to an offload bearer, and establishes a MAC layer entity. | An MENB is a new ENB. The new ENB establishes a PDCP layer entity and an RLC layer entity corresponding to an offload bearer, and reestablishes a MAC layer entity. | A changed SENB is a new ENB. The new ENB establishes a PDCP layer entity and an RLC layer entity corresponding to an offload bearer, and establishes a MAC layer entity. |
| Terminal operation | A terminal reestablishes a PDCP layer entity and an RLC layer entity corresponding to an offload bearer, establishes an SCG-MAC layer entity, and re-establishes an MCG-MAC layer entity. | A terminal reestablishes a PDCP layer entity and an RLC layer entity corresponding to an offload bearer, releases an SCG-MAC layer entity, and reestablishes an MCG-MAC layer entity. | A terminal reestablishes a PDCP layer entity and an RLC layer entity corresponding to an offload bearer, and reestablishes an SCG-MAC layer entity. |

Table 1 shows an operation related to SCG bearer reestablishment.

In Table 1, the expression that an old ENB reestablishes a MAC layer entity has the same meaning as the expression that the old ENB releases a logical channel for an offload bearer and a mapping relationship between the logical channel and a transport channel which the MAC layer entity manages. In Table 1, the expression that a new ENB reestablishes a MAC layer entity has the same meaning as the expression that the new ENB newly sets up a logical channel for an offload bearer, and defines a mapping relationship between the logical channel and a transport channel which the MAC layer entity manages. In Table 1, the expression that a terminal reestablishes an RLC layer entity has the same meaning as the expression that the terminal performs the following operation.

[A Terminal Operation in an RLC Layer Entity Reestablishment]

An operation of a receiving device:

The receiving device assembles data which is possible to be assembled among data stored in a reception buffer to deliver the assembled data to an upper layer entity.

The receiving device discards remaining data which is stored in the reception buffer, and initializes a timer and variables of an RLC layer entity. Here, the timer and variables follow the LIE standard 36.322, so a detailed description will be omitted herein.

An operation of a transmitting device:

The transmitting device discards all of data which is stored in a transmission buffer, and initializes a timer and variables.

Further, the expression that a terminal reestablishes a PDCP layer entity has the same meaning as the expression that the terminal performs the following operation.

[A Terminal Operation in a PDCP Layer Entity Reestablishment]

An operation of a receiving device:

The receiving device decrypts data which is delivered according to RLC layer entity reestablishment using an old security key.

The receiving device configures a decryption device thereby the decryption device uses a new security key if a decryption operation for the data has been completed.

An operation of a transmitting device:

The transmitting device configures an encryption device thereby the encryption device uses a new security key.

The expression that a terminal reestablishes an MCG-MAC layer entity in SENB configuration has the same meaning as the expression that the terminal releases a logical channel for an offload bearer to release a mapping relationship between the logical channel and a transport channel. The expression that the terminal reestablishes the MCG-MAC layer entity in the SENB configuration has the same meaning as the expression that selective buffer flush is performed in an HARQ buffer. The selective buffer flush will be described below, so a detailed description will be omitted herein.

The expression that a terminal configures an SENB in SENB configuration has the same meaning as the expression that the terminal setup a logical channel of an offload bearer to define a mapping relationship between the logical channel and a transport channel, triggers a buffer status report and a power headroom report, and transmits control information if an uplink transmission which is based on an SCG is possible.

The expression that a terminal releases an SCG-MAC layer entity in SENB release has the same meaning as the expression that the terminal releases a downlink buffer and an uplink buffer of the SCG-MAC layer entity, and performs an operation of canceling a random access process, a buffer status report process, a power headroom report process, and the like which are ongoing at a related timing point, and the like.

An operation of each layer entity according to bearer reestablishment will be described with reference to Table 2.

TABLE 2

| | SENB configuration | SENB release | SENB change |
|---|---|---|---|
| Old ENB operation | An MENB is an old ENB. The old ENB maintains a PDCP layer entity and an RLC layer entity corresponding to an offload bearer. | An SENB is an old ENB. The old ENB releases an S-RLC layer entity and an SCG-MAC layer entity corresponding to an offload bearer. | An SENB which is not changed is an old ENB. The old ENB releases an S-RLC layer entity and an SCG-MAC layer entity corresponding to an offload bearer. |
| New ENB operation | An SENB is a new ENB. The new ENB establishes an S-RLC layer entity and an SCG-MAC layer entity. | An MENB is a new ENB. The new ENB maintains a PDCP layer entity and an RLC layer entity corresponding to an offload bearer, and reestablishes a MAC layer entity. | A changed SENB is a new ENB. The new ENB establishes an S-RLC layer entity and an SCG-MAC layer entity. |
| Terminal operation | A terminal maintains a PDCP layer entity and an RLC layer entity corresponding to an offload bearer, and establishes an S-RLC layer entity and an SCG-MAC layer entity. | A terminal maintains a PDCP layer entity and a P-RLC layer entity corresponding to an offload bearer, and releases an S-RLC layer entity and an SCG-MAC layer entity. The terminal reestablishes an MCG-MAC layer entity. | A terminal maintains a PDCP layer entity and a P-RLC layer entity corresponding to an offload bearer, reestablishes an S-RLC layer entity, and reestablishes SCG-MAC layer entity. |

Table 2 shows an operation related to multi-bearer reestablishment.

A connection structure of a PDCP layer entity in an LIE system according to an embodiment of the present disclosure has been described with reference to FIG. 5, and an operation of a terminal and a network in a case that an SENB is configured or released in an LIE system according to an embodiment of the present disclosure will be described with reference to FIG. 6.

Figure 6:
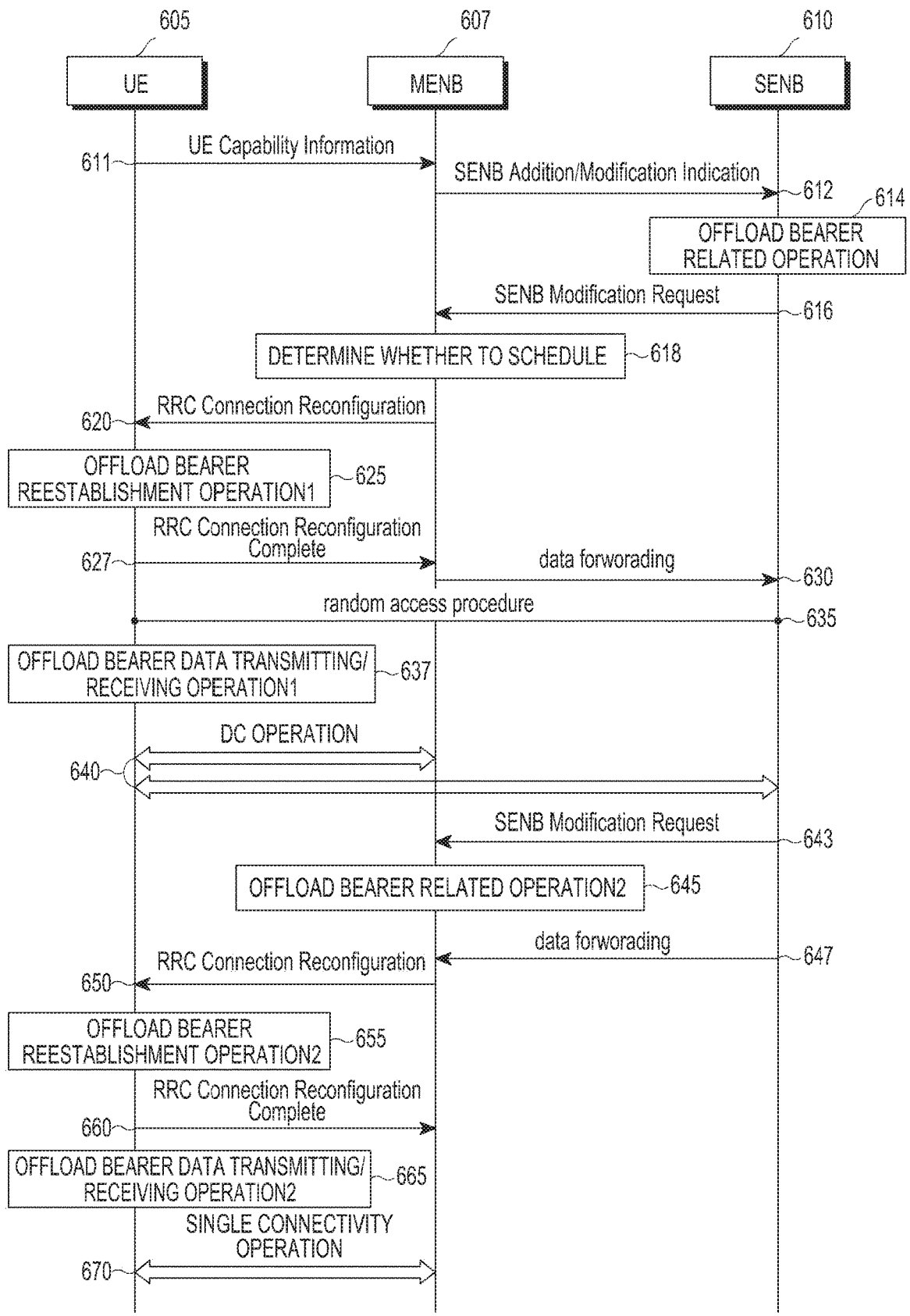
FIG. 6 schematically illustrates an operation of a terminal and a network in a case that a serving ENB (SENB) is configured or released in an LIE system according to an embodiment of the present disclosure.

FIG. 6 schematically illustrates an operation of a terminal and a network in a case that an SENB is configured or released in an LIE system according to an embodiment of the present disclosure.

Referring to FIG. 6, the LIE system includes a terminal 605, an MENB 607, and an SENB 610.

In the LIE system including the terminal 605, the MENB 607, and the SENB 610, the terminal 605 sets up a radio resource control (RRC) connection with the MENB 607, and reports terminal capability information related to capability of the terminal 605 according to an instruction of the MENB 607 at operation 611. The terminal capability information of the terminal 605 may be reported through a control message, for example, a UE capability information message, and include at least one information element (IE). It will be noted that the terms such information and an IE will be interchangeably used.

For example, the IE may be an IE indicating that the terminal 605 supports CA on which frequency bands (i.e., a SupportedBandCombination IE). The terminal 605 includes information about all band combinations which are related to the CA which the terminal supports into the SupportedBandCombination IE.

Further, per band combination reported in the SupportedBandCombination IE, an IE indicating whether to support DC in a related band combination, i.e., a DC support IE, and an IE indicating whether to support an SCG bearer/multi-bearer, i.e., an SCG bearer/multi-bearer support IE may be included in the UE capability information message. The DC support IE is reported for each band which satisfies a predetermined criterion. The UE capability information message may include a plurality of DC support IEs.

The UE capability information message includes only one SCG bearer/multi-bearer support IE. For example, it will be assumed that the terminal 605 reports a band combination as shown in Table 3 using the SupportedBandCombination IE.

TABLE 3

| | |
|---|---|
| Band combination 1 | One serving cell is supported in a band X. |
| Band combination 2 | Two serving cells are supported in a band X. |
| Band combination 3 | One serving cell is supported in a band X, and one serving cell is supported in a band Y. |
| Band combination 4 | Two serving cells are supported in a band X, and one serving cell is supported in a band Y. |
| Band combination 5 | One serving cell is supported in a band X, and two serving cells are supported in a band Y. |

For example, it will be assumed that a terminal implements a DC support IE with 3 bits, in this case, the terminal configures 1 bit-information indicating whether to support DC per band combination as shown in Table 4 to include the 1 bit-information into the UE capability information message. The DC support IE may be generated without considering a band combination where the DC is not applicable (e.g., a band combination where only one serving cell is configured or a band combination where a plurality of serving cells are configured on only the same band).

TABLE 4

| | |
|---|---|
| The first information indicating whether to support DC | Indicates that DC is supported in the first band combination that the DC is supportable (e.g., a band combination 3). |
| The second information indicating whether to support DC | Indicates that DC is supported in the second band combination that the DC is supportable (e.g., a band combination 4). |
| The third information indicating whether to support DC | Indicates that DC is supported in the third band combination that the DC is supportable (e.g., a band combination 5). |

Whether to support the DC may be variable per band combination, so the DC support IE is reported per band combination, however, information related to whether to support a bearer, i.e., the SCG bearer/multi-bearer support IE may be equally applied to all band combinations. A terminal that whether to support a bearer is equally applied to all band combinations that DC is supported generates only one SCG bearer/multi-bearer support IE as shown in Table 5 to include the SCG bearer/multi-bearer support IE into the control message (i.e., the UE capability information message).

In other words, a terminal which supports DC for one band combination may include the SCG bearer/multi-bearer support IE in Table 5 into the UE capability information message independent of the DC support IE.

As shown in Table 5, for example, the SCG bearer/multi-bearer support IE may be implemented with 2 bits, and indicate whether to support an SCG bearer and whether to support a multi-bearer.

TABLE 5

| The first bit included in an SGC bearer/multi-bearer support IE: indicates whether a terminal which supports DC in at least one band combination supports an SCG bearer in all band combinations that the DC is supported. | The second bit included in an SGC bearer/multi-bearer support IE: indicates whether a terminal which supports DC in at least one band combination supports a multi-bearer in all band combinations that the DC is supported. |
|---|---|

As shown in Table 5, if a value of only one of the 2 bits is set to "YES", i.e., a value indicating support (e.g., "1"), it means that a terminal supports only a related bearer. If values of all of the 2 bits are set to "YES", it means that the terminal supports all of two bearers.

Alternatively, the SCG bearer/multi-bearer support IE may indicate that a terminal supports an SCG bearer or a multi-bearer. In this case, the SCG bearer/multi-bearer support IE may be implemented with 1 bit, and may indicate that the terminal supports an SCG bearer or a multi-bearer according to the value of the 1 bit.

A terminal which reports that at least one among band combinations supports DC includes the SCG bearer/multi-bearer support IE into the UE capability information message if the terminal supports only an SCG bearer or multi-bearer.

On the other hand, a terminal which supports DC in at least one band does not include the SCG bearer/multi-bearer support IE into the UE capability information message if the terminal supports all of an SCG bearer and a multi-bearer.

A combination of DC support information and SCG bearer/multi-bearer support information per band combination may indicate terminal capability information as shown the following Table 6.

TABLE 6

Terminal capability information which is based on a combination of DC support information and SCG bearer/multi-bearer support information per band combination

| DC support information | SCG bearer/multi-bearer support information | Terminal capability information |
|---|---|---|
| Not present | Not present | A terminal does not support DC. |
| Present for at least one band combination | Support an SCG bearer | A terminal supports a DC operation through an SCG bearer in a band combination that DC is supported. |
| Present for at least one band combination | Support a multi-bearer | A terminal supports a DC operation through a multi-bearer in a band combination that DC is supported. |
| Present for at least one band combination | Not present | A terminal supports a DC operation through an SCG bearer and a DC operation through a multi-bearer in a band combination that DC is supported (however, the terminal may not support the SCG bearer and the multi-bearer at the same time). |

The expression that a terminal supports an SCG bearer has the same meaning as the expression that the terminal has a capability that the terminal uses two security keys, and determines to use one of the two security keys (e.g., the first security key for performing an encryption and decryption operation for MCG bearer data), and the other of the two security keys (e.g., the second security key for performing an encryption and decryption operation for SCG bearer data).

The expression that a terminal supports a multi-bearer has the same meaning as the expression that the terminal may connect one PDCP layer entity to two RLC layer entities to transmit/receive data.

A terminal which supports both an SCG bearer and a multi-bearer may report information indicating whether the terminal has completed an inter-operability test (IOT) for which one of the SCG bearer and the multi-bearer per band combination where DC is supported by the terminal. The IOT is a test which is performed between a terminal and a network, and it is desirable that only a function that the IOT has been performed is used. The IOT requires a terminal and a network which are implemented as a commercial level. If arbitrary functions are not implemented widely, the terminal may not the IOT even though the arbitrary functions are implemented in the terminal.

Particularly, for DC which is applied per band combination, if there is no network which actually uses a related band combination, or if the network only one of an SCG bearer and a multi-bearer even though there is a network which actually uses a related band combination, the terminal may not perform the IOT perfectly.

A situation that a terminal which supports the multi-bearer and the SCG bearer performs an IOT on only one of the multi-bearer and the SCG bearer for an arbitrary band combination, performs an IOT on only a bearer other than the bearer that the IOT is performed on the arbitrary band combination of the multi-bearer and the SCG bearer for another band combination, and performs an IOT on all of the multi-bearer and the SCG bearer may occur. At this time, if the terminal does not report an IOT situation per bearer to an ENB, the ENB may not know exactly that an IOT is performed for which bearer, so a limitation may occur for applying a DC operation.

The terminal may configure terminal capability information by reflecting an IOT situation as shown in the following Table 7.

TABLE 7

Terminal capability information that an IOT situation is reflected

| A terminal reporting to support DC and an SCG bearer for at least one band | A terminal reports that DC is not supported in a related band combination if an IOT is not completed for an SCG bearer in the related band combination even though the related band combination is a band combination that DC is supported. That is, if the DC is supported, the terminal reports that the DC is supported for only a band combination that an IOT for an SCG bearer has been completed. |
|---|---|
| A terminal reporting to support DC and a multi-bearer for at least one band | A terminal reports that DC is not supported in a related band combination if an IOT is not completed for a multi-bearer in the related band combination even though the related band combination is a band combination that DC is supported. That is, if the DC is supported, the terminal reports that the DC is supported for only a band combination that an IOT for a multi-bearer has been completed. |

TABLE 7-continued

Terminal capability information that an IOT situation is reflected

| A terminal reporting to support DC, and all of an SGC bearer and a multi-bearer for at least one band | For band combinations that DC is supported, a terminal reports information indicating whether to complete an IOT for an SCG bearer and whether to complete an IOT for a multi-bearer per band combination. That is, the terminal reports that a related band combination does not support DC if an IOT is not completed even though the DC is supported. |
|---|---|

Further, the terminal may report information indicating whether to support an asynchronous network operation using a UE capability information message.

A DC operation may be performed in a synchronous network or an asynchronous network. Here, the synchronous network denotes a network in which a distance between sub-frame boundaries for a downlink signal between serving cells is shorter than a predetermined criterion (e.g., 30 ms), and the asynchronous network denotes a network in which the distance between the sub-frame boundaries for the downlink signal between the serving cells is not restricted, so the sub-frame boundaries for two serving cells may be up to 500 ms away.

In the synchronous network, a capability of a signal storing device included in a receiving radio frequency (RF) circuit of a terminal is designed by considering relative small time difference (e.g., 30 micro seconds), however, in the asynchronous network, the capability of the signal storing device needs to be designed by considering up to 0.5 ms time difference. The terminal may be operable only in the synchronous network or in all of the synchronous network and the asynchronous network.

The expression that the terminal supports the asynchronous network has the same meaning as the expression that the terminal may perform a DC operation if time difference between sub-frame boundaries for a downlink signal of serving cells is within predetermined time.

All terminals which support a DC operation basically need to support an operation related to a synchronous network. The terminal does not need to report information indicating whether to support the synchronous network to an ENB.

Alternatively, the terminal does not support the asynchronous network, so the terminal needs to report information indicating whether to support the asynchronous network to the ENB. The terminal may generate the information indicating whether to support the asynchronous network per band combination by relating the information to an IOT.

An example of a process of generating terminal capability information related to DC in an LIE system according to an embodiment of the present disclosure will be described with reference to FIG. 7.

Figure 7:
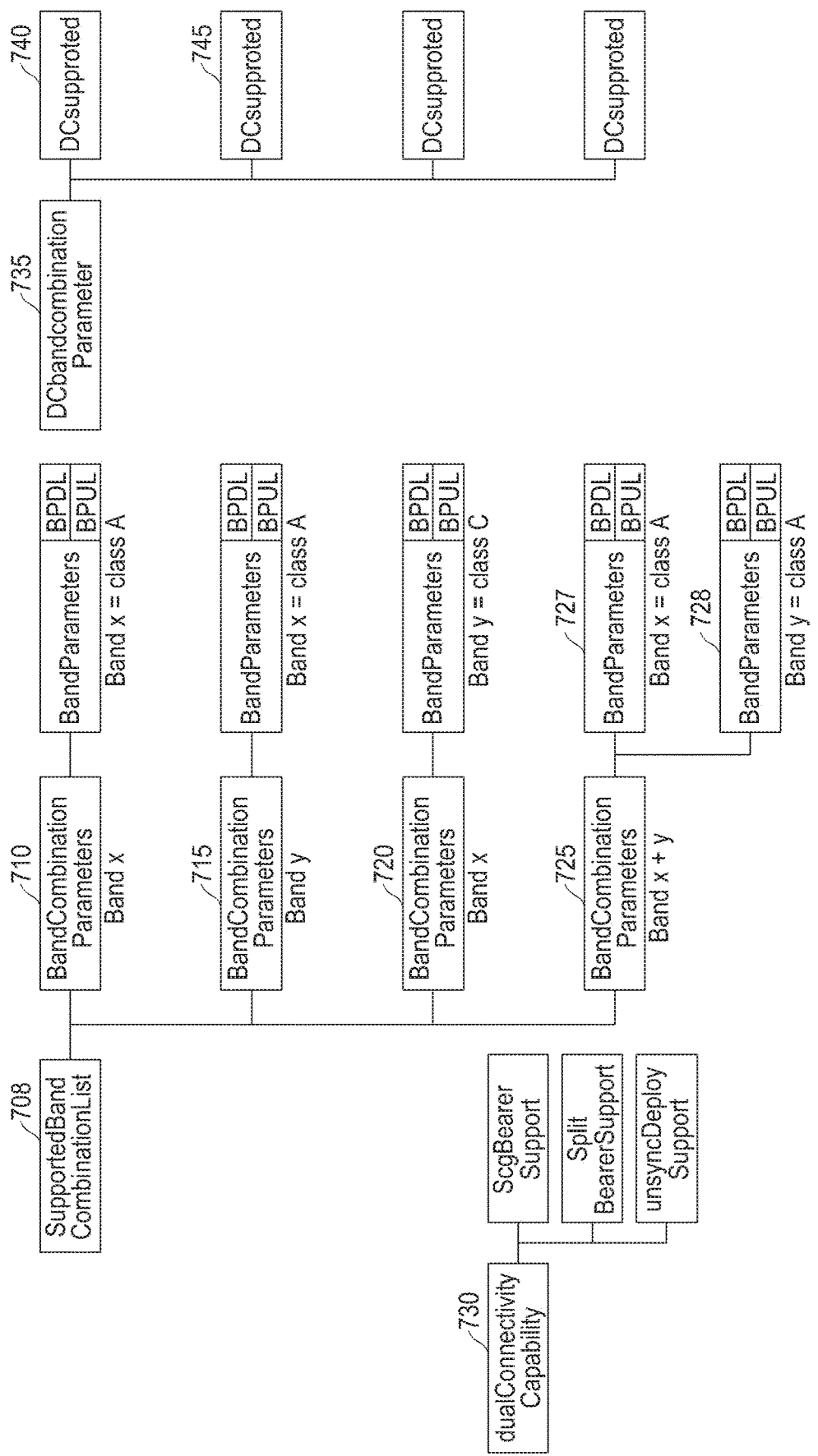
FIG. 7 schematically illustrates an example of a process of generating terminal capability information related to dual connectivity (DC) in an LIE system according to an embodiment of the present disclosure.

FIG. 7 schematically illustrates an example of a process of generating terminal capability information related to DC in an LIE system according to an embodiment of the present disclosure.

Referring to FIG. 7, in the terminal capability information, information indicating whether to support a multi-bearer, information indicating whether to support an SCG bearer, and the like are configured as per terminal, and information indicating whether to support DC is configured as per band combination.

The terminal capability information includes a SupportedBandCombinationList IE 708 indicating information about a band combination which a terminal supports, a DCbandcombinationParameter (BCP) IE 735 indicating information about a DC band combination, and a dualConnectivityCapability IE 730 indicating information about DC capability.

The SupportedBandCombinationList IE 708 includes BCP IEs 710, 715, 720, and 725 indicating information about at least one band combination parameter. A BCP IE indicates information about each band combination which a terminal supports. The BCP IE includes a BandParameters (BP) IE indicating information about one or more band parameters. The BP IE includes a FreqBandIndicator indicating information about a band, a BPdownlink (BPDL) IE, and a BPuplink (BPUL) IE 727 and 728.

The BPDL IE includes a bandwidthClass indicating the number of serving cells that a related band supports and antenna capability information. Here, a bandwidthClass A denotes capability that one serving cell which uses up to 20 MHz as a total bandwidth may be configured, a bandwidthClass B denotes capability that two serving cells may be configured and a total bandwidth is up to 20 MHz, and a bandwidthClass C denotes capability that two serving cells may be configured and a total bandwidth is up to 40 MHz.

The dualConnectivityCapability IE includes a ScgBearerSupport IE indicating whether a terminal supports an SCG bearer, a SplitBearerSupport IE indicating whether the terminal supports a multi-bearer, and an unsyncDeploySupport IE indicating whether the terminal supports an operation in an asynchronous network.

The unsyncDeploy Support IE indicates whether the terminal may perform a DC operation in two serving cells even though difference between an arbitrary downlink sub-frame (hereinafter, 'sub-frame x') of an arbitrary serving cell of the two serving cells and a sub-frame (hereinafter, 'sub-frame y') which is closest to the sub-frame x in a time domain among sub-frames of a serving cell different from the arbitrary serving cell is a predetermined value (e.g., 0.5 ms). That is, the unsyncDeploySupport IE indicates that the terminal may perform the DC operation in the sub-frame x and the sub-frame y even though a distance between a sub-frame boundary of the sub-frame x and a sub-frame boundary of the sub-frame y becomes up to 0.5 ms.

The DCBCP IE 735 includes at least one DCsupported IE, and the number of the DCsupported IEs is equal to the number of BCP IEs included in the SupportedBandCombinationList IE 708. Here, an arbitrary DCsupported IE corresponds to a BCP IE one-to-one according to an order. For example, the first DCsupported IE 740 is an IE for the first BCP IE 710 and the second DCsupported IE 745.

If the DCsupported IE indicates 'Yes', it means that a terminal supports DC in a band combination of a BCP IE which corresponds to the DCsupported IE and has completed an IOT for a DC operation in a related band. Here, details of the DC operation are indicated by the dualConnectivityCapability IE. That is, if the dualConnectivityCapability IE indicates that the SCG bearer and an operation in an asynchronous network are supported, it means that the operation for the band communication is supported and an IOT for the operation has been completed.

For another example, the number of DCsupported IEs may be equal to the number of BCP IEs which satisfy a predetermined criterion. The criterion relates to CA, and a BCP IE which satisfies the predetermined criterion includes at least two BP IEs or band entries. The BCP IE which satisfies the predetermined criterion may be a BCP IE that an uplink is set up for at least two band entries. Alternatively, the BCP IE which satisfies the predetermined criterion includes one band entry, and may indicate that a bandwidth class of the band entry configures at least two serving cells that an uplink is set up.

An example of a process of generating terminal capability information related to DC in an LIE system according to an embodiment of the present disclosure has been described with reference to FIG. 7, and another example of a process of generating terminal capability information related to DC in an LIE system according to an embodiment of the present disclosure will be described with reference to FIG. 8.

Figure 8:
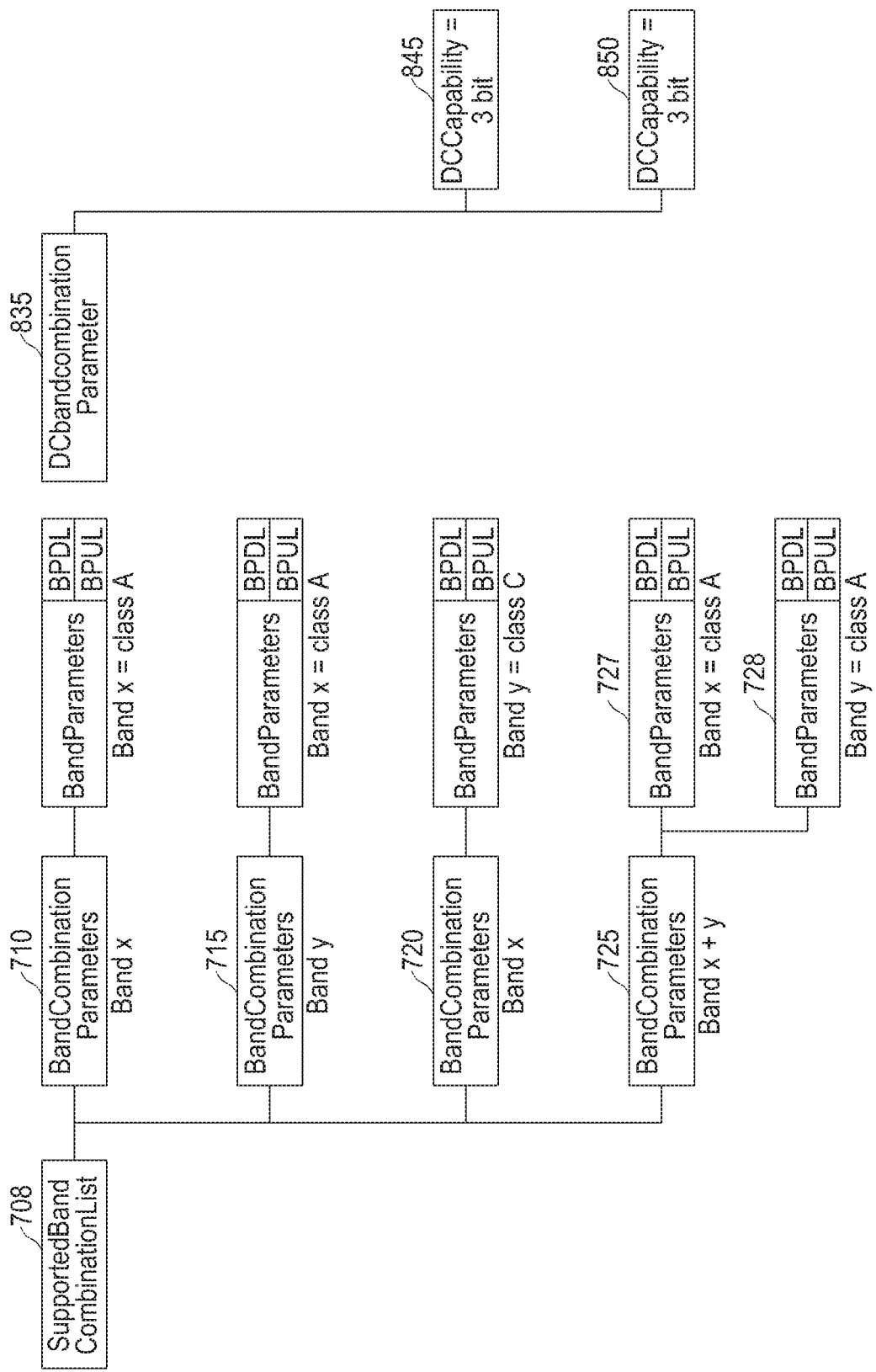
FIG. 8 schematically illustrates another example of a process of generating terminal capability information related to DC in an LIE system according to an embodiment of the present disclosure.

FIG. 8 schematically illustrates another example of a process of generating terminal capability information related to DC in an LIE system according to an embodiment of the present disclosure.

Referring to FIG. 8, information indicating whether to support a multi-bearer, information indicating whether to support an SCG bearer, and the like are signaled per band combination.

The terminal capability information includes a SupportedBandCombinationList IE 708 indicating information about a band combination which a terminal supports, and a dualConnectivityCapability IE 830 indicating DC capability information.

The DCBCP IE 835 includes at least one DCCapability IEs 845 and 850 indicating DC capability. The number of DCCapability IEs included in the DCBCP IE 835 is equal to the number of BCP IEs which satisfy a predetermined criterion.

The predetermined criterion relates to CA, and a BCP IE which satisfies the predetermined criterion includes at least two BP IEs or at least two band entries.

The BCP IE which satisfies the predetermined criterion may be a BCP IE that an uplink is set up for at least two band entries. Alternatively, if a bandwidth class of the band entry configures at least two serving cells that an uplink is set up, the BCP IE which satisfies the predetermined criterion may include one band entry. The BCP IE which satisfies the predetermined criterion includes at least two band entries.

Meanwhile, a DCCapability IE corresponds to a BCP IE which satisfies the criterion one-to-one. For example, the DCCapability IE 845 corresponds to the BCP IE 720, and the DCCapability IE 850 corresponds to the BCP IE 725.

The DCCapability IE includes three IEs, the first IE including information indicating whether to support an SCG bearer and whether to complete an TOT, the second IE including information indicating whether to support a multi-bearer and whether to complete an TOT, and the third IE including information indicating whether to support an operation for an asynchronous network and whether to complete an IOT. That is, if the first IE indicates support of the SCG bearer and completion of the TOT, it means that a terminal supports an SCG bearer in a related band combination, and has completed an IOT.

Meanwhile, a DC operation includes an operation of transmitting a PUCCH signal in two serving cells. Upon supporting DC in an arbitrary band combination, a terminal needs to report to an ENB that the terminal may transmit a PUCCH signal in which serving cell of the band combination. If the number of band entries included in a band combination large and a bandwidth class is high, more various band combinations may be configured.

If the terminal reports which band combination is supported for all of the various band combinations, a signaling overhead may become serious. For example, in a case that there is a band combination that 2 serving cells may be configured in a band X, there is a band combination that 2 serving cells may be configured in a band Y, and there is a band combination that 1 serving cell may be configured in a band Z, if the terminal selects 2 serving cells among the 5 serving cells, the number of cases that the terminal may report is 20. The terminal requires 20 bits for indicating that a PUCCH transmission is supported in which band combination among 20 band combinations. For example, if it is considered that a terminal reports to support which band combination for up to 128 band combinations, it may be difficult for the terminal to accept this overhead.

An embodiment of the present disclosure does not consider all band combinations, but defines a band combination which may be used commonly, and relates whether to support a dual connectivity (DC) operation and whether to support the band combination. That is, upon reporting to support a DC operation in an arbitrary band combination, a terminal supports a PUCCH signal transmission (or PUCCH set up) in serving cells corresponding to a 'two-serving cell basic combination' among 'two-serving cell combinations' which are derived from the arbitrary band combination. If the terminal supports a PUCCH signal transmission in at least one band combination other than the two serving cell-basic combination, the terminal reports to support the PUCCH signal transmission in the at least one band combination other than the two serving cell-basic combination using a new signaling.

The two-serving cell basic combination (hereinafter, a 'basic combination') may be differently defined according to the number of band entries, and this will be described below.

(1) A Basic Combination for a Band Combination with One Band Entry

All two-serving cell combinations are basic combinations. For example, if an arbitrary BCP IE includes one band entry, and a bandwidth class of the band entry indicates that up to 3 serving cells are supportable, possible band combinations includes [cell 1+cell 2], [cell 1+cell 3], [cell 2+cell 3], and PUCCH set up is possible in all of the 3 band combinations.

(2) A Basic Combination for a Band Combination with Two or More Band Entries

All band combinations including a serving cell of a band entry and a serving cell of other band entry different from the band entry are included in a basic combination. For example, in a band combination including a band X and a band Y, all two-serving cell combinations including a serving cell of the band X and a serving cell of the band Y are basic combinations. That is, all band combinations except for a band combination including serving cells included in one band entry are basic combinations.

As described above, if there is one band entry, basic capability is that a terminal transmits a PUCCH signal in two serving cells which are configured in one band (or that a PUCCH is set up in two serving cells). A basic capability for a band combination with two or more band entries is that a terminal transmits a PUCCH signal in only one serving cell in one band (or that a PUCCH is set up in one serving cell).

If a terminal tries to perform a DC operation, the terminal needs to configure two serving cell groups. If the terminal supports DC in an arbitrary band combination, the terminal needs to report to an ENB that the terminal may configure which serving cells of the band combination as the same serving cell group.

Meanwhile, a size of a message which defines all possible band combinations and reports whether to support each of all possible band combinations becomes significantly large, so an embodiment of the present disclosure defines basic capability according to a predetermined criterion. The expression that an arbitrary terminal supports DC in a predetermined band combination has the same meaning as the expression that the arbitrary terminal supports the DC and the basic capability at the same time.

A basic capability may be differently defined for a case that there is one band entry and a case that there are two or more band entries, and this will be described below.

(1) A Basic Capability for a Band Combination with One Band Entry

A basic capability for a band combination with one band entry is to support all cases that serving cells are configured as two groups. For example, if an arbitrary BCP IE includes one band entry, and a bandwidth class of the band entry indicates that up to 3 serving cells are supportable, all of a case that a cell 1 is configured as one group and a cell 2 and a cell 3 are configured as the other group (hereinafter, '[cell 1, cell 2+cell 3]'), a case that a cell 1 and a cell 2 are configured as one group and a cell 3 is configured as the other group, and a case that a cell 1 and a cell 3 are configured as one group and a cell 2 is configured as the other group are supported. That is, a basic capability for a band combination with one band entry means that it is supported that two serving cells are configured in one band entry.

(2) A Basic Capability for a Band Combination with Two or More Band Entries

A basic capability for a band combination with two or more band entries is to support all cases except for a case that serving cells of one band entry are configured as two serving cell groups. For example, a basic capability of a band combination including bands x, y, and z is to support a case that serving cells of the band x are configured as one cell group and serving cells of the bands y and z are configured as the other cell group, a case that serving cells of the bands x and y are configured as one cell group and serving cells of the band z are configured as the other cell group, and a case that serving cells of the bands x and z are configured as one cell group and serving cells of the band y are configured as the other cell group, except for a case that some of the serving cells of the band x are configured as one cell group and the remaining serving cells of the band x and the serving cells of the bands y and z are configured as the other cell group, and the like.

Meanwhile, configuration of a serving cell group and a transmission of two PUCCH signals may be configured as one unit capability.

For example, if a terminal reports to support DC in an arbitrary band combination, that is, if the terminal reports terminal capability information including a DCsupported IE 740 for the arbitrary band combination, the terminal supports a DC basic capability for the arbitrary band combination.

The DC basic capability means a capability that the terminal may configure two cell groups which satisfy a predetermined criterion and transmit a PUCCH signal in each of the two cell groups.

A DC basic capability for an arbitrary band combination may be differently defined according to the number of band entries of the arbitrary band combination.

(1) A DC Basic Capability for a Band Combination with One Band Entry

For a band combination with one band entry, a terminal may configure two cell groups based on a combination of cells which satisfy a criterion A, and set up a PUCCH in any one of serving cells that an uplink is set up among serving cells included in each cell group to transmit a PUCCH signal. The criterion A may be satisfied if a serving cell group is configured such that an uplink is set up in at least one serving cell. An example of a DC basic capability in an LIE system according to an embodiment of the present disclosure will be described with reference to FIG. 9.

Figure 9:
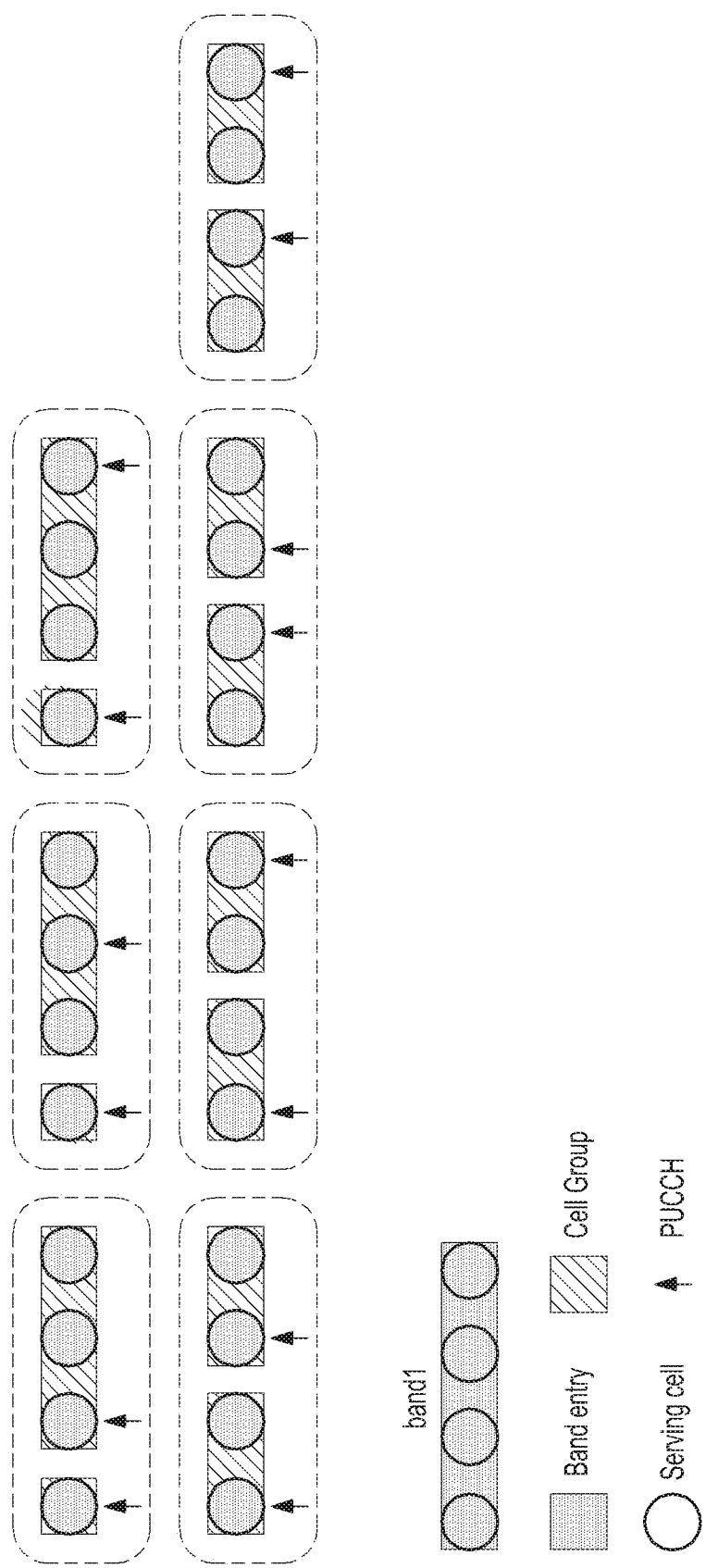
FIG. 9 schematically illustrates an example of DC basic capability in an LIE system according to an embodiment of the present disclosure.

FIG. 9 schematically illustrates an example of DC basic capability in an LIE system according to an embodiment of the present disclosure.

Referring to FIG. 9, for example, for a band entry that up to 4 serving cells may be configured, a DC basic capability means that all of 7 cases that two serving cell groups are configured are supported as shown in FIG. 9.

In FIG. 9, it will be assumed that an uplink is set up in all serving cells. For example, in FIG. 9, it will be assumed that a bandwidth class is a bandwidth class indicating that all of a downlink bandwidth class and an uplink bandwidth class support 4 serving cells.

(2) A DC Basic Capability for a Band Combination with at Least Two Band Entries

A DC basic capability for a band combination with at least two band entries means that a cell group is configured for all band combinations which satisfy the following criteria in configuration of two cell groups.

A) Serving cells included in the same band are not included in different cell groups one another. That is, one cell group is associated with one or more band entries and the band entries associated with the one cell group are not associated with another cell group.

B) An uplink is set up in at least one serving cell of each cell group. That is, if one cell group is associated with n band entries, at least one band entry is a band entry that a BPUL IE is configured.

C) A PUCCH set up/PUCCH signal transmission is possible in one serving cell of each cell group.

Meanwhile, a DC basic capability for an arbitrary band combination may be defined as the following.

(1) If a DCsupported IE for an arbitrary band combination is included (or a DCsupported IE is signaled), and the arbitrary band combination is configured with one band entry, a DC basic capability of a terminal for the arbitrary band combination is to configure two cell groups for the arbitrary band combination in order that a criterion D is satisfied. That is, the terminal supports two cell groups that are configured in order that the criterion D is satisfied. The criterion D may be defined as the following.

<Criterion D>

For a related band entry (or a band indicated by a related band entry), if two cell groups are configured and serving cells included in each cell group are continuous one another in a frequency domain, a criterion D is satisfied.

Assuming that serving cells of which indexes are contiguous one another are serving cells that are continuous one another in a frequency domain, for example, a serving cell 1 and a serving cell 2 are continuous each other in the frequency domain, so a frequency band of the serving cell 1 and a frequency band of the serving cell 2 are continuous except for a guard band.

Another example of DC basic capability in an LIE system according to an embodiment of the present disclosure will be described with reference to FIG. 21.

Figure 21:
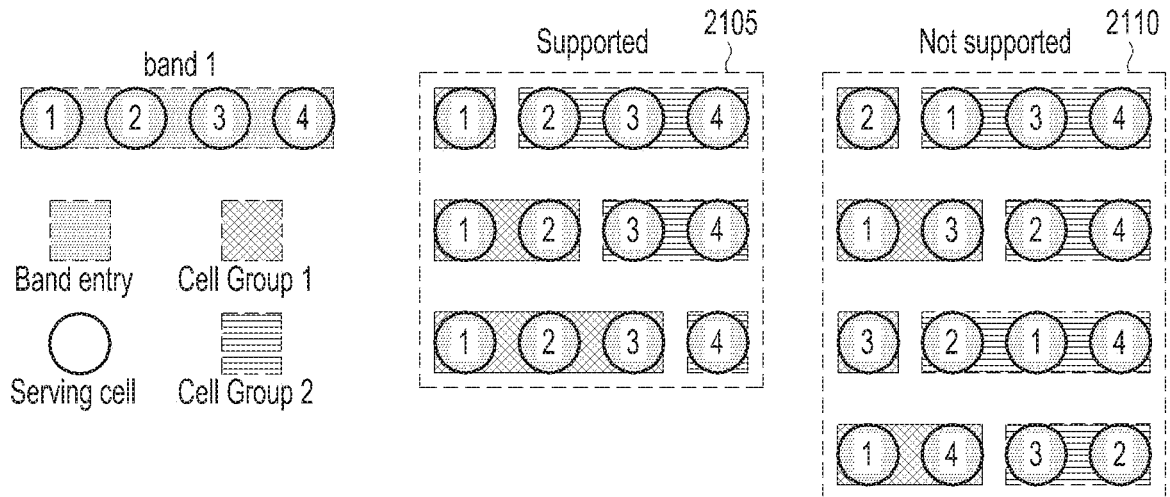
FIG. 21 schematically illustrates another example of DC basic capability in an LIE system according to an embodiment of the present disclosure.

FIG. 21 schematically illustrates another example of DC basic capability in an LIE system according to an embodiment of the present disclosure.

Referring to FIG. 21, an operation of configuring two cell groups, for example, an operation of configuring cell 1 as one cell group and configuring cells 2, 3, and 4 as the other cell group satisfies a criterion D as shown by reference numeral 2105. However, an operation of configuring two cell groups, for example, an operation of configuring the cell 2 as one cell group and configuring the cells 1, 3, and 4 as the other cell group does not satisfy the criterion D as shown by reference numeral 2110.

(2) If a DCsupported IE for an arbitrary band combination is included (or a DCsupported IE is signaled), and the arbitrary band combination is configured with two band entries, a DC basic capability of a terminal for the arbitrary band combination is to configure two cell groups for the arbitrary band combination in order that a criterion E is satisfied. That is, the terminal supports two cell groups that are configured in order that the criterion E is satisfied. The criterion E may be defined as the following.

<Criterion E>

If one cell group is configured for each band entry (or each band indicated by a related band entry), a criterion E is satisfied.

Still another example of DC basic capability in an LIE system according to an embodiment of the present disclosure will be described with reference to FIG. 22.

Figure 22:
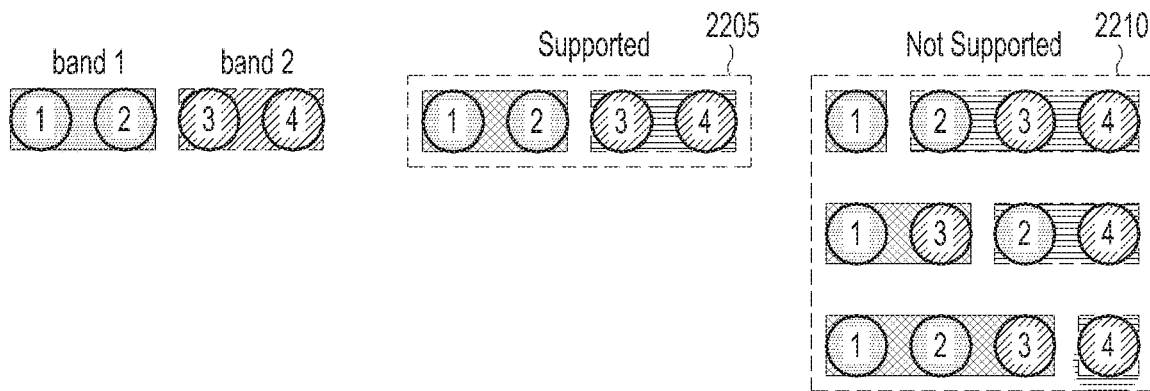
FIG. 22 schematically illustrates another example of DC basic capability in an LIE system according to an embodiment of the present disclosure.

FIG. 22 schematically illustrates still another example of DC basic capability in an LIE system according to an embodiment of the present disclosure.

Referring to FIG. 22, an operation of configuring two cell groups, for example, an operation of configuring cells 1 and 2 included in a band 1 as one cell group and configuring cells 3 and 4 included in a band 2 as the other cell group satisfies a criterion E as shown by reference numeral 2205. However, an operation of configuring two cell groups, for example, an operation of configuring the cell 1 as one cell group and configuring the cells 2, 3 and 4 as the other cell group does not satisfy the criterion E as shown by reference numeral 2210.

In a case that the number of band entries is greater than or equal to 2, a scheme of reporting a cell group capability in a terminal will be described below.

If the number of band entries is greater than or equal to 2, a serving cell or a carrier of one band entry belongs to only one cell group. That is, the serving cell/carrier of the one band entry does not belong to two or more serving cell groups. For example, if the number of band entries is 2, the number of possible cell group combinations is 1.

If the number of band entries is greater than or equal to 3, the number of possible cell group combinations becomes greater than or equal to 2, that is, there are a plurality of possible cell group combinations, and a terminal may support some of the plurality of possible cell group combinations.

If a terminal supports only a synchronous operation in a related band combination, the terminal supports all of cell group combinations. However, if the terminal supports only an asynchronous operation in the related band combination, the terminal may support only some of the cell group combinations.

Further, a terminal uses an indicator or a bitmap for indicating whether to support an asynchronous operation per band combination. Hereinafter, for convenience of description, the indicator for indicating whether to support the asynchronous operation will be referred to as an asynchronous operation support indicator. For example, the asynchronous operation support indicator may be implemented with one bit, and the bitmap may be implemented with at least two bits. Here, the number of bits included in the bitmap is not limited.

The asynchronous operation support indicator will be described below.

A terminal indicates whether to support an asynchronous operation for a band combination with one or two band combinations by including the asynchronous operation support indicator or by not including the asynchronous operation support indicator. For example, if the asynchronous operation support indicator is included, an asynchronous operation is supported for a related band combination. If the asynchronous operation support indicator is not included, an asynchronous operation is not supported for a related band combination.

For a band combination with three or more band combinations, a terminal indicates that all of possible cell group combinations are supported in a related band combination by including the asynchronous operation support indicator, indicates that some of possible cell group combinations are supported in a related band combination by including the bitmap, or does not indicate that an asynchronous operation is not supported in a related band combination by not including the asynchronous operation support indicator and the bitmap.

This will be described below.

For a band combination of which the number of band entries is greater than or equal to 3, if a terminal supports some of all possible cell group combinations, the terminal indicates which cell group combination among the possible cell group combinations is supported based on a bitmap which is defined according to a predetermined rule.

For example, possible cell group combinations for a band combination including three band entries including a band A, a band B, and a band C will be followed.

A possible cell group combination 1: [A cell group including a carrier/serving cell of the band A, and a cell group including a carrier/serving cell of the bands B and C]

A possible cell group combination 2: [A cell group including a carrier/serving cell of the bands A and B, and a cell group including a carrier/serving cell of the band C]

A possible cell group combination 3: [A cell group including a carrier/serving cell of the band B, and a cell group including a carrier/serving cell of the bands A and C]

In this case, a terminal indicates which cell group combination among the possible cell group combinations is supported based on a bitmap of 3 bits.

If the number of band entries is 4, there may be 7 possible cell group combinations, and the terminal indicates which cell group combination among the possible cell group combinations is supported based on a bitmap of 7 bits.

A possible cell group combination 1: [A cell group including a carrier/serving cell of the band A, and a cell group including a carrier/serving cell of the bands B, C, and D]

A possible cell group combination 2: [A cell group including a carrier/serving cell of the bands A and B, and a cell group including a carrier/serving cell of the bands C and D]

A possible cell group combination 3: [A cell group including a carrier/serving cell of the bands A and C, and a cell group including a carrier/serving cell of the bands B and D]

A possible cell group combination 4: [A cell group including a carrier/serving cell of the bands A and D, and a cell group including a carrier/serving cell of the bands B and C]

A possible cell group combination 5: [A cell group including a carrier/serving cell of the bands A, B, and C, and a cell group including a carrier/serving cell of the band D]

A possible cell group combination 6: [A cell group including a carrier/serving cell of the bands A, B, and D, and a cell group including a carrier/serving cell of the band C]

A possible cell group combination 7: [A cell group including a carrier/serving cell of the bands A, C, and D, and a cell group including a carrier/serving cell of the band B]

If the number of band entries is 5, there may be 15 possible cell group combinations, and the terminal indicates which cell group combination among the possible cell group combinations is supported based on a bitmap of 15 bits.

A possible cell group combination 1: [A cell group including a carrier/serving cell of the band A, and a cell group including a carrier/serving cell of the bands B, C, D, and E]

A possible cell group combination 2: [A cell group including a carrier/serving cell of the bands A and B, and a cell group including a carrier/serving cell of the bands C, D, and E]

A possible cell group combination 3: [A cell group including a carrier/serving cell of the bands A and C, and a cell group including a carrier/serving cell of the bands B, D, and E]

A possible cell group combination 4: [A cell group including a carrier/serving cell of the bands A and D, and a cell group including a carrier/serving cell of the bands B, C, and E]

A possible cell group combination 5: [A cell group including a carrier/serving cell of the bands A and E, and a cell group including a carrier/serving cell of the bands B, C, and D]

A possible cell group combination 6: [A cell group including a carrier/serving cell of the bands A, B, and C, and a cell group including a carrier/serving cell of the bands D and E]

A possible cell group combination 7: [A cell group including a carrier/serving cell of the bands A, B, and D, and a cell group including a carrier/serving cell of the bands C and E]

A possible cell group combination 8: [A cell group including a carrier/serving cell of the bands A, B, and E, and a cell group including a carrier/serving cell of the bands C and D]

A possible cell group combination 9: [A cell group including a carrier/serving cell of the bands A, C, and D, and a cell group including a carrier/serving cell of the bands B and E]

A possible cell group combination 10: [A cell group including a carrier/serving cell of the bands A, C, and E, and a cell group including a carrier/serving cell of the bands B and D]

A possible cell group combination 11: [A cell group including a carrier/serving cell of the bands A, D, and E, and a cell group including a carrier/serving cell of the bands B and C]

A possible cell group combination 12: [A cell group including a carrier/serving cell of the bands A, C, D, and E, and a cell group including a carrier/serving cell of the band B]

A possible cell group combination 13: [A cell group including a carrier/serving cell of the bands A, B, D, and E, and a cell group including a carrier/serving cell of the band C]

A possible cell group combination 14: [A cell group including a carrier/serving cell of the bands A, B, C, and E, and a cell group including a carrier/serving cell of the band D]

A possible cell group combination 15: [A cell group including a carrier/serving cell of the bands A, B, C, and D, and a cell group including a carrier/serving cell of the band E]

To sum up, a terminal generates capability information shown in the following Table 8 according to the number of band entries to report the generated capability information to an ENB.

TABLE 8

Indication of whether to support a cell group combination according to the number of band entries

| The number of band entries | Asynchronous operation support indicator | Bitmap | |
|---|---|---|---|
| 1 | Possible to be included | Not included | If an asynchronous operation support indicator for a related band combination is included, it is possible to configure 2 cell groups using serving cell/carriers included in a related band entry, and it means that all mapping relationships between a serving cell and a serving cell group. At this time, an asynchronous operation is supported between the 2 cell groups. If the asynchronous operation support indicator for the related band combination is not included, it means that the asynchronous operation is not supported for the related band combination. |
| 2 | Possible to be included | Not included | If an asynchronous operation support indicator for a related band combination is included, it is possible to configure the first cell group using a serving cell/carrier of one band entry, and the second cell group using serving cells included in another band entry. At this time, an asynchronous operation is supported between the 2 cell groups. If the asynchronous operation support indicator for the related band combination is not included, it means that the asynchronous operation is not supported for the related band combination. |
| 3 | Possible to be included | Possible to include a 3 bit-bitmap | If an asynchronous operation support indicator for a related band combination is included and a bitmap for the related band combination is not included, all possible cell group combinations are supported and an asynchronous operation is supported between 2 cell groups. If the bitmap for the related band combination is included, a cell group combination specified in the bitmap is supported and the asynchronous operation is supported between the 2 cell groups. If the asynchronous operation support indicator and the bitmap for the related band combination are not included, the asynchronous operation is not supported. |
| 4 | Possible to be included | Possible to include a 7 bit-bitmap | |
| 5 | Possible to be included | Possible to include a 15 bit-bitmap | |

Another example of DC basic capability in an LIE system according to an embodiment of the present disclosure will be described with reference to FIG. 10.

Figure 10:
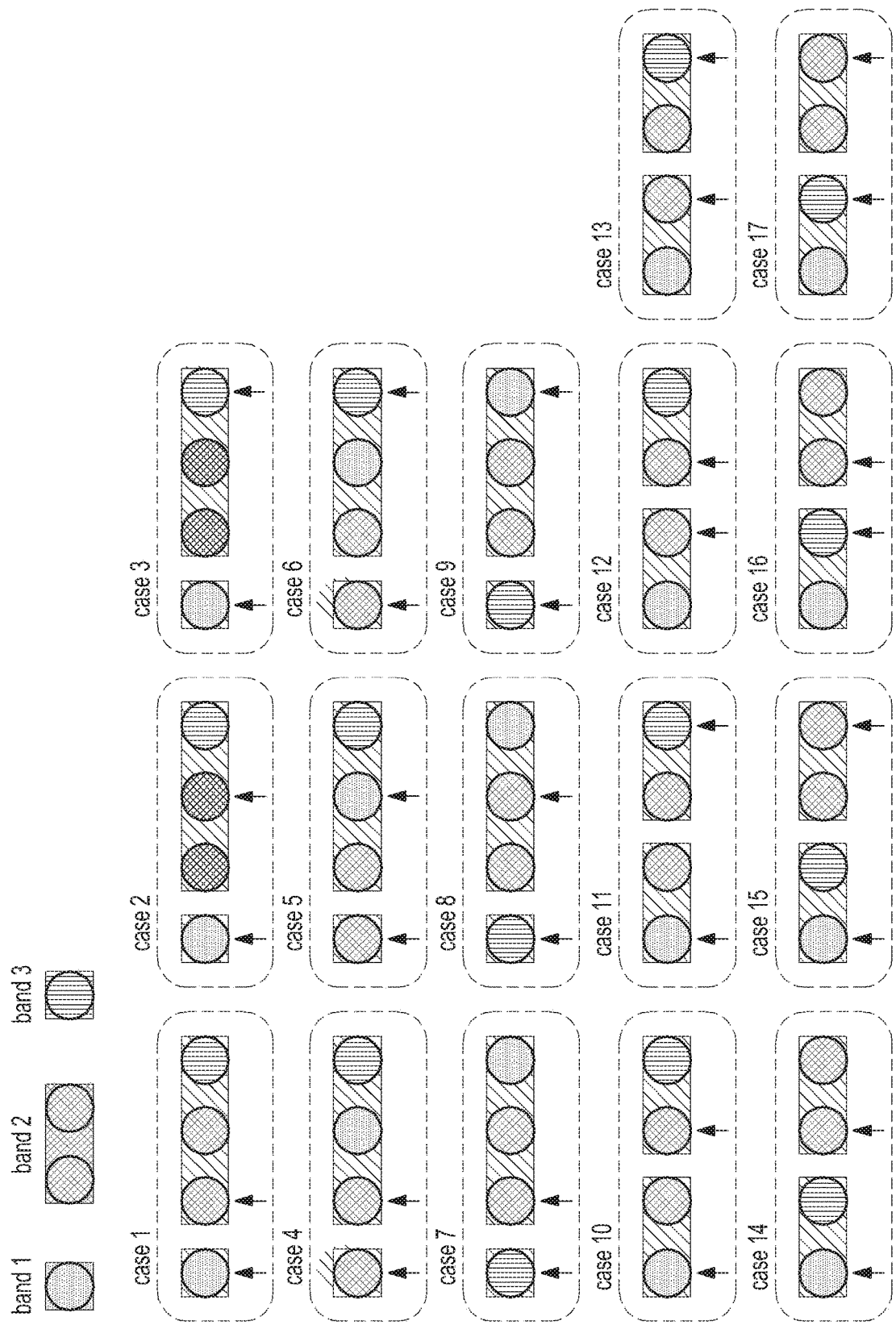
FIG. 10 schematically illustrates another example of DC basic capability in an LIE system according to an embodiment of the present disclosure.

FIG. 10 schematically illustrates another example of DC basic capability in an LIE system according to an embodiment of the present disclosure.

Referring to FIG. 10, total 17 cases from a case 1 to a case 17 may be configured for a band combination including 3 bands and 4 serving cells, cases 4, 5, 6, 10, 11, 12, and 13 do not belong to DC basic capability, and remaining cases belong to the DC basic capability.

As described above, a DC basic capability for a band combination with one band entry is a capability that a terminal may set up a PUCCH and transmit a PUCCH signal in two serving cells configured in the band, and a DC basic capability for a band combination with two or more band entries (or a band combination which is configured with two or more bands) is a capability that the terminal may set up a PUCCH and transmit a PUCCH signal in one serving cell configured in each band entry (or a band) (that is, the terminal may set up the PUCCH and transmit the PUCCH signal in different bands), and the terminal may set up a PUCCH and transmit a PUCCH signal in total two band entries (or bands).

For example, if a DCsupported IE indicates 'True' for an arbitrary band combination, a DC basic capability is supported in the arbitrary band combination. The number of DCsupported IEs is equal to the number of BCP IEs (refer to the LIE standard 36.331) of a supportedBandCombination IE (refer to the LIE standard 36.331) and the number of BCP IEs (refer to the LIE standard 36.331) of a supportedBand-CombinationAdd IE (refer to the LIE standard 36.331), and a DCsupported IE firstly corresponds to a BCP IE of the supportedBandCombination IE and corresponds to a BCP IE of the supportedBandCombinationAdd IE according to a stored order.

For example, if the supportedBandCombination IE includes n BCP IEs, and the supportedBandCombination-Add IE includes m BCP IEs, the first DCsupported IE corresponds to the first band combination of the supported-BandCombination IE, and the nth DCsupported IE corresponds to the last band combination of the supportedBand-Combination IE. The [n+1]th DCsupported IE corresponds to the first band combination of the supportedBandCombi-nationAdd IE, and the [n+m]th DCsupported IE corresponds to the last band combination of the supportedBandCombi-nationAdd IE.

Further, terminal capability information is transmitted according to a request of an ENB. If an arbitrary terminal sets up an RRC connection, the ENB tries to acquire capability information of the terminal from an MME.

If the ENB does not acquire the capability information of the terminal from the MME, the ENB transmits a predetermined control message to the terminal to instruct the terminal to transmit a UE capability information message. The control message includes information indicating whether there is a need for a capability information report for which RAT. Upon receiving an instruction of a capability information report related to an evolved universal terrestrial radio access (E-UTRA) system, the terminal generates a UE capability information message including information indicating whether to support DC, information indicating a supported band combination, and the like to transmit the UE capability information message to the ENB at operation 611.

The ENB appropriately connects an E-UTRA communication of the terminal based on the capability of the terminal, and performs a data transmitting/receiving operation. Upon determining that the terminal sufficiently reaches a small cell and a traffic demand of the terminal is sufficiently large at an arbitrary timing point, the ENB determines to configure an additional small cell for the terminal. If the terminal reaches the small cell within a preset range, it may be determined that the terminal sufficiently reaches the small cell, and if traffic quantity of the terminal is greater than or equal to preset traffic quantity, it may be determined that the traffic demand of the terminal is sufficiently large.

The MENB 607 transmits an SENB addition/modification indication message to the SENB 610 at operation 612. The SENB addition/modification indication message includes current configuration information of a terminal (e.g., AS-config, refer to the LIE standard 36.331), configuration information of an EPS bearer which is configured for the terminal, configuration information which is requested to an SENB, and the like. For example, the configuration information which is requested to the SENB may include information indicating which bearer among EPS bearers which are currently established will be offloaded to the SENB, information indicating a type of bearer which is desirable for the offload bearer of an SCG bearer and a multi-bearer, and the like.

Upon receiving the SENB addition/modification indication message, the SENB 610 determines whether to accept a request corresponding to the requested configuration information. The SENB 610 may determine whether to accept the request by considering current load situation, characteristics of a bearer which is requested to offload, and the like. Upon determining to accept the request, the SENB 610 selects serving cells to be allocated to the terminal 605, and determines information related to the serving cell, for example, frequency information of the serving cell (e.g., evolved absolute RF channel number (EARFCN), refer to the LIE standard 36.331), physical cell identification (PCI) information of the serving cell (refer to the LIE standard 36.331), downlink related information of the serving cell (e.g., downlink bandwidth information, downlink HARQ feedback channel configuration information, and the like), uplink related information of the serving cell (e.g., uplink bandwidth information, PUCCH configuration information, and the like), and the like.

The SENB 610 performs an operation related to an offload bearer at operation 614. If the offload bearer is established as an SCG bearer, the SENB 610 establishes a PDCP layer entity and an RLC layer entity for the SCG bearer. If the offload bearer is established as a multi-bearer, the SENB 610 establishes an RLC layer entity for the multi-bearer. Further, the SENB 610 establishes a MAC layer entity for the offload bearer.

The SENB 610 generates an SENB modification request message, and transmits the SENB modification request message to the MENB 607 at operation 616. The SENB modification request message includes information related to a serving cell to be added to the terminal 605, information related to offload bearer establishment, and the like.

Upon receiving the SENB modification request message, the MENB 607 determines whether to schedule according to a type of offload bearer at operation 618. If the offload bearer is an SCG bearer, the MENB 607 stops a downlink data transmission for the offload bearer. If the offload bearer is a multi-bearer, the MENB 607 does not stop and continue the downlink data transmission for the offload bearer.

The MENB 607 additionally configures a small cell for the terminal 605, and transmits an RRC connection reconfiguration message in order to reestablish the offload bearer at operation 620. The RRC connection reconfiguration message includes SCell configuration information and offload bearer information. The SCell configuration information is for the newly added SCell, and includes information indicating whether the SCell is an MCG SCell or an SCG SCell. The offload bearer information is for a radio bearer which is reestablished from an MCG bearer to an SCG bearer or a multi-bearer, and includes identification (ID) information of the radio bearer, a type of offload bearer (e.g., an SCG bearer or a multi-bearer), information shown in Table 9, and the like.

TABLE 9

| Control information included in an RRC connection reconfiguration message in a case that a bearer is reestablished from an MCG bearer to an SCG bearer | Control information included in an RRC connection reconfiguration message in a case that a bearer is reestablished from an MCG bearer to a multi-bearer |
|---|---|
| PDCP configuration information: information related to PDCP layer entity establishment of an SCG bearer (PDCP-config, refer to the LTE standard 36.331). If the PDCP configuration information is not included, old PDCP configuration information is reused. Security key information: information necessary for generating a security key to be used in an SCG bearer. One terminal may have two security keys, one being used for data encryption/decryption of an MCG bearer and a multi-bearer, the other being used for data encryption/decryption of an SCG bearer. RLC configuration information: information related to RLC layer entity establishment of an SCG bearer (RLC-config, refer to the LTE standard 36.331). If the RLC configuration information is not included, old RLC configuration information is reused. | PDCP additional configuration information: information related to a reordering operation for a multi-bearer. The PDCP additional configuration information is different from PDCP configuration information. For example, if a missed PDCP packet is detected, timer information related to maximum time for which a related bearer needs to wait until the missed PDCP packet is received included herein. RLC configuration information: information related to SCG-RLC layer entity establishment of among RLC layer entities of a multi-bearer. If the RLC configuration information is not included, MCG-RLC configuration information is applied. |
| Information included regardless of a type of reestablished bearer Logical channel configuration information: logical channel configuration information for an SCG bearer or a multi-bearer (LogicalChannelConfig, refer to the LTE standard 36.331) MAC configuration information: MAC configuration information for a data transmission/reception of an SCG bearer or a multi-bearer and various MAC layer entity operations (MAC-mainConfig, refer to the LTE standard 36.331) | |

Table 9 shows offload bearer reestablishment information.

Upon receiving the RRC connection reconfiguration message, the terminal 605 performs an offload bearer reestablishment operation at operation 625. Here, a terminal which supports all of an SCG bearer and a multi-bearer performs one of two operations shown in Table 10 according to a bearer indicated in the RRC connection reconfiguration message.

TABLE 10

| A case that a bearer is reestablished from an MCG bearer to an SCG bearer | A case that a bearer is reestablished from an MCG bearer to a multi-bearer |
|---|---|
| Stop an offload bearer uplink transmission A terminal stops an uplink transmission of an offload bearer to be reestablished to an SCG bearer. Specially, the terminal does not reflect uplink data of the offload bearer in a buffer status report, and does not consider the uplink data of the offload bearer in a logical channel prioritization process (refer to the LTE standard 36.321). PDCP reconfiguration If PDCP configuration information is included in a received control message and the PDCP configuration | Maintain an offload bearer uplink transmission A terminal continues an uplink data transmission through an MCG-RLC layer entity. Resume a PDCP reordering operation A terminal initiates a PDCP reordering operation for PDCP packets from a PDCP packet which is firstly received after an SCG-RLC layer entity has been established. For example, upon detecting a missed PDCP packet after a timing point at |

TABLE 10-continued

| A case that a bearer is reestablished from an MCG bearer to an SCG bearer | A case that a bearer is reestablished from an MCG bearer to a multi-bearer |
|---|---|
| information is different from old PDCP configuration information, a terminal newly reestablishes a current PDCP layer entity based on the received PDCP configuration information. If the criterion is not satisfied, the PDCP reconfiguration is not performed. PDCP reestablishment If PDCP reconfiguration is performed, a PDCP layer entity reestablishment process is not performed. If the PDCP reconfiguration is not performed, a terminal performs the PDCP layer entity reestablishment process. RLC reestablishment A terminal stops a current RLC layer entity operation, and performs an RLC layer entity reestablishment procedure. SCG-MAC layer entity configuration A terminal establishes an SCG-MAC layer entity that will perform a data transmitting/receiving operation of an SCG bearer and a MAC layer entity operation of SCG serving cells according to control information included in MAC configuration information, and connects a logical channel of the SCG bearer to the SCG-MAC layer entity. MCG-MAC reestablishment A terminal releases a connection with a logical channel of an SCG bearer in an MCG-MAC layer entity. The terminal stops a transmission for a MAC PDU which data of an offload bearer is stored among MAC PDUs stored in an uplink HARQ buffer, and discards the MAC PDU. | which the PDCP packet is received, the terminal stores PDCP packets next to the missed PDCP packet in a PDCP buffer for a predetermined interval. And, the terminal reorders received PDCP packets upon receiving the missed PDCP packet, and delivers the reordered PDCP packets to an upper layer entity. SCG-RLC establishment A terminal connects with a PDCP layer entity after establishing an SCG-RLC layer entity. The terminal maintains an operation of an MCG-RLC layer entity. SCG-MAC establishment A terminal establishes an SCG-MAC layer entity that will perform a data transmitting/receiving operation of an SCG bearer and a MAC layer entity operation of SCG serving cells according to control information included in MAC configuration information, and connects a logical channel of the SCG bearer to the SCG-MAC layer entity. Maintain MCG-MAC layer entity operation |

Table 10 shows an offload bearer reestablishment operation 1, i.e., an offload bearer reestablishment operation which a terminal supporting all of an SCG bearer and a multi-bearer performs according to a bearer indicated in an RRC connection reconfiguration message.

Upon completing the offload bearer reestablishment operation and the SCell addition operation, the terminal 605 transmits an RRC control message, i.e., an RRC connection reconfiguration complete message to the MENB 607 to report that the offload bearer reestablishment operation and the SCell addition operation have been completed at operation 627. Upon receiving the RRC connection reconfiguration complete message, the MENB 607 forwards data of the offload bearer to the SENB 610 at operation 630. For all of the reestablishment to the SCG bearer and the reestablishment to the multi-bearer, the MENB 607 forwards downlink PDCP SDUs from the first downlink PDCP SDU that an RLC layer entity does not confirm a successful transmission to the SENB 610. In the reestablishment to the SCG bearer, the MENB 607 forwards uplink PDCP SDUs which are successfully received in an RLC layer entity to the SENB 610.

The terminal 605 performs a random access operation in a PSCell among the newly added SCG SCells independent of the procedure of reporting that the offload bearer reestablishment operation and the SCell addition operation have been completed at operation 635. The terminal 605 synchronizes with the newly added SCG SCells using the random access operation and sets uplink transmit power. After completing the random access operation, the terminal 605 sets the PSCell as an active state, and performs an offload bearer data transmitting/receiving operation at operation 637. The terminal 605 performs one of two operations shown in Table 11 according to a type of established bearer.

TABLE 11

| A case that a bearer is reestablished from an MCG bearer to an SCG bearer | A case that a bearer is reestablished from an MCG bearer to a multi-bearer |
|---|---|
| Resume a downlink data reception of an SCG bearer in a PSCell Upon receiving a PDCP packet through an SCG bearer, a terminal compares a serial number of the PDCP packet and a serial number of each of PDCP packets stored in a PDCP buffer, and delivers PDCP packets of which serial numbers are less than the serial number of the PDCP packet to an upper layer entity until all of the PDCP packets stored in the PDCP buffer are delivered to the upper layer entity. Resume an uplink data transmission of an SCG bearer in a PSCell A terminal resumes an uplink data transmission of an SCG bearer. Specially, the terminal reflects uplink data of the SCG bearer in a buffer status report, and considers the uplink data of the SCG bearer in a logical channel prioritization process (refer to the LTE standard 36.321). PDCP status report A terminal generates a PDCP status report message using PDCP serial numbers of PDCP packets stored in a PDCP buffer, and transmits the generated PDCP status report message to an SENB through an SCG bearer. The PDCP status report message is a PDCP control message for reporting reception status of a PDCP SDU using a PDCP serial number and a bitmap. The PDCP status report message will be described below. | Resume a downlink data reception through an SCG-RLC layer entity in a PSCell Resume an uplink data transmission through an SCG-RLC layer entity in a PSCell Specially, a terminal reflects all or some of data of a multi-bearer in a buffer status report, and considers the data in a logical channel prioritization process. |

Table 11 shows an offload bearer data transmitting/receiving operation 1, i.e., an offload bearer data transmitting/receiving operation which is performed according to a type of established bearer.

The terminal 605 transmits/receives some of data of an MCG bearer and data of a multi-bearer through an MCG, and transmits/receives some of data of an SCG bearer and data of a multi-bearer through an SCG at operation 640.

If the terminal 605 moves out of an area of a cell, or there is no need for applying a DC operation, the MENB 607 or SENB 610 reestablishes a bearer of the terminal 605 from the SCG bearer or multi-bearer to an MCG bearer, and determines to release SCG serving cells. Upon determining to reestablish the bearer of the terminal 605 from the SCG bearer or multi-bearer to the MCG bearer, and release the SCG serving cells, the MENB 607 transmits an SENB addition/modification indication message to the SENB 610 to request to release the SCG serving cells. Upon determining to reestablish the bearer of the terminal 605 from the SCG bearer or multi-bearer to the MCG bearer, and release the SCG serving cells, the SENB 610 directly proceeds to operation 643.

The SENB 610 generates an SENB modification request message and transmits the SENB modification request message to the MENB 607 at operation 643. The SENB modification request message includes information indicating SCG removal. Before transmitting the SENB modification request message, the SENB 610 may deactivate the SCG serving cells and stop a downlink transmission of the offload bearer.

The MENB 610 performs an offload bearer related operation 2 at operation 645. If all of the SCG serving cells are released, the MENB 610 reestablishes an offload bearer. If the offload bearer is an SCG bearer, the MENB 610 reestablishes a bearer from the SCG bearer to an MCG bearer, and connects the MCG bearer to a MAC layer entity. If the offload bearer is a multi-bearer, the MENB 610 drives a predetermined timer in order to stop a PDCP reordering operation.

The MENB 610 generates an RRC control message, i.e., an RRC connection reconfiguration message indicating to release an SCG serving cell to transmit the RRC connection reconfiguration message to the terminal 605 at operation 650. In a case that all of the SCG serving cells are released by the RRC connection reconfiguration message (or an SENB is released), the MENB 610 reestablishes a bearer from the SCG bearer and the multi-bearer to an MCG bearer even though there is no control information indicating bearer reestablishment. That is, the terminal proceeds to operation 655 and performs an offload bearer reestablishment operation 2.

The terminal 605 performs one of two operations shown in Table 12 according to a type of bearer to be reestablished.

TABLE 12

| A case that a bearer is reestablished from an SCG bearer to an MCG bearer | A case that a bearer is reestablished from a multi-bearer to an MCG bearer |
|---|---|
| Stop an offload bearer uplink transmission A terminal stops an uplink transmission of an offload bearer to be reestablished to an MCG bearer. Specially, the terminal does not reflect uplink data of the offload bearer in a buffer status report, and determines uplink transmission data without considering the uplink data of the offload bearer in a logical channel prioritization process (refer to the LTE standard 36.321). It is substantially same as an offload bearer reestablishment operation 1. PDCP reconfiguration The same as an offload bearer reestablishment operation 1 PDCP reestablishment The same as an offload bearer reestablishment operation 1 RLC reestablishment The same as an offload bearer reestablishment operation 1 SCG-MAC release MCG-MAC reestablishment A terminal sets up a logical channel of an MCG bearer with an MCG-MAC layer entity. | Maintain some of an offload bearer uplink transmission and stop some of the offload bearer uplink transmission A terminal maintains an uplink data transmission of an MCG-RLC layer entity, and stops an uplink data transmission of an SCG-RLC layer entity. Stop a PDCP reordering operation A terminal applies a reordering operation to PDCP packets which are delivered according to release of an SCG-RLC layer entity, and stops the reordering operation if the reordering operation for the PDCP packets is completed. SCG-RLC release A terminal releases an SCG-RLC layer entity. Before releasing the SCG-RLC layer entity, the terminal reassembles packets which are possible to be reassembled as a PDCP packet among packets stored in a reception buffer of the SCG-RLC layer entity as a PDCP packet, and delivers the PDCP packet to a PDCP layer entity. SCG-MAC release Maintain an MCG-MAC operation |

Table 12 shows the offload bearer reestablishment operation 2, i.e., an offload bearer reestablishment operation which is performed according to a type of bearer to be reestablished.

The terminal 605 transmits a predetermined RRC control message, i.e., an RRC connection reconfiguration complete message to the MENB 607 to report that the release of the SCG serving cells and the bearer reestablishment have been completed at operation 660. The SENB 610 forwards data of the offload bearer to the MENB 607 at operation 647.

In all of a case of reestablishment from an SCG bearer to an MCG bearer and a case of reestablishment from a multi-bearer to an MCG bearer, the SENB 610 forwards uplink PDCP SDUs which are successfully received in an RLC layer entity to the MENB 607.

In the case of reestablishment from the SCG bearer to the MCG bearer, the SENB 610 forwards downlink PDCP SDUs from the first downlink PDCP SDU that the RLC layer entity does not confirm to the MENB 607.

The terminal 605 performs offload bearer data transmitting/receiving operation 2 at operation 665. The terminal 605 performs one of two operations shown in Table 13 according to a type of bearer to be reestablished.

TABLE 13

| A case that a bearer is reestablished from an SCG bearer to an MCG bearer | A case that a bearer is reestablished from a multi-bearer to an MCG bearer |
| --- | --- |
| Resume a downlink data reception of an MCG bearer<br>Upon receiving a PDCP packet through an MCG bearer, a terminal compares a serial number of the PDCP packet and a serial number of each of PDCP packets stored in a PDCP buffer, and delivers PDCP packets of which serial numbers are less than the serial number of the PDCP packet to an upper layer entity until all of the PDCP packets stored in the PDCP buffer are delivered to the upper layer entity.<br>Resume an uplink data transmission of an MCG bearer<br>A terminal resumes an uplink data transmission of an MCG bearer.<br>Specially, the terminal reflects uplink data of the MCG bearer in a buffer status report, and considers the uplink data of the MCG bearer in a logical channel prioritization process (refer to the LTE standard 36.321).<br>PDCP status report<br>A terminal generates a PDCP status report message using PDCP serial numbers of PDCP packets stored in a PDCP buffer, and transmits the generated PDCP status report message to an MENB through an MCG bearer. | PDCP status report<br>A terminal generates a PDCP status report message using PDCP serial numbers of PDCP packets stored in a PDCP buffer, and transmits the generated PDCP status report message to an MENB through an MCG bearer. |

Table 13 shows the offload bearer data transmitting/receiving operation 2.

Here, the operation 660 and the operation 665 are independent each other.

The terminal 605 performs a single connectivity operation that all data is transmitted and received through an MCG at operation 670.

Although FIG. 6 illustrates an operation of a terminal and a network in a case that an SENB is configured or released in an LIE system according to an embodiment of the present disclosure, various changes could be made to FIG. 6. For example, although shown as a series of operations, various operations in FIG. 6 could overlap, occur in parallel, occur in a different order, or occur multiple times.

An operation of a terminal and a network in a case that an SENB is configured or released in an LIE system according to an embodiment of the present disclosure has been described with reference to FIG. 6, and a process of modifying an SENB in an LIE system according to an embodiment of the present disclosure will be described with reference to FIG. 11.

Figure 11:
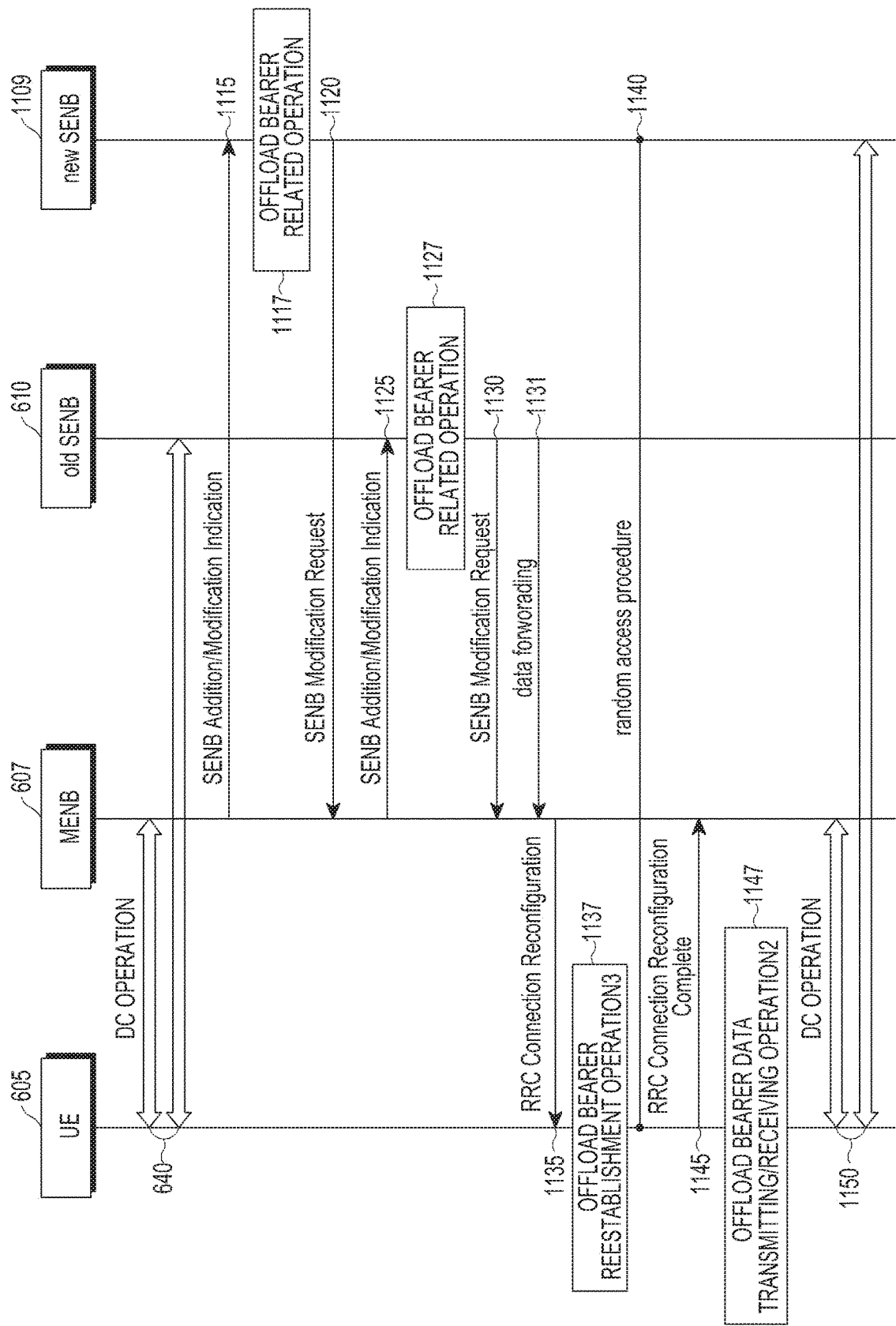
FIG. 11 schematically illustrates a process of modifying an SENB in an LIE system according to an embodiment of the present disclosure.

FIG. 11 schematically illustrates a process of modifying an SENB in an LIE system according to an embodiment of the present disclosure.

Referring to FIG. 11, the LIE system includes a terminal 605, an MENB 607, an old SENB 610, and a new SENB 1109.

Due to physical movement of a terminal which performs a DC operation with one SENB, a need for changing DC to a new SENB may occur. For example, if the terminal 605 which are performing an DC operation through the MENB 607 and the SENB 610 moves out of a coverage of the SENB 610 at an arbitrary timing point, the terminal 605 transmits a measurement result report message to the MENB 607 to inform that the terminal 605 moves out of the coverage of the SENB 610. The MENB 607 recognizes channel quality degradation of a current SCG based on a measurement result of the terminal 605, and determines to set up a connection with a new SENB 1109 and an SCG.

The MENB 607 transmits an SENB addition/modification indication message that requests SCG addition and bearer establishment to the new SENB 1109 at operation 1115. The SENB addition/modification indication message may include current configuration information of the terminal 605 (e.g., AS-config, refer to the LIE standard 36.331), configuration information of an EPS bearer which is configured for the terminal 605, configuration information which is requested to an SENB, and the like as described in operation 612.

Upon receiving the SENB addition/modification indication message, the new SENB 1109 determines whether to accept an SENB addition request. The new SENB 1109 may determine whether to accept the SENB addition request by considering current load situation, characteristics of a bearer which is requested to offload, and the like.

Upon determining to accept the SENB addition request, the new SENB 1109 selects serving cells to be allocated to the terminal 605, and determines information related to the serving cell, for example, frequency information of the serving cell (e.g., EARFCN, refer to the LIE standard 36.331), PCI information of the serving cell (refer to the LIE standard 36.331), downlink related information of the serving cell (e.g., downlink bandwidth information, downlink HARQ feedback channel configuration information, and the like), uplink related information of the serving cell (e.g., uplink bandwidth information, PUCCH configuration information, and the like), and the like.

The new SENB 1109 performs an operation related to an offload bearer at operation 1117. If the offload bearer is an SCG bearer, the new SENB 1109 establishes a PDCP layer entity and an RLC layer entity for the SCG bearer. If the offload bearer is a multi-bearer, the new SENB 1109 establishes an RLC layer entity for the multi-bearer. The new SENB 1109 establishes a MAC layer entity for the offload bearer of the terminal 605. The new SENB 1109 generates an SENB modification request message and transmits the SENB modification request message to the MENB 607 at operation 1120. The SENB modification request message includes information related to a serving cell to be added to the terminal 605, information related to offload bearer establishment, and the like.

After completing the SCG addition operation and the offload bearer establishment operation with the new SENB 1109, the MENB 607 transmits an SENB addition/modification indication message to the old SENB 610 in order to release the SCG and offload bearer of the old SENB 610 at operation 1125.

After receiving the SENB addition/modification indication message, the old SENB 610 generates an SENB modification request message to transmit the SENB modification request message to the MENB 607 at operation 1130. The SENB modification request message includes information that requests to remove a serving cell. Before transmitting the SENB modification request message, the old SENB 610 may deactivate SCG serving cells and stop a downlink transmission of the offload bearer at operation 1127.

The old SENB 610 forwards data to the MENB 607 at operation 1131. That is, for all of reestablishment from an SCG bearer to an MCG bearer and reestablishment from a multi-bearer to an MCG bearer, the old SENB 610 forwards uplink PDCP SDUs which are successfully received in an RLC layer entity to the MENB 607. In a case of the reestablishment from the SCG bearer to the MCG bearer, the old SENB 610 forwards uplink PDCP SDUs from the first uplink PDCP SDU that the RLC layer entity does not confirm a successful transmission to the MENB 607.

The MENB 607 forwards data received from the old SENB 610 to the new SENB 1109 at operation 1133.

The MENB 607 transmits an RRC connection reconfiguration message that instructs the terminal 605 to release a current SCG/SENB, add a new SCG/SENB, and reestablish an offload to the terminal 605 at operation 1135. The RRC connection reconfiguration message includes information indicating release of the current SCG/SENB, and information indicating new SCG/SENB configuration. For example, the information indicating the release of the current SCG/SENB may be information indicating that all SCells belonging to an SCG among SCells which are currently configured are released, and the information indicating new SCG/SENB configuration includes information indicating that the new SCell belongs to an SCG.

The RRC connection reconfiguration message may include offload bearer reconfiguration information. The offload bearer reconfiguration information is information for instructing to reestablish an offload bearer from an SCG bearer of an old SENB to an SCG bearer of a new SENB or reestablish an offload bearer from a multi-bearer of an old SENB to a multi-bearer of a new SENB, and may further include new PDCP configuration information for the bearers.

If the RRC connection reconfiguration message includes the offload bearer reconfiguration information, the terminal 605 reestablishes an offload bearer according to the offload bearer reconfiguration information, and if the RRC connection reconfiguration message does not include the offload bearer reconfiguration information, the terminal 605 reestablishes an offload bearer according to old offload bearer reconfiguration information at operation 1137. Here, an offload bearer reestablishment operation will be described in Table 14.

The terminal 605 performs one of two operations shown in Table 14 according to offload bearer reestablishment situation.

TABLE 14

| A case that a bearer is reestablished from an SCG bearer to an SCG bearer | A case that a bearer is reestablished from a multi-bearer to a multi-bearer |
| --- | --- |
| Stop an uplink transmission The same as an offload bearer reestablishment operation 1 PDCP reconfiguration | Maintain some of an offload bearer uplink transmission and stop some of the offload bearer uplink transmission |

TABLE 14-continued

| A case that a bearer is reestablished from an SCG bearer to an SCG bearer | A case that a bearer is reestablished from a multi-bearer to a multi-bearer |
| --- | --- |
| The same as an offload bearer reestablishment operation 1 PDCP reestablishment The same as an offload bearer reestablishment operation 1 RLC reestablishment The same as an offload bearer reestablishment operation 1 SCG-MAC reestablishment A terminal discards data stored in an HARQ buffer of a current SCG-MAC layer entity, and initializes various timers and variables. The terminal establishes an SCG-MAC layer entity according to control information included in newly received MAC configuration information in order to perform a data transmitting/receiving operation of an SCG bearer and a MAC layer entity operation of SCG serving cells, and a logical channel of the SCG bearer to the SCG-MAC layer entity. Maintain an MCG-MAC operation | The same as an offload bearer reestablishment operation 2 Maintain a PDCP reordering operation A terminal maintains a PDCP reordering operation which is based on a timer that is being driven. SCG-RLC reestablishment: A terminal stops an SCG-RLC layer entity operation, and performs an RLC reestablishment procedure as described above. SCG-MAC reestablishment The same as the left Maintain an MCG-MAC operation |

Table 14 shows an offload bearer reestablishment operation 3.

Upon completing the offload bearer reestablishment operation and the SCell addition operation, the terminal 605 transmits an RRC control message, i.e., an RRC connection reconfiguration complete message to the MENB 607 to report that the offload bearer reestablishment operation and the SCell addition operation have been completed at operation 1145.

The terminal 605 performs a random access operation in a PS Cell among the newly added SCG SCells independent of a procedure of reporting that the offload bearer reestablishment operation and the SCell addition operation have been completed at operation 1140. The terminal 605 synchronizes with the newly added SCG SCells using the random access operation and sets uplink transmit power. After completing the random access operation, the terminal 605 sets the PSCell as an active state, and performs an offload bearer data transmitting/receiving operation 3 shown in Table 15 at operation 1147.

The terminal 605 performs one of two operations shown in Table 15 according to reestablishment situation.

TABLE 15

| A case that a bearer is reestablished from an SCG bearer to an SCG bearer | A case that a bearer is reestablished from a multi-bearer to a multi-bearer |
| --- | --- |
| Resume a downlink data reception of an SCG bearer in a PSCell The same as an offload bearer data transmitting/receiving operation 1 Resume an uplink data transmission of an SCG bearer in a PSCell The same as an offload bearer data transmitting/receiving operation 1 PDCP status report The same as an offload bearer data transmitting/receiving operation 1 | Resume a downlink data reception through an SCG-RLC layer entity in a PSCell The same as an offload bearer data transmitting/receiving operation 1 Resume an uplink data transmission through an SCG-RLC layer entity in a PSCell The same as an offload bearer data transmitting/receiving operation 1 PDCP status report The same as an offload bearer data transmitting/receiving operation 2 |

Table 15 shows the offload bearer data transmitting/receiving operation 3.

The terminal 605 performs an operation of transmitting/receiving some of data of an MCG bearer and data of a multi-bearer through an MCG, and transmitting/receiving some of data of an SCG bearer and data of a multi-bearer through an SCG at operation 1150.

Although FIG. 11 illustrates a process of modifying an SENB in an LIE system according to an embodiment of the present disclosure, various changes could be made to FIG. 11. For example, although shown as a series of operations, various operations in FIG. 11 could overlap, occur in parallel, occur in a different order, or occur multiple times.

A process of modifying an SENB in an LIE system according to an embodiment of the present disclosure has been described with reference to FIG. 11, and an operation that a terminal triggers a PDCP status report upon reestablishing an offload bearer and transmits a PDCP status report message in an LIE system according to an embodiment of the present disclosure will be described with reference to FIG. 12.

Figure 12:
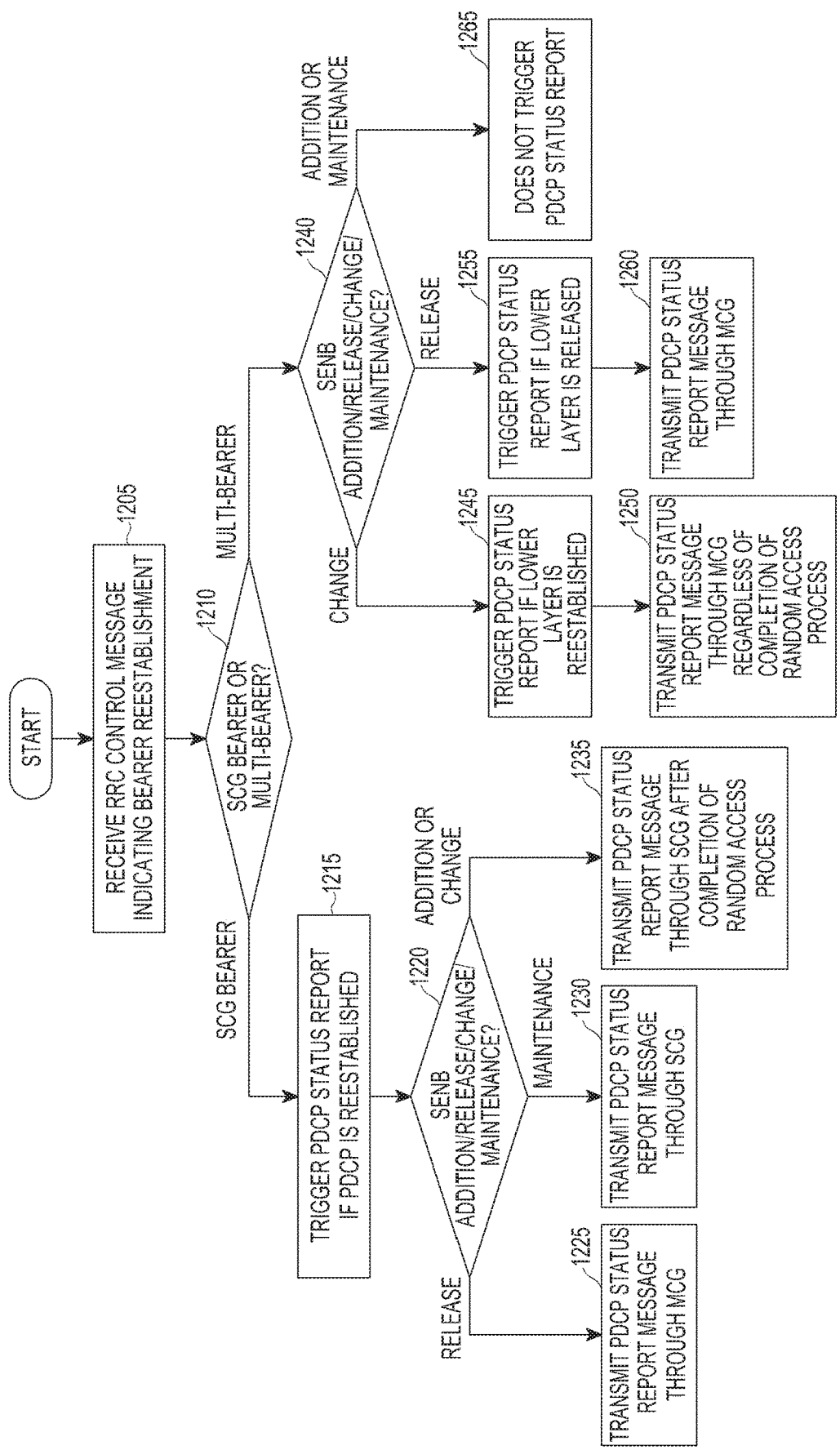
FIG. 12 schematically illustrates an operation that a terminal triggers a PDCP status report upon reestablishing an offload bearer and transmits a PDCP status report message in an LIE system according to an embodiment of the present disclosure.

FIG. 12 schematically illustrates an operation that a terminal triggers a PDCP status report upon reestablishing an offload bearer and transmits a PDCP status report message in an LIE system according to an embodiment of the present disclosure.

Referring to FIG. 12, a PDCP status report transmitted from a terminal to an ENB is for reporting reception status for a downlink PDCP SDU, and the ENB performs a retransmitting operation of the PDCP SDU based on the PDCP status report. For example, the PDCP status report may be performed using a PDCP status report message.

Firstly, a format of a PDCP status report message in an LIE system according to an embodiment of the present disclosure will be described with reference to FIG. 13.

Figure 13:
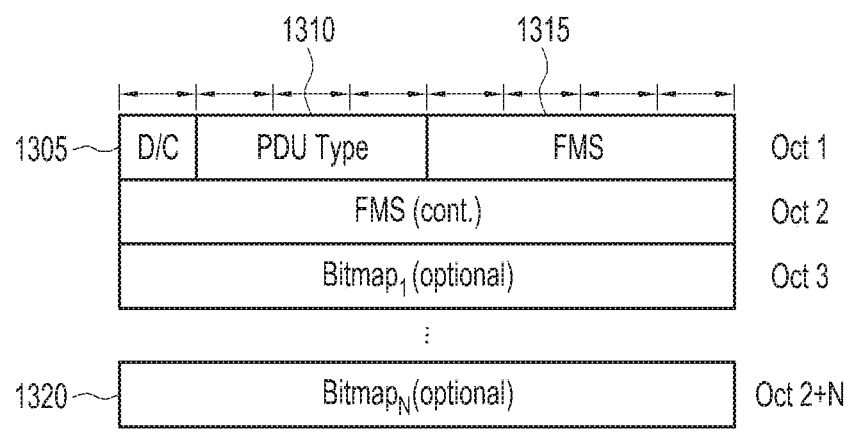
FIG. 13 schematically illustrates a format of a PDCP status report message in an LIE system according to an embodiment of the present disclosure.

FIG. 13 schematically illustrates a format of a PDCP status report message in an LIE system according to an embodiment of the present disclosure.

Referring to FIG. 13, the PDCP status report message includes a data control (D/C) field 1305, a PDU type field 1310, a first missing serial number (FMS) field 1315, and a bitmap field 1320. The D/C field 1305 indicates whether a PDCP packet is a data packet or a control packet.

The PDU type field 1310 is included in only a control packet, and indicates a type of control packet. For example, if a field value of the PDU type field 1310 is "000", the PDU type field 1310 indicates that a related packet is the PDCP status report message. The FMS field 1315 indicates a serial number of the first missed PDCP service data unit (SDU).

The bitmap field 1320 indicates whether PDCP SDUs which correspond to the next serial number are received based on the FMS field 1315. A related bit location of a bitmap is information about a PDCP SDU with a predetermined serial number. If a value of the bit is 0, it means that a related PDCP SDU does not exist in a receiving device. If the value of the bit is 1, it means that the related PDCP SDU exists in the receiving device.

Referring to FIG. 12, a terminal receives an RRC control message indicating bearer reestablishment at operation 1205.

The terminal determines whether the bearer reestablishment is related to an SCG bearer or a multi-bearer at operation 1210. Here, the expression of the bearer reestablishment related to the SCG bearer has the same meaning as the expression that a bearer is reestablished from an MCG bearer to an SCG bearer, from an SCG bearer to an MCG bearer, or from an SCG bearer to an SCG bearer.

Further, the expression of the bearer reestablishment related to the multi-bearer has the same meaning as the expression that a bearer is reestablished from an MCG bearer to a multi-bearer, from a multi-bearer to an MCG bearer, or from a multi-bearer to a multi-bearer.

If the bearer reestablishment is related to the SCG bearer, the terminal proceeds to operation 1215, and if the bearer reestablishment is related to the multi-bearer the terminal proceeds to operation 1240.

The terminal waits until a PDCP layer entity is reestablished according to the bear reestablishment, and stores PDCP SDUs which are not ordered into a PDCP buffer after converting a PDCP packet to a PDCP SDU if the PDCP layer entity is reestablished and an RLC layer entity delivers the PDCP packet at operation 1215. The terminal triggers a PDCP status report, and generates a PDCP status report message by considering the PDCP SDUs stored in the PDCP buffer and PDCP SDUs which are delivered to an upper layer.

The terminal determines that the bearer reestablishment corresponds to which one of the following four cases at operation 1220.

A case that bearer reestablishment is performed along with SENB addition: it means that the bearer reestablishment related to an SCG bearer is performed and an SENB is added according to one control message. Here, the expression of the SENB is added has the same meaning as the expression that the first SCG serving cell is added.

A case that bearer reestablishment is performed along with SENB release: it means that the bearer reestablishment related to an SCG bearer is performed and an SENB is released according to one control message. Here, the expression of the SENB is released has the same meaning as the expression that the last SCG serving cell is released.

A case that bearer reestablishment is performed along with SENB modification: it means that the bearer reestablishment related to an SCG bearer is performed and an SENB is modified according to one control message. Here, the expression of the SENB is modified has the same meaning as the expression that all serving cells are released of one SCG and a serving cell of a new SCG is added.

A case that bearer reestablishment is performed, and SENB is maintained: it means that only the bearer reestablishment related to an SCG bearer is performed and an SENB or SCG addition/release/modification is not performed according to one control message.

If the bearer reestablishment corresponds to the case that the SENB is released, the terminal proceeds to operation 1225, if the bearer reestablishment corresponds to the case that the SENB is maintained, the terminal proceeds to operation 1230, and if the bearer reestablishment corresponds to the case that the SENB is added or modified, the terminal proceeds to operation 1235.

If a new uplink transmission is possible in an MCG serving cell, the terminal transmits a PDCP status report message through the MCG serving cell at operation 1225.

If a new uplink transmission is possible in an SCG serving cell, the terminal transmits the PDCP status report message through the SCG serving cell at operation 1230.

After receiving at least random access response message during the random access process in the PSCell, the terminal transmits the PDCP status report message through the SCG serving cell at operation 1235. The PDCP status report message is transmitted using an uplink grant which is allocated through a random access response message or uplink grant which is allocated through a physical downlink control channel (PDCCH).

The terminal determines whether the bearer reestablishment corresponds to which one of the above 4 cases at operation 1240.

If the bearer reestablishment corresponds to the case that the SENB is modified, the terminal proceeds to operation 1245, if the bearer reestablishment corresponds to the case that the SENB is released, the terminal proceeds to operation 1255, and if the bearer reestablishment corresponds to the case that the SENB is added or maintained, the terminal proceeds to operation 1260.

If the terminal proceeds to operation 1245 according to the SENB modification, there is a need for receiving a PDCP SDU that the terminal does not receive from an old SENB again, so the terminal triggers a PDCP status report. If the SENB is modified, the terminal performs an operation of reestablishing an SCG-RLC layer entity, and triggers a PDCP status report if one of RLC layer entities connected to a PDCP layer entity is reestablished (or the SCG-RLC layer entity is reestablished). The terminal converts PDCP packets delivered from the SCG-RLC layer entity to a PDCP SDU, delivers ordered PDCP SDUs to an upper layer, and stores non-ordered PDCP SDUs in a PDCP buffer. The terminal generates a PDCP status report message by considering the PDCP SDUs stored in the PDCP buffer and the PDCP SDUs delivered to the upper layer at operation 1245.

If a new uplink transmission is possible in the MCG serving cell, the terminal transmits the PDCP status report message through the MCG serving cell at operation 1250. In the SENB modification, a random access operation is performed in the new PSCell.

Further, a multi-bearer transmission in an SCG serving cell is possible after the completion of the random access operation. The terminal does not await completion of a random access operation for the PSCell, and transmits the PDCP status report message through the MCG serving cell.

Alternatively, the terminal may transmit the PDCP status report message through one of the MCG serving cell and the SCG serving cell, being a serving cell of which a timing point at which a new uplink transmission is possible is faster than the other.

If the terminal proceeds to operation 1255 according to the SENB release, there is a need for receiving a PDCP SDU that the terminal does not receive from the SENB again, and the terminal triggers a PDCP status report. If the SENB is released, the terminal releases the SCG-RLC layer entity, and triggers a PDCP status report if one of the RLC layer entities connected to the PDCP layer entity is released (or the SCG-RLC layer entity is released). The terminal converts PDCP packets delivered from the released SCG-RLC layer entity to a PDCP SDU, delivers ordered PDCP SDUs to the upper layer, and stores non-ordered PDCP SDUs in the PDCP buffer. The terminal generates a PDCP status report message by considering the PDCP SDUs stored in the PDCP buffer and the PDCP SDUs delivered to the upper layer at operation 1255.

The terminal transmits the PDCP status report message through the MCG serving cell if a new uplink transmission is possible in the MCG serving cell at operation 1260.

If the SENB is maintained or a new SENB is added, there is no need of a PDCP packet retransmission request process, and the terminal does not trigger a PDCP status report at operation 1265.

Although FIG. 12 illustrates an operation that a terminal triggers a PDCP status report upon reestablishing an offload bearer and transmits a PDCP status report message in an LIE system according to an embodiment of the present disclosure, various changes could be made to FIG. 12. For example, although shown as a series of operations, various operations in FIG. 12 could overlap, occur in parallel, occur in a different order, or occur multiple times.

An operating process of an ENB which receives a PDCP status report message and retransmits PDCP data in an LIE system according to an embodiment of the present disclosure will be described with reference to FIG. 14.

Figure 14:
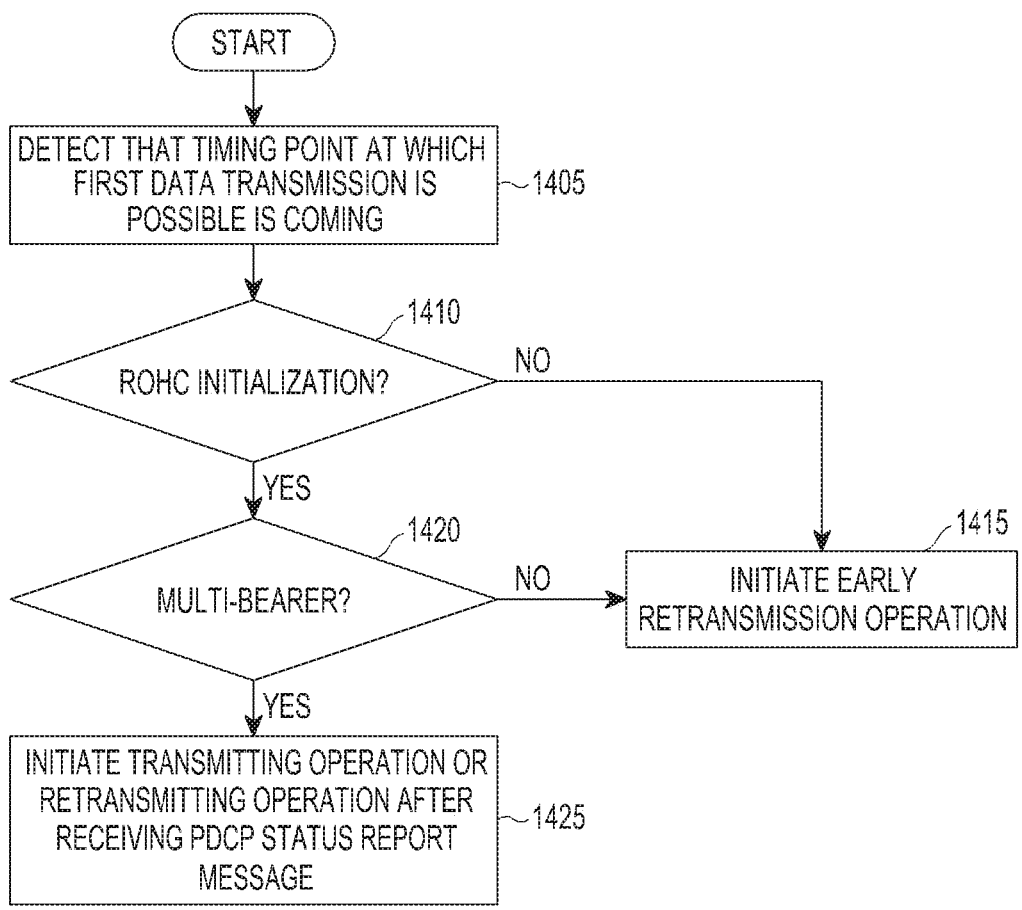
FIG. 14 schematically illustrates an operating process of an ENB which receives a PDCP status report message and retransmits PDCP data in an LIE system according to an embodiment of the present disclosure.

FIG. 14 schematically illustrates an operating process of an ENB which receives a PDCP status report message and retransmits PDCP data in an LIE system according to an embodiment of the present disclosure.

Referring to FIG. 14, as described above, an ENB initiates to retransmit packets from the first unconfirmed packet even though the ENB does not receive a PDCP status report message. This early retransmission scheme is available in terms of a seamless data transmission.

According that an arbitrary bearer is reestablished from a multi-bearer to a multi-bearer, a case that robust header compression (ROHC) is reset may occur. A typical example is a case that reestablishment from the multi-bearer to the multi-bearer and a handover are performed at the same time. In this case, an ENB may include an ROHC initialization and reset (IR) packet (refer to RFC 3095) into the first unconfirmed packet to transmit the first unconfirmed packet. If the terminal receives the first unconfirmed packet already, the terminal discards the first unconfirmed packet, so a situation that ROHC initialization is failed may occur.

In an embodiment of the present disclosure, in order to prevent such situation, the terminal does not perform an early retransmission scheme if a predetermined criterion is satisfied, and initiates a retransmission operation after receiving a PDCP status report message. This will be described with reference to FIG. 14.

In FIG. 14, it will be assumed that a PDCP transmitting device for transmitting PDCP data is an ENB, however, the PDCP transmitting device may be a terminal.

The PDCP transmitting device detects that a timing point at which the first data transmission is possible is coming after a handover has been initiated at operation 1405. For the terminal, the timing point is a timing point at which the terminal has completed a random access. For the ENB, the timing point is a timing point at which the ENB receives a dedicated preamble signal from the terminal.

The PDCP transmitting device determines whether an ROHC initiation occurs in a target cell at operation 1410. Here, if the handover is a handover of the related art, the handover involves the ROHC initiation. Exceptionally, if a source ENB and a target ENB are able to exchange an ROHC context, the ROHC context may be used without initialization. If the ROHC initiation does not occur, the PDCP transmitting device initiates an early retransmission operation at operation 1415.

If the ROHC initiation occurs, the PDCP transmitting device determines whether a related bearer is a multi-bearer at operation 1420. If the related bearer is the multi-bearer, the PDCP transmitting device determines that the early retransmission operation is not suitable and proceeds to operation 1425 since a PDCP receiving device performs a reordering operation and discards a packet which is redundantly received.

If the related bearer is a single bearer, the PDCP transmitting device initiates the early retransmission operation at operation 1415 since the terminal PDCP receiving device discards the received packet which is redundantly received after performing a header recover operation, so there is no problem even though the PDCP transmitting device performs the early retransmission operation.

The PDCP transmitting device does not initiate a transmitting operation and a retransmitting operation for a PDCP packet until a PDCP status report message is received from the PDCP receiving device at operation 1425. If the PDCP status report message is received, the PDCP transmitting device initiates a transmitting operation or a retransmitting operation for PDCP packets from a PDCP packet for which a retransmission is required corresponding to a PDCP serial number. Alternatively, the PDCP transmitting device does not transmit ROHC control information such as an IR packet, and the like along with user data and transmits the ROHC control information using a PDCP control PDU for an interspersed ROHC feedback packet (refer to the LIE standard 36.323) as a control packet including only the ROHC control information even though the PDCP transmitting device initiates the early retransmission operation at operation 1425. This is why a PDCP serial number is not used for the PDCP control PDU for the interspersed ROHC feedback packet, so there is no problem due to that the packet which is redundantly received is discarded.

Although FIG. 14 illustrates an operating process of an ENB which receives a PDCP status report message and retransmits PDCP data in an LIE system according to an embodiment of the present disclosure, various changes could be made to FIG. 14. For example, although shown as a series of operations, various operations in FIG. 14 could overlap, occur in parallel, occur in a different order, or occur multiple times.

An operating process of an ENB which receives a PDCP status report message and retransmits PDCP data in an LIE system according to an embodiment of the present disclosure has been described with reference to FIG. 14, and an inner structure of a terminal which transmits PDCP data in a multi-bearer in an LIE system according to an embodiment of the present disclosure will be described with reference to FIG. 15.

Figure 15:
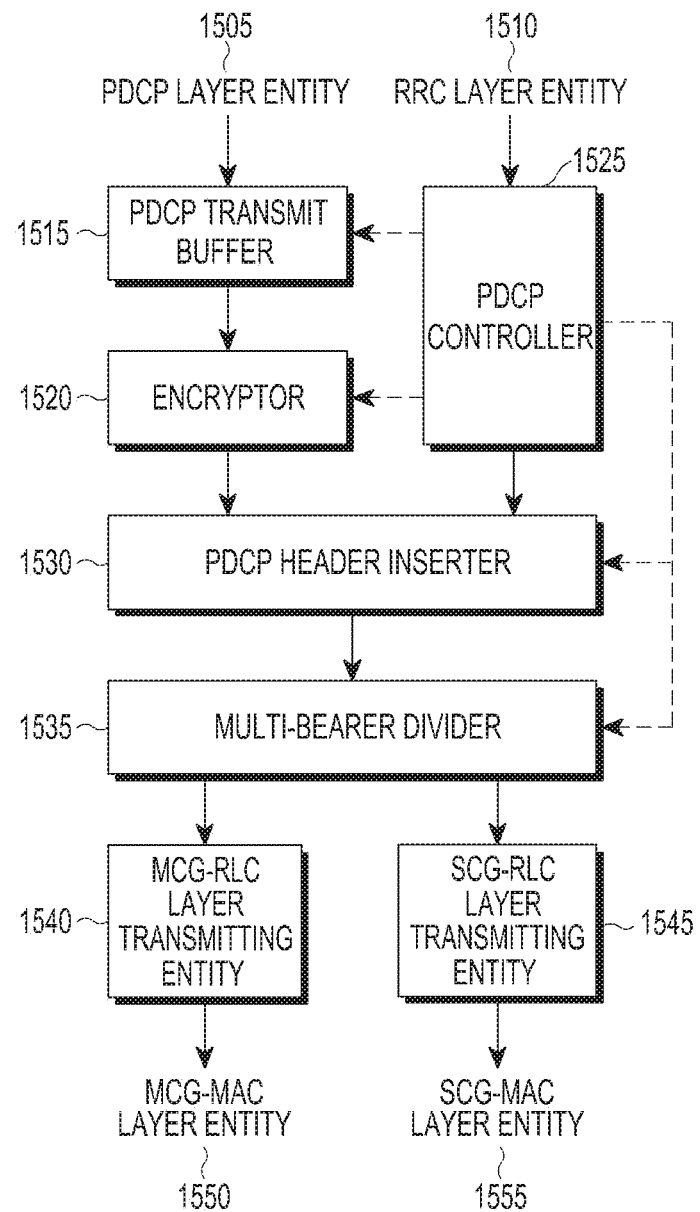
FIG. 15 schematically illustrates an inner structure of a terminal which transmits PDCP data in a multi-bearer in an LIE system according to an embodiment of the present disclosure.

FIG. 15 schematically illustrates an inner structure of a terminal which transmits PDCP data in a multi-bearer in an LIE system according to an embodiment of the present disclosure.

Referring to FIG. 15, a terminal includes a PDCP transmit buffer 1515, an encryptor 1520, a PDCP controller 1525, a PDCP header inserter 1530, a multi-bearer divider 1535, an MCG-RLC layer transmitting entity 1540, and an SCG-RLC layer transmitting entity 1545.

Firstly, a multi-bearer transmits and receives data through two RLC layer entities, and an MENB may configure a multi-bearer to transmit uplink data of a predetermined ratio through an MCG-RLC layer entity (or an MCG, an MCG-MAC layer entity, or an MENB), and transmit uplink data of other predetermined ratio through an SCG-RLC layer entity (or an SCG, an SCG-MAC layer entity, or an MENB). Such ratio will be referred to as a split ratio. The MENB may configure the multi-bearer to transmit all data through the MCG or the SCG as occasion demands.

It is desirable that a PDCP control packet such as a PDCP status report message is transmitted as soon as possible. For example, even though all uplink data needs to be transmitted through an SCG, if an uplink transmitting opportunity faster than an uplink transmitting opportunity in the SCG is given in an MCG, it may be desirable that the PDCP control packet is exceptionally transmitted through the MCG.

The multi-bearer includes one PDCP layer entity 1505 and two RLC layer entities.

The PDCP layer entity 1505 includes the PDCP transmit buffer 1515, the encryptor 1520, the PDCP header inserter 1530, the PDCP controller 1525, and the multi-bearer divider 1535.

The PDCP transmit buffer 1515 stores a PDCP data packet (or a PDCP SDU) which occurs in an upper layer.

The encryptor 1520 performs an encryption operation for a PDCP data packet.

The PDCP header inserter 1530 performs an operation of inserting a PDCP header into a PDCP data packet or a PDCP control packet.

The multi-bearer divider 1535 performs an operation of outputting a PDCP packet to one of the MCG-RLC layer transmitting entity 1540 and the SCG-RLC layer transmitting entity 1545.

The PDCP controller 1525 receives multi-bearer configuration information from an RRC layer entity 1510, and controls a PDCP layer entity 1505 corresponding to the multi-bearer configuration information. The PDCP controller 1525 receives a timer value which is related to a duration for which a PDCP data packet is stored in the PDCP transmission buffer 1515 from the RRC layer entity 1510, and controls a transmission buffer to discard a related packet of the PDCP transmission buffer 1515 whenever a timer expires according to the timer value.

The PDCP controller 1525 receives an encryption key from the RRC layer entity 1510, and outputs the encryption key to the encryptor 1520. The PDCP controller 1525 receives control information related to a PDCP header format from the RRC layer entity 1510, and configures the PDCP header inserter 1530 corresponding to the control information related to the PDCP header format.

The PDCP controller 1525 receives split rate information from the RRC layer entity 1510, and configures the multi-bearer divider 1535 using the split rate information. For example, if a split rate is [0:100], the PDCP controller 1525 configures the multi-bearer divider 1535 thereby all PDCP packets are transmitted through an SCG, and if the split rate is [50:50], the PDCP controller 1525 configures the multi-bearer divider 1535 thereby PDCP packets of 50% are transmitted through an MCG and PDCP packets of 50% are transmitted through an SCG.

The multi-bearer divider 1535 determines to output which PDCP packet to which RLC layer transmitting entity according to the split ratio. If the split ratio is [0:100], the multi-bearer divider 1535 outputs all PDCP data packets to the SCG-RLC layer transmitting entity 1545. If the split ratio is [30:70], the multi-bearer divider 1535 outputs PDCP data packets of 30% to the MCG-RLC layer transmitting entity 1540, and outputs PDCP data packets of 70% to the SCG-RLC layer transmitting entity 1545.

If a predetermined criterion is satisfied, the PDCP controller 1515 generates a PDCP control packet. For example, the predetermined criterion may be that one of an MCG-RLC layer receiving entity and an SCG-RLC layer receiving entity is reestablished or released.

The PDCP controller 1515 outputs the PDCP control packet to the multi-bearer divider 1535, and the multi-bearer divider 1535 outputs the PDCP control packet to a cell group with the fastest transmitting timing point (or an RLC layer entity) without considering the split ratio.

The MCG-RLC layer transmitting entity 1540 and the SCG-RLC layer transmitting entity 1545 are connected with an MCG-MAC layer entity 1550 and an SCG-MAC layer entity 1555, respectively, and generate a PDCP packet received from the PDCP layer entity 1505 as an RLC packet to transmit the generated RLC packet to a related MAC layer entity.

While the PDCP transmit buffer 1515, the encryptor 1520, the PDCP controller 1525, the PDCP header inserter 1530, the multi-bearer divider 1535, the MCG-RLC layer transmitting entity 1540, and the SCG-RLC layer transmitting entity 1545 are described as separate units, it is to be understood that this is merely for convenience of description. In other words, two or more of the PDCP transmit buffer 1515, the encryptor 1520, the PDCP controller 1525, the PDCP header inserter 1530, the multi-bearer divider 1535, the MCG-RLC layer transmitting entity 1540, and the SCG-RLC layer transmitting entity 1545 may be incorporated into a single unit.

An inner structure of a terminal which transmits PDCP data in a multi-bearer in an LIE system according to an embodiment of the present disclosure has been described with reference to FIG. 15, and an operation of transmitting a PDCP data packet and a PDCP control packet through a multi-bearer in an LIE system according to an embodiment of the present disclosure will be described with reference to FIG. 16.

Figure 16:
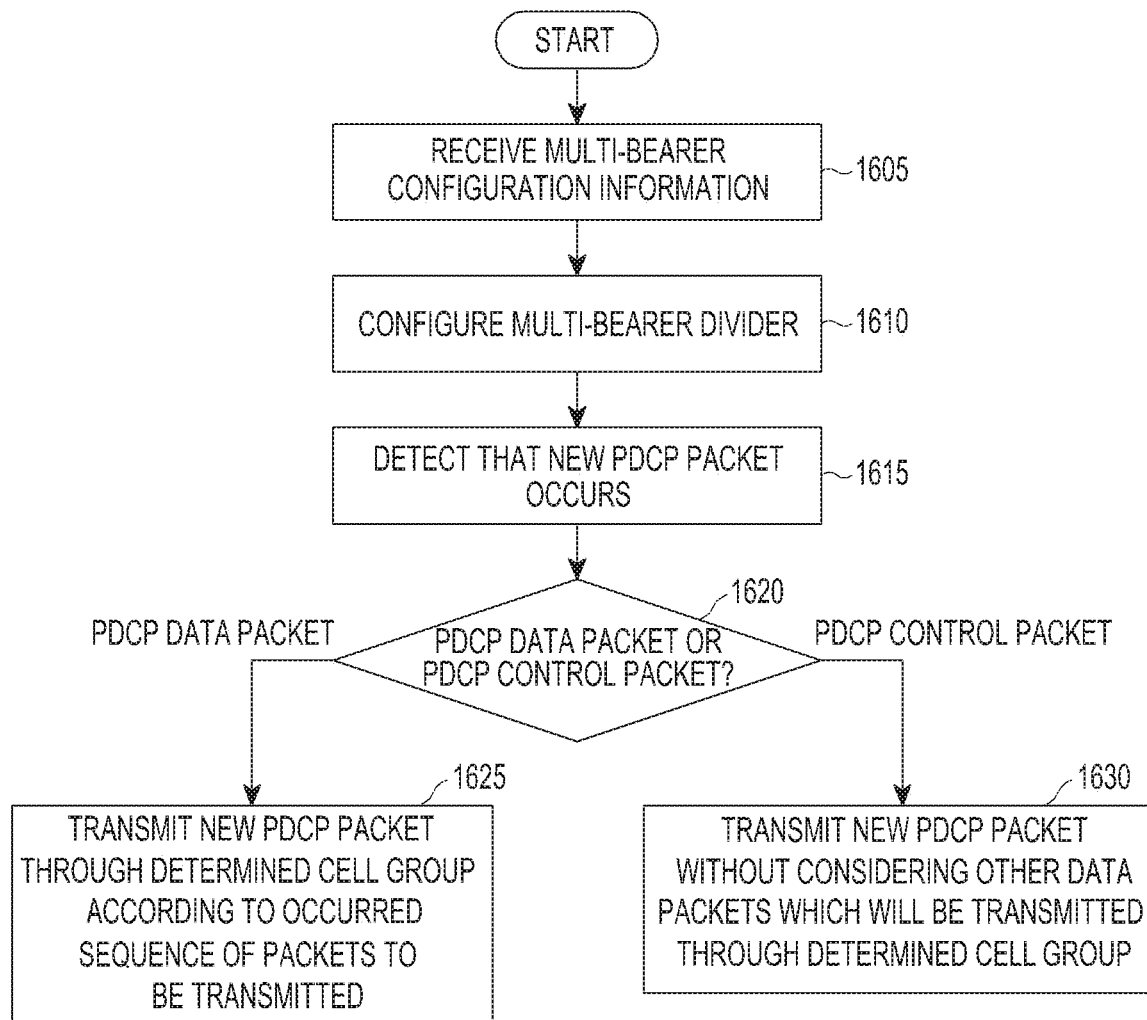
FIG. 16 schematically illustrates an operation of transmitting a PDCP data packet and a PDCP control packet through a multi-bearer in an LIE system according to an embodiment of the present disclosure.

FIG. 16 schematically illustrates an operation of transmitting a PDCP data packet and a PDCP control packet through a multi-bearer in an LIE system according to an embodiment of the present disclosure.

Referring to FIG. 16, an operation of performing a transmitting operation through a predetermined cell group based on a split ratio according to a type of PDCP packet, or performing a transmitting operation based on a transmitting opportunity without considering a cell group is shown.

A terminal receives multi-bearer configuration information at operation 1605. The multi-bearer configuration information may include split ratio information.

The terminal configures a multi-bearer divider thereby a PDCP packet is transmitted according to a split ratio by applying the split ratio information at operation 1610.

The terminal detects that a new PDCP packet occurs at operation 1615. The terminal determines whether the new PDCP packet is a PDCP data packet or a PDCP control packet at operation 1620.

If the new PDCP packet is the PDCP data packet (i.e., a PDCP SDU received from an upper layer), the terminal proceeds to operation 1625. If the new PDCP packet is the PDCP control packet (i.e., a packet including control information which occurs in a PDCP controller), the terminal proceeds to operation 1630.

The terminal determines a cell group to which the new PDCP packet will be transmitted according to the split ratio, and transmits the new PDCP packet through the determined cell group according to an occurred sequence of packets to be transmitted at operation 1625.

The terminal determines a cell group to which the new PDCP packet will be transmitted as a cell group with the fastest transmitting opportunity without considering the split ratio at operation 1630. The terminal transmits the new PDCP packet without considering other data packets which will be transmitted through the determined cell group (i.e., earlier than other data packets without considering occurrence time) at operation 1630. For example, in a case that a PDCP status report has been triggered at a timing point t0, an uplink transmission for a related bearer through a serving cell of an MCG is possible at a timing point t1, and a uplink transmission for the related bearer through a serving cell of an SCG is possible at a timing point t2, if the timing point t1 is earlier than the timing point t2, a PDCP status report message is transmitted through the MCG, and if the timing point t2 is earlier than the timing point t1, the PDCP status report message is transmitted through the SCG.

If a PDCP status report is triggered according to SENB change, an uplink transmission through an SCG is possible after a random access operation has been completed in a PSCell, and if the PDCP status report is triggered according to SENB release, the uplink transmission through the SCG is not possible any more. An operation of a terminal may be simplified thereby always transmitting a PDCP status report message through an MCG. That is, even though a split ratio is set to [0:100], the PDCP status report message may be transmitted through the MCG.

Further, a PDCP control packet is transmitted regardless of a split ratio, and the transmission of the PDCP control packet does not affect the split ratio. For example, if the PDCP control packet is transmitted through an arbitrary cell group, this transmission does not affect a probability that an arbitrary PDCP data packet will be transmitted through the arbitrary cell group. Alternatively, if an arbitrary PDCP data packet is transmitted through an arbitrary cell group, this transmission decreases a probability that other PDCP data packet will be transmitted through the arbitrary cell group, so the arbitrary PDCP data packet affects the split ratio.

Although FIG. 16 illustrates an operation of transmitting a PDCP data packet and a PDCP control packet through a multi-bearer in an LIE system according to an embodiment of the present disclosure, various changes could be made to FIG. 16. For example, although shown as a series of operations, various operations in FIG. 16 could overlap, occur in parallel, occur in a different order, or occur multiple times.

An operation of transmitting a PDCP data packet and a PDCP control packet through a multi-bearer in an LIE system according to an embodiment of the present disclosure has been described with reference to FIG. 16, and an inner structure of a terminal in an LIE system according to an embodiment of the present disclosure will be described with reference to FIG. 17.

Figure 17:
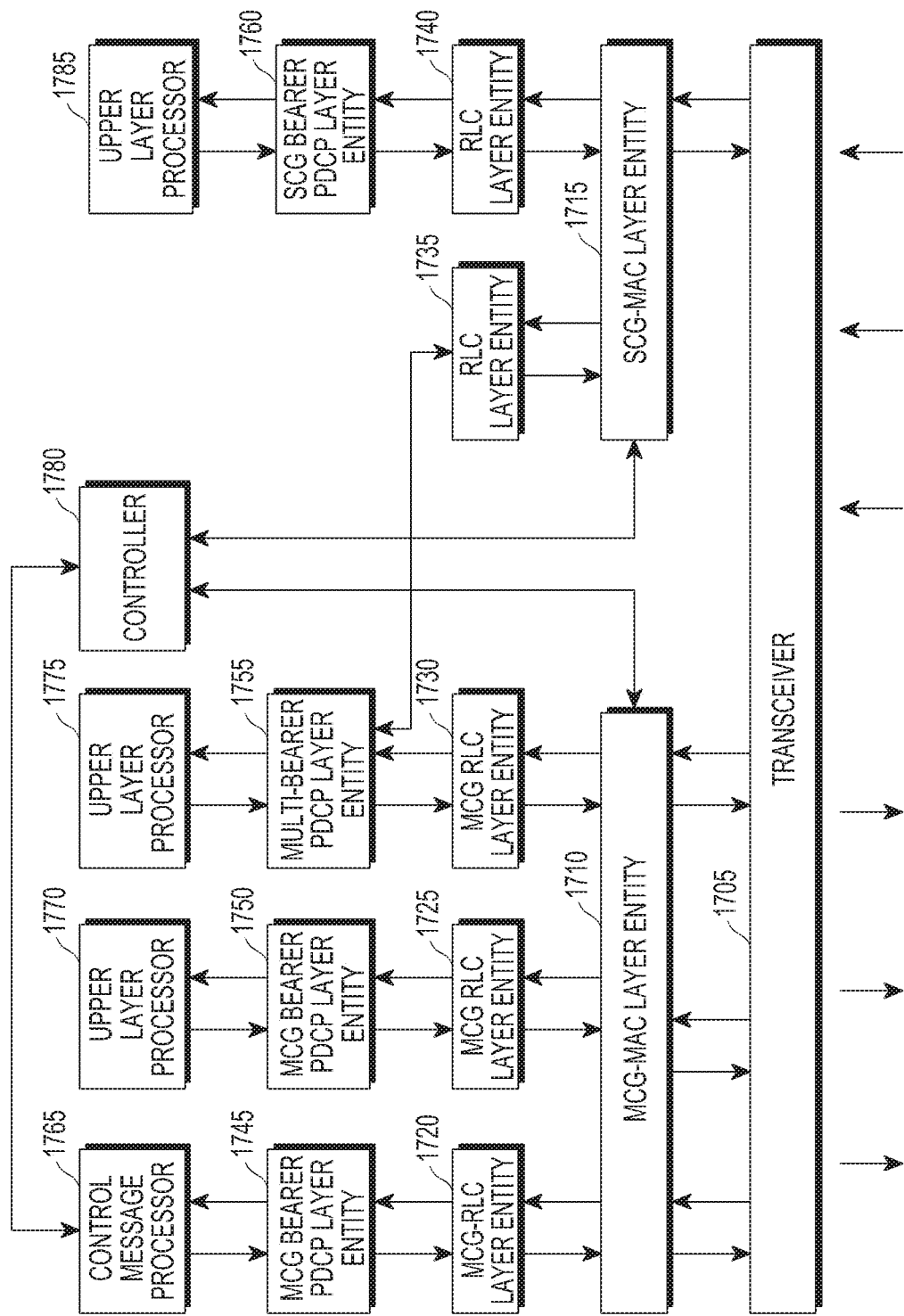
FIG. 17 schematically illustrates an inner structure of a terminal in an LIE system according to an embodiment of the present disclosure.

FIG. 17 schematically illustrates an inner structure of a terminal in an LIE system according to an embodiment of the present disclosure.

Referring to FIG. 17, a terminal includes an MCG-MAC layer entity 1710, a control message processor 1765, upper layer processors 1770, 1775, and 1785, a controller 1780, an SCG-MAC layer entity 1715, a transceiver 1705, PDCP layer entities 1745, 1750, 1755, and 1760, and RLC layer entities 1720, 1725, 1730, 1735, and 1740.

The transceiver 1705 receives data and a control signal through a downlink channel of a serving cell, and transmits data and a control signal through an uplink channel of the serving cell. If a plurality of serving cells are configured, the transceiver 1705 performs a data transmitting/receiving operation and a control signal transmitting/receiving operation through the plurality of serving cells.

The MCG-MAC layer entity 1710 performs an operation of multiplexing data occurred in an RLC layer entity or de-multiplexing data received from the transceiver 1705 to transmit the multiplexed data or de-multiplexed data to a proper RLC layer entity. The MCG-MAC device 1710 processes a buffer status report (BSR) or a power headroom report (PHR) triggered for an MCG, and the like.

The control message processor 1765, which is a processor related to an RRC layer entity, processes a control message received from an ENB and takes a necessary action. For example, the control message processor 1765 receives an RRC control message and delivers a variety of configuration information to the controller 1780.

The upper layer processors 1770, 1775, and 1785 may be configured for each service. The upper layer processors 1770, 1775, and 1785 process data that is generated in a user service such as an FTP or a VoIP, and deliver the processed data to the PDCP layer entities 1745, 1750, 1755, and 1760.

The controller 1780 checks scheduling commands (e.g., uplink grants) that are received through the transceiver 1705, and controls the transceiver 1705 and a multiplexer/de-multiplexer so that an uplink transmission is performed with proper transmission resources at a proper timing point. The controller 1780 performs various control functions for a terminal operation shown in FIGS. 6 to 16, and 20. For convenience of description, the controller 1780 and the PDCP layer entities 1745, 1750, 1755, and 1760 are described as separate units, it is to be understood that some of the control functions of the controller 1780 may be incorporated into the PDCP layer entities 1745, 1750, 1755, and 1760.

The PDCP layer entities 1745, 1750, 1755, and 1760 perform a terminal operation shown in FIGS. 6 to 16, and 19.

While the MCG-MAC layer entity 1710, the control message processor 1765, the upper layer processors 1770, 1775, and 1785, the controller 1780, the SCG-MAC layer entity 1715, the transceiver 1705, the PDCP layer entities 1745, 1750, 1755, and 1760, and the RLC layer entities 1720, 1725, 1730, 1735, and 1740 are described as separate units, it is to be understood that this is merely for convenience of description. In other words, two or more of the MCG-MAC layer entity 1710, the control message processor 1765, the upper layer processors 1770, 1775, and 1785, the controller 1780, the SCG-MAC layer entity 1715, the transceiver 1705, the PDCP layer entities 1745, 1750, 1755, and 1760, and the RLC layer entities 1720, 1725, 1730, 1735, and 1740 may be incorporated into a single unit.

An inner structure of a terminal in an LIE system according to an embodiment of the present disclosure has been described with reference to FIG. 17, and an inner structure of an ENB in an LIE system according to an embodiment of the present disclosure will be described with reference to FIG. 18.

Figure 18:
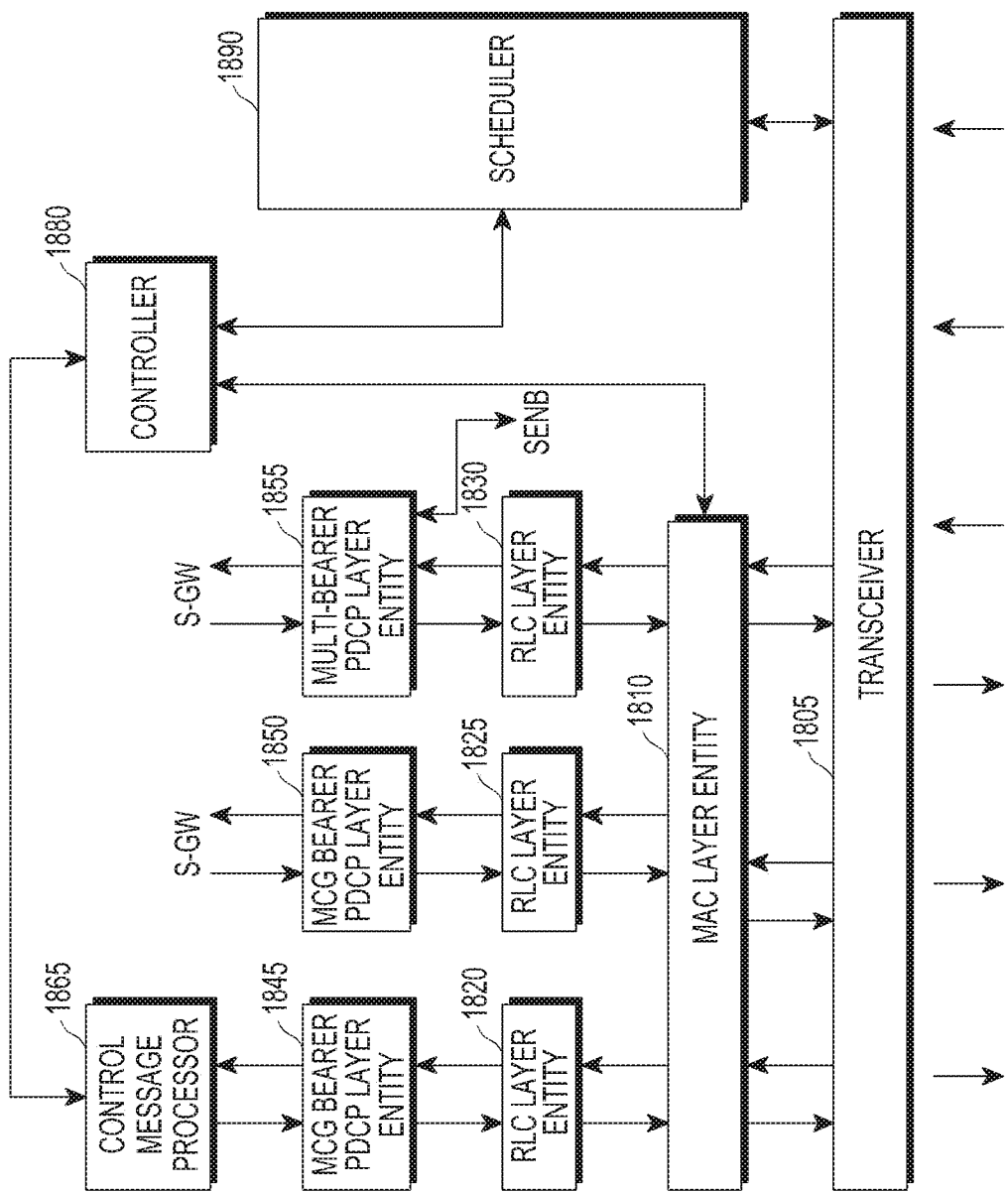
FIG. 18 schematically illustrates an inner structure of an ENB in an LIE system according to an embodiment of the present disclosure.

FIG. 18 schematically illustrates an inner structure of an ENB in an LIE system according to an embodiment of the present disclosure.

Referring to FIG. 18, an ENB includes a MAC layer entity 1810, a control message processor 1865, a controller 1880, a transceiver 1805, PDCP layer entities 1845, 1850, and 1855, RLC layer entities 1820, 1825 and 1830, and a scheduler 1890.

The transceiver 1805 transmits data and a predetermined control signal using a downlink carrier, and receives data and a predetermined control signal using an uplink carrier. If a plurality of carriers are configured, the transceiver 1805 performs a data transmitting/receiving operation and a control transmitting/receiving operation using the plurality of carriers.

The MAC layer entity 1810 multiplexes the data generated in the RLC layer entities 1820, 1825 and 1830, or de-multiplexes the data received from the transceiver 1805 and deliver the de-multiplexed data to proper RLC layer entities 1820, 1825 and 1830 or the controller 1880.

The control message processor 1865 processes a control message transmitted by a terminal and takes a necessary action, or generates a control message to be transmitted to the terminal, and delivers the control message to a lower layer entity.

The scheduler 1890 allocates transmission resources to the terminal at a proper timing point based on the terminal's buffer status, channel status, and the like, and control the transceiver 1805 to process the signal transmitted by the terminal or to transmit a signal to the terminal.

The PDCP layer entities 1845, 1850, and 1855 are divided into MCG bearer PDCP layer entities 1845 and 1850, and a multi-bearer PDCP layer entity 1855. The MCG bearer PDCP layer entities 1845 and 1850 transmit and receive data through only an MCG, and are connected with one RLC layer entity. The multi-bearer PDCP layer entity 1855 transmits and receives data through an MCG and an SCG.

In addition, the controller 1880 controls operations of an MENB among operations shown in FIGS. 6 to 16, and 19.

While the MAC layer entity 1810, the control message processor 1865, the controller 1880, the transceiver 1805, the PDCP layer entities 1845, 1850, and 1855, the RLC layer entities 1820, 1825, and 1830, and the scheduler 1890 are described as separate units, it is to be understood that this is merely for convenience of description. In other words, two or more of the MAC layer entity 1810, the control message processor 1865, the controller 1880, the transceiver 1805, the PDCP layer entities 1845, 1850, and 1855, the RLC layer entities 1820, 1825, and 1830, and the scheduler 1890 may be incorporated into a single unit.

An inner structure of an ENB in an LIE system according to an embodiment of the present disclosure has been described with reference to FIG. 18, and an operating process in a case that an RLC unacknowledged mode (UM) bearer is reestablished from an MCG bearer to an SCG bearer, and is reestablished from the SCG bearer to the MCG bearer again in an LIE system according to an embodiment of the present disclosure will be described with reference to FIG. 19.

Figure 19:
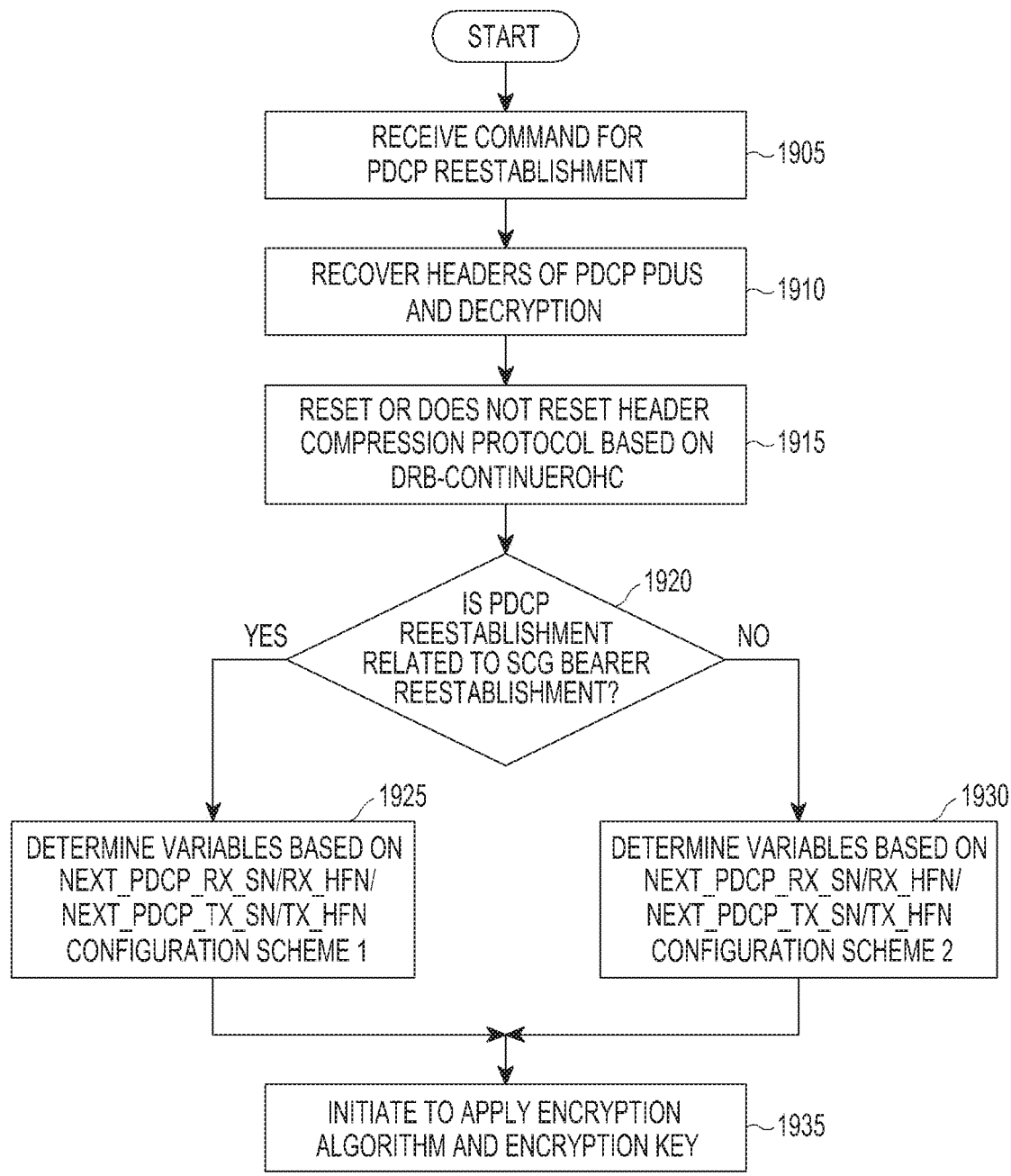
FIG. 19 schematically illustrates an operating process in a case that a radio link control (RLC) unacknowledged mode (UM) bearer is reestablished from a master cell group (MCG) bearer to a secondary CG (SCG) bearer, and is reestablished from the SCG bearer to the MCG bearer again in an LIE system according to an embodiment of the present disclosure.

FIG. 19 schematically illustrates an operating process in a case that an RLC UM bearer is reestablished from an MCG bearer to an SCG bearer, and is reestablished from the SCG bearer to the MCG bearer again in an LIE system according to an embodiment of the present disclosure.

Referring to FIG. 19, a handover or bearer reestablishment involves a PDCP reestablishment operation, a hyperframe number (HFN) and a PDCP serial number are initialized to a preset value (e.g., 0 in PDCP reestablishment of a PDCP layer entity connected with an RLC UM bearer). This is why there is no need for maintaining an HFN and a PDCP serial number since a missing packet re-reception procedure according to a PDCP status report is not applied.

However, in a case that a terminal transmits and receives data in a small cell by reestablishing a bearer from an RLC UM MCG bearer to an RLC UM SCG bearer due to movement from a macro cell area to a small cell area, and modifies a bearer from the RLC UM SCG bearer back to the RLC UM MCG bearer due to movement from the small cell area back to the macro cell area, if the terminal initializes each of an HFN and a PDCP serial number to 0, one and more data will be encrypted using the same security key and the same count, this may result in a security problem.

In an embodiment of the present disclosure, a terminal determines whether to initialize an HFN and a count in PDCP layer entity reestablishment depending on terminal's situation in order to solve such problem.

For example, in a case that a PDCP layer entity of an RLC UM bearer is reestablished since a terminal moves into an arbitrary small cell area and moves out of the arbitrary small cell area while maintaining an RRC connection in the same macro cell, the terminal applies an old HFN and an old PDCP serial number instead of initializing an HFN and a PDCP serial number. At this time, an MENB and an SENB informs an old HFN and an old PDCP serial number to each other, so the terminal and an ENB may maintain synchronization between an HFN and a PDCP serial number. Alternatively, the MENB and the SENB may initialize a PDCP serial number to 0, and increase an HFN by a predetermined value thereby preventing an HFN mismatch.

It will be noted that an operating process in a case that an RLC UM bearer is reestablished from an MCG bearer to an SCG, and back to the MCG bearer is an operating process of a terminal in a PDCP layer entity reestablishment of an RLC UM bearer.

An upper layer entity of a terminal commands a PDCP layer entity of the terminal to reestablish a PDCP layer entity at operation 1905. For example, the PDCP layer entity reestablishment may be commanded in a handover, SENB addition/release, or/and the like.

Upon receiving the PDCP layer entity reestablishment command from the upper layer entity, the PDCP layer entity recovers headers of PDCP PDUs delivered according to reestablishment of a lower layer entity by applying a current header compression protocol, and decrypts the recovered headers of the PDCP PDUs using a current encryption algorithm and an encryption key (i.e., converts the recovered headers of the PDCP PDUs into a PDCP SDU) to deliver the decrypted headers of the PDCP PDUs to the upper layer entity at operation 1910.

Upon receiving the PDCP layer entity reestablishment command from the upper layer entity, the PDCP layer entity determines whether to reset a header compression protocol by checking whether a drb-ContinueROHC (i.e., control information indicating whether to reset ROHC, refer to the LIE standards 36.323 and 36.331) is included in a control message including the PDCP layer entity reestablishment command, and reset or does not reset the header compression protocol based on the determined result at operation 1915.

The terminal determines whether the PDCP layer entity reestablishment is related to SCG bearer reestablishment at operation 1920. If the PDCP layer entity reestablishment is related to the SCG bearer reestablishment, the terminal proceeds to operation 1925. If the PDCP layer entity reestablishment is not related to the SCG bearer reestablishment (that is, the PDCP layer entity reestablishment is a PDCP layer entity reestablishment according to a handover or an RRC connection reconfiguration procedure), the terminal proceeds to operation 1930. Here, the PDCP layer entity reestablishment related to the SCG bearer reestablishment means a PDCP layer entity reestablishment which occurs according that a bearer is reestablished from an MCG bearer to an SCG bearer, that a bearer is reestablished from an SCG bearer to an MCG bearer, or that a bearer is reestablished from an SCG bearer to an SCG bearer. Alternatively, the PDCP layer entity reestablishment related to the SCG bearer reestablishment means a PDCP layer entity reestablishment which occurs according that an SCG/SENB is configured, that an SCG/SENB is released, or that an SCG/SENB is modified.

The terminal determines variables of the PDCP layer entity, a Next_PDCP_RX_SN, an RX_HFN, a Next_PDCP_TX_SN, and a TX_HFN (Refer to the LIE 36.323 standard) using a configuration scheme 1 at operation 1925. The terminal performs a related operation (e.g., an operation of determining a count of a packet to be transmitted, an operation of detecting an HFN of a received packet, and the like) by applying the variables determined below to a PDCP SDU to be transmitted and a received PDCP SDU.

[Next_PDCP_RX_SN/RX_HFN/Next_PDCP_TX_SN/TX_HFN Configuration Scheme 1]

Initialize each of a Next_PDCP_RX_SN and a Next_PDCP_TX_SN to 0

Increase a value of each of an RX_HFN and a TX_HFN by a predetermined integer n

Here, the predetermined integer n may be an integer which is fixed for a terminal and an ENB to use the same HFN.

This is why a receiving device may receive a PDCP PDU which the receiving device has already received again due to a retransmission after the PDCP layer entity reestablishment, and this will result in HFN mismatch between the receiving device and a transmitting device.

For example, in SENB release, an SENB may continue a data transmission until the terminal moves out of an SENB area even though initiating data forwarding to an MENB. In this case, the terminal may receive a packet received from the SENB from the MENB again. The terminal determines the variables of the PDCP layer entity, the Next_PDCP_RX_SN, the RX_HFN, the Next_PDCP_TX_SN, and the TX_HFN using a configuration scheme 2 at operation 1930.

[Next_PDCP_RX_SN/RX_HFN/Next_PDCP_TX_SN/TX_HFN Configuration Scheme 2]

Initialize each of a Next_PDCP_RX_SN and a Next_PDCP_TX_SN to 0

Initialize each of an RX_HFN and a TX_HFN to 0

The terminal initiates to apply an encryption algorithm and an encryption key instructed by an upper layer entity at operation 1935. Further, the terminal generates a PDCP PDU by applying the new encryption algorithm/encryption key to packets from a packet which is not delivered to a lower layer entity to transmit the generated PDCP PDU.

In order to prevent uplink data loss, the terminal may initiate to transmit packets from the last m packets which have been delivered to the lower layer entity. That is, the terminal generates a PDCP PDU by applying the new encryption algorithm/encryption key to packets from a packet which has been delivered to the lower layer entity to transmit the generated PDCP PDU.

If such retransmitting scheme is not applied, the terminal may determine the variables of the PDCP layer entity, the Next_PDCP_RX_SN, the RX_HFN, the Next_PDCP_TX_SN, and the TX_HFN using a configuration scheme 3 instead of the configuration scheme 1 at operation 1925.

[Next_PDCP_RX_SN/RX_HFN/Next_PDCP_TX_SN/TX_HFN Configuration Scheme 3]

Maintain a current value of each of a Next_PDCP_RX_SN and a Next_PDCP_TX_SN

Maintain a current value of each of an RX_HFN and a TX_HFN

Alternatively, the terminal may determine to proceed to operation 1925 or operation 1930 based on an instruction of the ENB without directly determining to proceed to operation 1925 or operation 1930 at operation 1920. For example, the ENB may include control information indicating whether to maintain a current value of each of the Next_PDCP_RX_SN, the Next_PDCP_TX_SN, the RX_HFN, and the TX_HFN (i.e., a case of proceeding to operation 1925) or initialize a value of each of the Next_PDCP_RX_SN, the Next_PDCP_TX_SN, the RX_HFN, and the TX_HFN to 0 (i.e., a case of proceeding to operation 1930) in PDCP layer entity reestablishment into the control message including the PDCP layer entity reestablishment command for the RLC UM bearer.

Here, the control information may be commonly applied to all of RLC UM bearers which are established for the terminal or may be applied to each RLC UM bearer. If the control information is commonly applied to all of the RLC UM bearers, one control IE (e.g., control information implemented by 1 bit) is included in the control message, and if the control information is applied to each RLC UM bearer, control IEs of which the number is equal to the number of the RLC UM bearers are included in the control message.

An operating process in a case that an RLC UM bearer is reestablished from an MCG bearer to an SCG bearer, and is reestablished from the SCG bearer to the MCG bearer again in an LIE system according to an embodiment of the present disclosure has been described with reference to FIG. 19, and an operating process related to a timing advance (TA) timer of a terminal in which DC is configured in an LIE system according to an embodiment of the present disclosure will be described with reference to FIG. 20.

Figure 20:
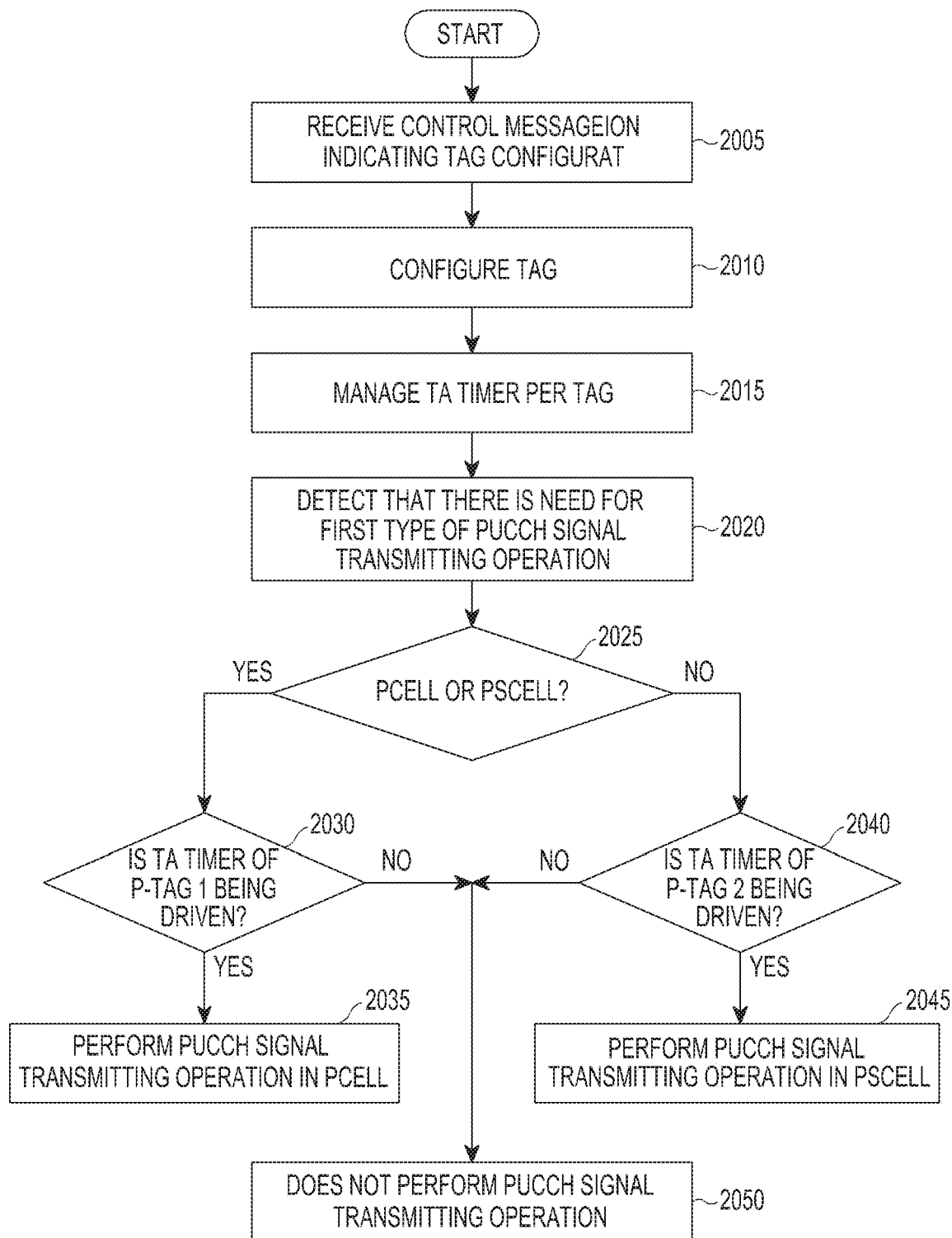
FIG. 20 schematically illustrates an operating process related to a timing advance (TA) timer of a terminal in which DC is configured in an LIE system according to an embodiment of the present disclosure.

FIG. 20 schematically illustrates an operating process related to a TA timer of a terminal in which DC is configured in an LIE system according to an embodiment of the present disclosure.

Referring to FIG. 20, a timing advance group (TAG) will be described below.

The TAG denotes a set of serving cells which share an uplink transmit timing. A type of TAG includes a primary TAG (P-TAG) and secondary TAG (S-TAG), the P-TAG denotes a TAG to which a PCell or a PSCell belongs, and the S-TAG denotes a TAG including only SCells, not the P-TAG. The expression that an arbitrary serving cell is included in an arbitrary TAG has the same meaning as the expression that an uplink transmit timing of the serving cell is the same as an uplink transmit timing of other serving cells which belong to the TAG, and whether to acquire uplink synchronization is determined by a TA timer of the TAG.

An uplink transmit timing of an arbitrary TAG is set according that a random access process is performed in a predetermined serving cell which belongs to the TAG, and maintained according to reception of a TA command.

Whenever receiving a TA command for an arbitrary TAG, a terminal drives a TA timer of a related TAG, or drives the TA timer of the related TAG again. If the TA timer expires, the terminal determines that uplink transmit synchronization of the related TAG has been lost, and does not perform an uplink transmitting operation before performing the random access process again.

A TAG ID is allocated to each TAG, and the TAG ID may be an arbitrary integer (e.g., an integer from 0 to 3).

At least two TAGS may be configured for a terminal that DC is configured. This is why the TAG is independently operated per ENB, so all serving cells may not be configured as one TAG.

In an embodiment of the present disclosure, a TAG is configured in order that an MENB and an SENB, and a PCell and a PSCell belong to different TAGs one another, and an arbitrary integer, for example, 0 is always allocated to a TAG to which the PCell belongs and a TAG to which the PSCell belongs.

Further, a terminal operates a TA timer per TAG. Upon receiving a TA command through an arbitrary serving cell, the terminal applies the TA command to a TAG which is indicated by a TA ID included in the TA command, and drives a TA timer of a related TAG again. Here, the terminal determines that the TA command is for which TAG by considering a serving cell group to which the serving cell belongs. If the TA command is received from an SCG, the terminal applies the TA command to a TAG which has a TAG ID identical to the TAG ID included in the TA command among TAGs including SCG serving cells. If a TA command with the TAG ID of 0 is received through an MCG, the TA command is for a TAG to which a PCell belongs. If a TA command with the TAG ID of 0 is received through an SCG, the TA command is for a TAG to which a PSCell belongs.

If a TA timer of a P-TAG is not being driven, a terminal does not perform a PUCCH signal transmitting operation in a serving cell which belongs to the P-TAG. After the terminal completes a handover, if a random access process is not completed even though a resource for PUCCH signal transmission has been already allocated, a case that a TA timer is stopped even though there is an available PUCCH resource may occur. At this time, if the terminal performs an uplink transmitting operation through a PUCCH in a related TAG, the terminal may result in uplink interference to other terminals, so it may be preferred to prohibit a PUCCH signal transmitting operation for the terminal.

Referring to FIG. 20, an operating process related to a TA timer of a terminal that DC is configured in an LIE system according to an embodiment of the present disclosure will be described.

A terminal receives a control message indicating TAG configuration from an ENB at operation 2005. For example, the control message may be implemented as an RRC connection reconfiguration message. The control message is a control message which configures one or more SCells, and may include a TAG ID indicating that the newly configured SCell belongs to which TAG.

The terminal determines a TAG to which a related SCell belongs according to the following criterion per newly configured SCcell.

(1) A case that a TAG ID is not indicated for a predetermined serving cell, and there is no information indicating that the serving cell belongs to which cell group: the terminal determines that the serving cell belongs to a P-TAG1.

(2) A case that a TAG ID is indicated for a predetermined serving cell, and there is no information indicating that the serving cell belongs to which cell group: the terminal determines that the serving cell belongs to an S-TAG which is specified by the TAG ID among TAGS configured in an MCG.

(3) A case that a TAG ID is not indicated for a predetermined serving cell, and it is indicated that the serving cell belongs to an SCG: the terminal determines that the serving cell belongs to a P-TAG2.

(4) A case that a TAG ID is indicated for a predetermined serving cell, and it is indicated that the serving cell belongs to an SCG: the terminal determines that the serving cell belongs to an S-TAG which is specified by the TAG ID among TAGs configured in an SCG.

The P-TAG1 denotes a TAG to which a PCell belongs, and the P-TAG2 denotes a TAG to which a PSCell belongs.

The terminal configures a serving cell and a TAG based on the control message, and transmits an RRC control message indicating that the configuration of the serving cell and the TAG has been completed to the ENB through an MCG at operation 2010.

The terminal manages a TA timer per TAG at operation 2015. That is, for each TAG, the terminal starts driving the TA timer after a random access process has been successfully completed in one of serving cells of a related TAG, and drives the TA timer again upon receiving a TA command for the TAG.

The terminal detects that there is a need for the first type of PUCCH signal transmitting operation in a PCell or a PSCell at operation 2020. Here, a PUCCH resource may be allocated per terminal in advance with a periodic transmit resource through an RRC control message. The PUCCH resource may be classified with a scheduling request resource, a CSI resource, and an HARQ feedback resource, and the first type of PUCCH signal transmitting operation includes a scheduling request operation and a CSI feedback operation, and does not include an HARQ feedback operation. The CSI may be referred to as channel quality information (CQI).

Meanwhile, the expression that it is detected that there is the need for the first type of PUCCH signal transmitting operation has the same meaning as the expression that a need for transmitting a scheduling request signal through a PCell occurs and a PUCCH resource is allocated for transmitting the scheduling request signal, the expression that a CSI resource is allocated to a PUCCH of a PCell and it reaches a sub-frame that the CSI resource is available, the expression that a need for transmitting a scheduling request signal through a PSCell occurs and a PUCCH resource is allocated for transmitting a scheduling request signal, or the expression that a CSI resource is allocated to a PUCCH of a PS Cell and it reaches a sub-frame that the CSI resource is available.

The terminal determines whether a serving cell that the need for the first type of PUCCH signal transmitting operation is detected is a PCell or a PSCell at operation 2025. If the serving cell that the need for the first type of PUCCH signal transmitting operation is detected is the PCell, the terminal proceeds to operation 2030, and if the serving cell that the need for the first type of PUCCH signal transmitting operation is detected is the PSCell, the terminal proceeds to operation 2040.

The terminal determines whether a TA timer of a P-TAG1 is being driven, a TA timer of which a TAG ID is 0 among TA timers which a MAC entity of an MCG manages is being driven, or a TA timer of a P-TAG among TA timers which a MAC entity of an MCG manages is being driven at operation 2030. If the TA timer of the P-TAG1 is being driven, the TA timer of which the TAG ID is 0 among the TA timers which the MAC entity of the MCG manages is being driven, or the TA timer of the P-TAG among the TA timers which the MAC entity of the MCG manages is being driven, the terminal proceeds to operation 2035.

If the TA timer of the P-TAG1 is not being driven, the TA timer of which the TAG ID is 0 among the TA timers which the MAC entity of the MCG manages is not being driven, and the TA timer of the P-TAG among the TA timers which the MAC entity of the MCG manages is not being driven, the terminal proceeds to operation 2050.

The terminal performs the PUCCH signal transmitting operation in the PCell at operation 2035.

The terminal does not perform the PUCCH signal transmitting operation in the PCell since the TA timer of the P-TAG1 is not being driven at operation 2050. The terminal may perform an additional procedure according to a type of PUCCH signal for which a transmission is omitted. For example, if a transmission of a scheduling request signal through a PUCCH of the PCell is omitted, the terminal initiates a random access operation in the PCell.

The terminal determines whether a TA timer of a P-TAG2 is being driven, a TA timer of which a TAG ID is 0 among TA timers which a MAC entity of an SCG manages is being driven, or a TA timer of a P-TAG among TA timers which a MAC entity of an SCG manages is being driven at operation 2040. If the TA timer of the P-TAG2 is being driven, the TA timer of which the TAG ID is 0 among the TA timers which the SCG entity of the MCG manages is being driven, or the TA timer of the P-TAG among the TA timers which the MAC entity of the SCG manages is being driven, the terminal proceeds to operation 2045.

If the TA timer of the P-TAG2 is not being driven, the TA timer of which the TAG ID is 0 among the TA timers which the MAC entity of the SCG manages is not being driven, and the TA timer of the P-TAG among the TA timers which the MAC entity of the SCG manages is not being driven, the terminal proceeds to operation 2050.

The terminal performs the PUCCH signal transmitting operation in the PSCell at operation 2045.

The terminal does not perform the PUCCH signal transmitting operation in the PSCell since the TA timer of the P-TAG2 is not being driven at operation 2050. The terminal may perform an additional procedure according to a type of PUCCH signal for which a transmission is omitted. For example, if a transmission of a scheduling request signal through a PUCCH of the PScell is omitted, the terminal initiates a random access operation in the PSCell.

Although FIG. 20 illustrates an operating process related to a TA timer of a terminal in which DC is configured in an LIE system according to an embodiment of the present disclosure, various changes could be made to FIG. 20. For example, although shown as a series of operations, various operations in FIG. 20 could overlap, occur in parallel, occur in a different order, or occur multiple times.

Meanwhile, an inner structure of a terminal in an LIE system according to an embodiment of the present disclosure has been described with reference to FIGS. 15 and 17.

The inner structure of the terminal may be implemented with a form different from those in FIGS. 15 and 17, and this will be described below.

The terminal includes a transmitter, a controller, a receiver, and a storage unit.

The controller controls the overall operation of the terminal. More particularly, the controller controls the terminal to perform an operation related to a signal transmitting/receiving operation in a mobile communication system supporting a plurality of carriers according to an embodiment of the present disclosure. The operation related to the signal transmitting/receiving operation in the mobile communication system supporting the plurality of carriers according to an embodiment of the present disclosure is performed in the manner described with reference to FIGS. 1 to 22, and a description thereof will be omitted herein.

The transmitter transmits various signals, various messages, and the like to an ENB, and the like under control of the controller. The various signals, the various messages, and the like transmitted in the transmitter have been described in FIGS. 1 to 22, and a description thereof will be omitted herein.

The receiver receives various signals, various messages, and the like from the ENB, and the like under control of the controller. The various signals, the various messages and the like received in the receiver have been described in FIGS. 1 to 22, and a description thereof will be omitted herein.

The storage unit stores a program and various data necessary for the operation of the terminal, information related to the signal transmitting/receiving operation in the mobile communication system supporting the plurality of carriers according to an embodiment of the present disclosure, and the like. The storage unit stores the various signals, the various messages, and the like received in the receiver.

While the transmitter, the controller, the receiver, and the storage unit are described as separate units, it is to be understood that this is merely for convenience of description. In other words, two or more of the transmitter, the controller, the receiver, and the storage unit may be incorporated into a single unit.

Meanwhile, an inner structure of an ENB in an LIE system according to an embodiment of the present disclosure has been described with reference to FIG. 18.

The inner structure of the ENB may be implemented with a form different from that in FIG. 18, and this will be described below.

The ENB includes a transmitter, a controller, a receiver, and a storage unit.

The controller controls the overall operation of the ENB. More particularly, the controller controls the ENB to perform an operation related to a signal transmitting/receiving operation in a mobile communication system supporting a plurality of carriers according to an embodiment of the present disclosure. The operation related to the signal transmitting/receiving operation in the mobile communication system supporting the plurality of carriers according to an embodiment of the present disclosure is performed in the manner described with reference to FIGS. 1 to 22, and a description thereof will be omitted herein.

The transmitter transmits various signals, various messages, and the like to a terminal, and the like under control of the controller. The various signals, the various messages, and the like transmitted in the transmitter have been described in FIGS. 1 to 22, and a description thereof will be omitted herein.

The receiver receives various signals, various messages, and the like from the terminal, and the like under control of the controller. The various signals, the various messages and the like received in the receiver have been described in FIGS. 1 to 22, and a description thereof will be omitted herein.

The storage unit stores a program and various data necessary for the operation of the ENB, information related to the signal transmitting/receiving operation in the mobile communication system supporting the plurality of carriers according to an embodiment of the present disclosure, and the like. The storage unit stores the various signals, the various messages, and the like received in the receiver.

While the transmitter, the controller, the receiver, and the storage unit are described as separate units, it is to be understood that this is merely for convenience of description. In other words, two or more of the transmitter, the controller, the receiver, and the storage unit may be incorporated into a single unit.

As is apparent from the foregoing description, an embodiment of the present disclosure enables to aggregate a plurality of carriers among ENBs to transmit/receive a signal in a mobile communication system supporting a plurality of carriers.

An embodiment of the present disclosure enables to aggregate a plurality of carriers among ENBs to transmit/receive a signal thereby increasing a signal transmitting/receiving rate of a terminal in a mobile communication system supporting a plurality of carriers.

An embodiment of the present disclosure enables to transmit/receive terminal capability information in a mobile communication system supporting a plurality of carriers.

An embodiment of the present disclosure enables to transmit/receive terminal capability information based on a band combination in a mobile communication system supporting a plurality of carriers.

An embodiment of the present disclosure enables to transmit/receive terminal capability information based on a cell in a mobile communication system supporting a plurality of carriers.

An embodiment of the present disclosure enables to transmit/receive terminal capability information per terminal or band combination in a mobile communication system supporting a plurality of carriers.

Certain aspects of the present disclosure may also be embodied as computer readable code on a non-transitory computer readable recording medium. A non-transitory computer readable recording medium is any data storage device that may store data, which may be thereafter read by a computer system. Examples of the non-transitory computer readable recording medium include read only memory (ROM), random access memory (RANI), compact disc ROMs (CD-ROMs), magnetic tapes, floppy disks, optical data storage devices, and carrier waves (such as data transmission through the Internet). The non-transitory computer readable recording medium may also be distributed over network coupled computer systems so that the computer readable code is stored and executed in a distributed fashion. In addition, functional programs, code, and code segments for accomplishing the present disclosure may be easily construed by programmers skilled in the art to which the present disclosure pertains.

It may be appreciated that a method and apparatus according to an embodiment of the present disclosure may be implemented by hardware, software and/or a combination thereof. The software may be stored in a non-volatile storage, for example, an erasable or re-writable ROM, a memory, for example, a RANI, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a user equipment (UE) in a communication system supporting carrier aggregation, the method comprising:
   receiving, from a base station (BS), a first message for requesting UE capability information; and
   transmitting, to the BS, a second message including the UE capability information,
   wherein the UE capability information includes information about at least one band combination supported by the UE and dual connectivity (DC) support information for each of the at least one band combination,
   wherein the DC support information indicates that the UE supports intra-band DC in case that the DC support information is included for a band combination including a single band entry,
   wherein the DC support information indicates that the UE supports DC for at least two band entries and that serving cells corresponding to one of the at least two band entries are included in one cell group in case that the DC support information is included for a band combination including the at least two band entries, and
   wherein the DC support information further indicates that the UE supports asynchronous DC for a corresponding band combination in case that the DC support information includes asynchronous information for the corresponding band combination.

2. The method of claim 1,
   wherein the DC support information further indicates that the UE supports synchronous DC for the corresponding band combination.

3. The method of claim 1, wherein the UE capability information further includes split information indicating whether the UE supports a split bearer and secondary cell group (SCG) information indicating whether the UE supports an SCG bearer.

4. The method of claim 3, further comprising:
   receiving, from the BS, a third message including configuration information for an SCG based on the split information and the SCG information; and
   establishing an SCG radio link control (RLC) entity and performing a packet data convergence protocol (PDCP) reordering function in case that the configuration information indicates a change from a master cell group (MCG) bearer to the split bearer.

5. The method of claim 3, further comprising:
   receiving, from the BS, a third message including configuration information for an SCG based on the split information and the SCG information; and
   releasing an SCG radio link control (RLC) entity in case that the configuration information indicates a change from the split bearer to a master cell group (MCG) bearer.

6. A method by a base station (BS) in a communication system supporting carrier aggregation, the method comprising:
   transmitting, to a user equipment (UE), a first message for requesting UE capability information; and
   receiving, from the UE, a second message including the UE capability information,
   wherein the UE capability information includes information about at least one band combination supported by the UE, and dual connectivity (DC) support information for each of the at least one band combination,
   wherein the DC support information indicates that the UE supports intra-band DC in case that the DC support information is included for a band combination including a single band entry,
   wherein the DC support information indicates that the UE supports DC for at least two band entries and that serving cells corresponding to one of the at least two band entries are included in one cell group in case that the DC support information is included for a band combination including the at least two band entries, and
   wherein the DC support information further indicates that the UE supports asynchronous DC for a corresponding band combination in case that the DC support information includes asynchronous information for the corresponding band combination.

7. The method of claim 6,
   wherein the DC support information further indicates that the UE supports synchronous DC for the corresponding band combination.

8. The method of claim 6, wherein the UE capability information further includes split information indicating whether the UE supports a split bearer and secondary cell group (SCG) information indicating whether the UE supports an SCG bearer.

9. The method of claim 8, further comprising:
   transmitting, to the UE, a third message including configuration information for an SCG based on the split information and the SCG information,
   wherein an SCG RLC entity is established and a packet data convergence protocol (PDCP) reordering function is performed by the UE in case that the configuration information indicates a change from an MCG bearer to a split bearer.

10. The method of claim 8, further comprising:
    transmitting, to the UE, a third message including configuration information for an SCG based on the split information and the SCG information,
    wherein an SCG radio link control (RLC) entity is released in case that the configuration information indicates a change from the split bearer to a master cell group (MCG) bearer.

11. A user equipment (UE) in a communication system supporting carrier aggregation, the UE comprising:
    a transceiver; and
    at least one processor configured to control the transceiver to:
    receive, from a base station (BS), a first message for requesting UE capability information, and
    transmit, to the BS, a second message comprising the UE capability information,
    wherein the UE capability information includes information about at least one band combination supported by the UE, and dual connectivity (DC) support information for each of the at least one band combination,
    wherein the DC support information indicates that the UE supports intra-band DC in case that the DC support information is included for a band combination including a single band entry,
    wherein the DC support information indicates that the UE supports DC for at least two band entries and that serving cells corresponding to one of the at least two band entries are included in one cell group in case that the DC support information is included for a band combination including the at least two band entries, and wherein the DC support information further indicates that the UE supports asynchronous DC for a corresponding band combination in case that the DC support information includes asynchronous information for the corresponding band combination.

12. The UE of claim 11, wherein the DC support information further indicates that the UE supports synchronous DC for the corresponding band combination.

13. The UE of claim 11, wherein the UE capability information further includes split information indicating whether the UE supports a split bearer and secondary cell group (SCG) information indicating whether the UE supports an SCG bearer.

14. The UE of claim 13, wherein the at least one processor further configured to:

control the transceiver to receive, from the BS, a third message including configuration information for an SCG based on the split information and the SCG information, and establish an SCG radio link control (RLC) entity and performing a packet data convergence protocol (PDCP) reordering function in case that the configuration information indicates a change from a master cell group (MCG) bearer to the split bearer.

15. The UE of claim 13, wherein the at least one processor further configured to:

control the transceiver to receive, from the BS, a third message including configuration information for an SCG based on the split information and the SCG information, establish an SCG radio link control (RLC) entity and perform a packet data convergence protocol (PDCP) reordering function in case that the configuration information indicates a change from a master cell group (MCG) bearer to the split bearer, and release an SCG radio link control (RLC) entity in case that the configuration information indicates a change from the split bearer to a master cell group (MCG) bearer.

16. A base station (BS) in a communication system supporting carrier aggregation, the base station comprising:

a transceiver; and at least one processor configured to control the transceiver to:

transmit, to a user equipment (UE), a first message for requesting UE capability information, and receive, from the UE, a second message including the UE capability information, wherein the UE capability information includes information about at least one band combination supported by the UE, and dual connectivity (DC) support information for each of the at least one band combination, wherein the DC support information indicates that the UE supports intra-band DC in case that the DC support information is included for a band combination including a single band entry, wherein the DC support information indicates that the UE supports DC for at least two band entries and that serving cells corresponding to one of the at least two band entries are included in one cell group in case that the DC support information is included for a band combination including the at least two band entries, and wherein the DC support information further indicates that the UE supports asynchronous DC for a corresponding band combination in case that the DC support information includes asynchronous information for the corresponding band combination.

17. The BS of claim 16, wherein the DC support information further indicates that the UE supports synchronous DC for the corresponding band combination.

18. The BS of claim 16, wherein the UE capability information further includes split information indicating whether the UE supports a split bearer and secondary cell group (SCG) information indicating whether the UE supports an SCG bearer.

19. The BS of claim 18, wherein the at least one processor further configured to control the transceiver to transmit, to the UE, a third message including configuration information for an SCG based on the split information and the SCG information, and wherein an SCG RLC entity is established and a packet data convergence protocol (PDCP) reordering function is performed by the UE in case that the configuration information indicates a change from an MCG bearer to a split bearer.

20. The BS of claim 18, wherein the at least one processor further configured to control the transceiver to transmit, to the UE, a third message including configuration information for an SCG based on the split information and the SCG information, and wherein an SCG radio link control (RLC) entity is released in case that the configuration information indicates a change from the split bearer to a master cell group (MCG) bearer.

* * * * *